United States Patent [19]
Hayashi et al.

[11] Patent Number: 6,124,022
[45] Date of Patent: Sep. 26, 2000

[54] ACICULAR HEMATITE PARTICLES FOR NON-MAGNETIC UNDERCOAT LAYER OF MAGNETIC RECORDING MEDIUM, AND MAGNETIC RECORDING MEDIUM USING THE SAME

[75] Inventors: Kazuyuki Hayashi, Hiroshima; Yasuyuki Tanaka, Onoda; Keisuke Iwasaki; Hiroko Morii, both of Hiroshima, all of Japan

[73] Assignee: Toda Kogyo Corporation, Hiroshima-ken, Japan

[21] Appl. No.: 09/199,817

[22] Filed: Nov. 25, 1998

[30] Foreign Application Priority Data

Nov. 26, 1997 [JP] Japan .................................... 9-342163
Feb. 27, 1998 [JP] Japan ................................... 10-064739

[51] Int. Cl.$^7$ ..................................................... G11B 5/733
[52] U.S. Cl. ......................... 428/141; 428/329; 428/402; 428/403; 428/694 BA; 428/694 BS; 428/900; 423/633
[58] Field of Search ..................................... 428/141, 329, 428/402, 403, 694 BA, 694 BS, 900; 423/633

[56] References Cited

U.S. PATENT DOCUMENTS 5,587,232  12/1996  Hayashi et al. .......................... 428/323
5,750,250   5/1998  Hayashi et al. .......................... 428/328
6,054,201   4/2000  Hayashi et al. .

FOREIGN PATENT DOCUMENTS 0 660 309 A1  6/1995  European Pat. Off. .
0 769 775 A1  4/1997  European Pat. Off. .

*Primary Examiner*—Stevan A. Resan
*Attorney, Agent, or Firm*—Nixon & Vanderhye

[57] ABSTRACT

Acicular hematite particles of the present invention comprise a geometrical standard deviation of major axis diameter of not more than 1.50, a geometrical standard deviation of minor axis diameter of not more than 1.35, a BET specific surface area of 35.9 to 150 $m^2$/g and an average major axis diameter of 0.004 to 0.295 $\mu$m. Such acicular hematite particles are suitable as non-magnetic particles for a non-magnetic undercoat layer of a magnetic recording medium having a low light transmittance, an excellent smooth surface, a high mechanical strength and an excellent durability.

43 Claims, No Drawings

ACICULAR HEMATITE PARTICLES FOR NON-MAGNETIC UNDERCOAT LAYER OF MAGNETIC RECORDING MEDIUM, AND MAGNETIC RECORDING MEDIUM USING THE SAME

BACKGROUND OF THE INVENTION

The present invention relates to acicular hematite particles for a non-magnetic undercoat layer of a magnetic recording medium and a magnetic recording medium using the acicular hematite particles, and more particularly, to acicular hematite particles suitable as non-magnetic particles for a non-magnetic undercoat layer of a magnetic recording medium having a low light transmittance, an excellent smooth surface, a high mechanical strength and an excellent durability; a process for producing the acicular hematite particles; a non-magnetic substrate for the magnetic recording medium, having a non-magnetic undercoat layer containing the acicular hematite particles; and a magnetic recording medium having the non-magnetic substrate.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

A reduction in the thickness of a magnetic recording layer is described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness. . . . "

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic coating film depends on the surface roughness of the base film (back surface roughness) so largely as to be approximately proportional, . . . , since the magnetic coating film is formed on the base film, the more smooth the surface of the base film is, the more uniform and larger head output is obtained and the more the S/N ratio is improved."

Secondly, there has been caused a problem in the strength of a base film with a tendency of the reduction in the thickness of the base film in response to the demand for a thinner magnetic coating film. This fact is described, for example, on page 77 of the above-described *Development of Magnetic Materials and Technique for High Dispersion of Magnetic Powder*, " . . . Higher recording density is a large problem assigned t the present magnetic tape. This is important in order to shorten the length of the tape so as to miniaturize the size of a cassette and to enable long-time recording. For this purpose, it is necessary to reduce the thickness of a base film . . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded. . . . "

There is no end to a demand for a higher performance in recent magnetic recording media. Since the above-described reduction in the thickness of a magnetic recording layer and a base film lowers the durability of the magnetic recording medium, an improvement of the durability of the magnetic recording medium is in strong demand.

This fact is described in Japanese Patent Application Laid-Open (KOKAI) No. 5-298679, " . . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N. . . . However, the coefficient of friction between the magnetic recording layer and an apparatus during the travel of the magnetic recording tape increases, so that there is a tendency of the magnetic recording layer of the magnetic recording medium being damaged or exfoliated even in a short time. Especially, in a videotape, since the magnetic recording medium travels at a high speed in contact with the video head, the ferromagnetic particles are apt to be dropped from the magnetic recording layer, thereby causing clogging on the magnetic head. Therefore, an improvement in the running durability of the magnetic recording layer of a magnetic recording medium is expected. . . . "

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the magnetic recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the magnetic recording medium are now in strong demand.

Various efforts have been made to improve the substrate for a magnetic recording layer with a demand for a thinner magnetic recording layer and a thinner base film. A magnetic recording medium having at least one undercoat layer (hereinunder referred to "non-magnetic undercoat layer") comprising a binder resin and non-magnetic particles such as hematite particles which are dispersed therein, on a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), etc.) The above-described magnetic recording media composed of a base film and a non-magnetic undercoat layer produced by dispersing non-magnetic particles in a binder resin and formed on a base film, have a small light transmittance and a high strength, but the durability and the surface smoothness thereof are inconveniently poor.

This fact is described in Japanese Patent Application Laid-Ope n (KOKAI) No. 5-182177 (1993), "... Although the problem of surface roughness is solved by providing a magnetic recording layer as an upper layer after forming a thick non-magnetic undercoat layer on the base film, the problem of the abrasion of a head and the problem of durability are not solved and still remain. This is considered to be caused because a thermoset resin is usually used as a binder of the non-magnetic undercoat layer so that the magnetic recording layer is brought into contact with a head or other members without any cushioning owing to the hardened non-magnetic undercoat layer, and a magnetic recording medium having such a non-magnetic undercoat layer has a considerably poor flexibility."

Alternatively, it has been strongly required to improve surface smoothness of the non-magnetic undercoat layer. Hitherto, it has been attempted to enhance a dispersibility of acicular hematite particles as non-magnetic particles by directing attention to the particle size distribution of major axis diameters of the particles (Japanese Patent Application Laid-open (KOKAI) No. 9-170003(1997), and the like).

That is, in the above Japanese Patent Application Laid-open (KOKAI) No. 9-170003(1997), there has been described a method of heat-treating acicular goethite particles or acicular hematite particles produced by heat-dehydrating the acicular goethite particles, at a temperature of not less than 550° C., thereby obtaining high-density acicular hematite particles. However, as shown in Comparative Examples hereinafter, the obtained acicular hematite particles are deteriorated in minor axis diameter distribution (in geometrical standard deviation) thereof, so that the dispersibility of the particles is still unsatisfactory.

Accordingly, with a recent tendency of reducing the thickness of the magnetic recording layer and base film, there have been most demanded acicular hematite particles having a uniform particle size, which a re suitable as non-magnetic particles for a non-magnetic undercoat layer having a smooth surface, a high mechanical strength and an excellent durability; and a magnetic recording medium provided with a non-magnetic undercoat layer containing the acicular hematite particles and having a low light transmittance, an excellent smooth surface, a high mechanical strength and an excellent durability. However, such acicular hematite particles and magnetic recording medium capable of satisfying these requirements have not been obtained yet.

As a result of the present inventors' earnest studies, it has been found that by heat-treating specific goethite particles at a specific temperature, followed by heat-dehydrating to produce hematite particles, or by subjecting specific hematite particles to acid-dissolving treatment under specific conditions, the obtained acicular hematite particles can exhibit a more uniform particle size, a small geometrical standard deviation for particle size distribution of minor axis diameters thereof, and are useful as non-magnetic particles for a non-magnetic undercoat layer having a more excellent smooth surface. The present invention has been attained on the basis of this finding.

SUMMARY OF THE INVENTION

It is an object of the present invention to provide acicular hematite particles which have a more uniform particle size and, in particular, are excellent in particle size distribution of minor axis diameter thereof, and are suitable as non-magnetic particles for a non-magnetic undercoat layer of a magnetic recording medium having a more excellent smooth surface.

It is another object of the present invention to provide acicular hematite particles suitable as non-magnetic particles for a non-magnetic undercoat layer of a magnetic recording medium which has a small light transmittance, a more excellent smooth surface, a high mechanical strength and a high durability, and a magnetic recording medium and a non-magnetic substrate having a non-magnetic undercoat layer using the acicular hematite particles.

To accomplish the aims, in a first aspect of the present invention, there are provided acicular hematite particles comprising a geometrical standard deviation of major axis diameter of not more than 1.50, a geometrical standard deviation of minor axis diameter of not more than 1.35, a BET specific surface area of 35.9 to 150 $m^2/g$ and an average major axis diameter of 0.004 to 0.295 $\mu$m.

In a second aspect of the present invention, there are provided acicular hematite particles comprising a geometrical standard deviation of major axis diameter of not more than 1.50, a geometrical standard deviation of minor axis diameter of not more than 1.35, a BET specific surface area of 35.9 to 150 $m^2/g$ and an average major axis diameter of 0.004 to 0.295 $\mu$m, and containing aluminum within the particle in an amount of 0.05 to 50% by weight (calculated as Al) based on the weight of the acicular hematite particles.

In a third aspect of the present invention, there are provided acicular hematite particles comprising a geometrical standard deviation of major axis diameter of not more than 1.50, a geometrical standard deviation of minor axis diameter of not more than 1.35, a BET specific surface area of 35.9 to 150 $m^2/g$ and an average major axis diameter of 0.004 to 0.295 $\mu$m, and having a coat formed on at least a part of the surface of the acicular hematite particle, comprising at least one compound selected from the group consisting of hydroxides of aluminum, oxides of aluminum, hydroxides of silicon and oxides of silicon in amount of 0.05 to 50% by weight (calculated as Al or $SiO_2$) based on the weight of the acicular hematite particles.

In a fourth aspect of the present invention, there are provided acicular hematite particles comprising a geometrical standard deviation of major axis diameter of not more than 1.50, a geometrical standard deviation of minor axis diameter of not more than 1.35, a BET specific surface area of 35.9 to 150 m$^2$/g and an average major axis diameter of 0.004 to 0.295 μm; containing aluminum within the particle in an amount of 0.05 to 50% by weight (calculated as Al) based on the weight of said acicular hematite particles; and having a coat formed on at least a part of the surface of the acicular hematite particle, comprising at least one compound selected from the group consisting of hydroxides of aluminum, oxides of aluminum, hydroxides of silicon and oxides of silicon in amount of 0.05 to 50% by weight (calculated as Al or $SiO_2$) based on the weight of the acicular hematite particles.

In a fifth aspect of the present invention, there are provided acicular hematite particles comprising a geometrical standard deviation of major axis diameter of not more than 1.50, a geometrical standard deviation of minor axis diameter of not more than 1.30, a BET specific surface area of 40 to 120 m$^2$/g and an average major axis diameter of 0.01 to 0.2 μm.

In a sixth aspect of the present invention, there are provided acicular hematite particles comprising a geometrical standard deviation of major axis diameter of not more than 1.50, a geometrical standard deviation of minor axis diameter of not more than 1.30, a BET specific surface area of 40 to 120 m$^2$/g and an average major axis diameter of 0.01 to 0.2 μm; and containing aluminum within the particle in an amount of 0.05 to 50% by weight (calculated as Al) based on the weight of the acicular hematite particles.

In a seventh aspect of the present invention, there are provided a acicular hematite particles comprising a geometrical standard deviation of major axis diameter of not more than 1.50, a geometrical standard deviation of minor axis diameter of not more than 1.30, a BET specific surface area of 40 to 120 m$^2$/g and an average major axis diameter of 0.01 to 0.2 μm; having a coat formed on at least a part of the surface of the acicular hematite particle, comprising at least one compound selected from the group consisting of hydroxides of aluminum, oxides of aluminum, hydroxides of silicon and oxides of silicon in amount of 0.05 to 50% by weight (calculated as Al or $SiO_2$) based on the weight of the acicular hematite particles.

In an eighth aspect of the present invention, there is provided a acicular hematite particles comprising a geometrical standard deviation of major axis diameter of not more than 1.50, a geometrical standard deviation of minor axis diameter of not more than 1.30, a BET specific surface area of 40 to 120 m$^2$/g and an average major axis diameter of 0.01 to 0.2 μm; containing aluminum within the particle in an amount of 0.05 to 50% by weight (calculated as Al) based on the weight of the acicular hematite particles; and having a coat formed on at least a part of the surface of the acicular hematite particle, comprising at least one compound selected from the group consisting of hydroxides of aluminum, oxides of aluminum, hydroxides of silicon and oxides of silicon in amount of 0.05 to 50% by weight (calculated as Al or $SiO_2$) based on the weight of the acicular hematite particles.

In a ninth aspect of the present invention, there is provided a process for producing the acicular hematite particles set forth in the first aspect, which process comprises:

subjecting a water suspension of acicular hematite particles having an average major axis diameter of 0.005 to 0.30 μm, a geometrical standard deviation of minor axis diameter of not less than 1.37 and a BET specific surface area of 35 to 150 m$^2$/g to acid-dissolving treatment at a acid concentration of not less than 1.0 N, a pH value of not more than 3.0, and a temperature of 20 to 100° C., thereby dissolving the acicular hematite particles in an amount of 5 to 50% by weight based on the total weight of the acicular hematite particles in said water suspension.

In a tenth aspect of the present invention, there is provided a process for producing the acicular hematite particles set forth in the fifth aspect, which process comprises:

heat-treating acicular goethite particles having an average major axis diameter of 0.01 to 0.25 μm and a geometrical standard deviation of minor axis diameter of more than 1.37 at 100 to 200° C.; and heat-dehydrating the obtained particles at 550 to 850° C.

In an eleventh aspect of the present invention, there is provided a magnetic recording medium comprising:

a non-magnetic base film;

a non-magnetic undercoat layer formed on the non-magnetic base film, comprising a binder resin and acicular hematite particles having a geometrical standard deviation of major axis diameter of not more than 1.50, a geometrical standard deviation of minor axis diameter of not more than 1.35, an average major axis diameter of 0.004 to 0.295 μm and a BET specific surface area of 35.9 to 150 m$^2$/g; and a magnetic coating film comprising a binder resin and magnetic particles.

In a twelfth aspect of the present invention, there is provided a magnetic recording medium comprising:

a non-magnetic base film;

a non-magnetic undercoat layer formed on the non-magnetic base film, comprising a binder resin and acicular hematite particles as defined in any one of the second to eighth aspects; and a magnetic coating film comprising a binder resin and magnetic particles.

In a thirteenth aspect of the present invention, there is provided a non-magnetic substrate comprising:

a non-magnetic base film; and a non-magnetic undercoat layer formed on the non-magnetic base film, comprising a binder resin and acicular hematite particles having a geometrical standard deviation of major axis diameter of not more than 1.50, a geometrical standard deviation of minor axis diameter of not more than 1.35, a BET specific surface area of 35.9 to 150 m$^2$/g and an average major axis diameter of 0.004 to 0.295 μm.

In a fourteenth aspect of the present invention, there is provided a non-magnetic substrate comprising:

a non-magnetic base film; and a non-magnetic undercoat layer formed on the non-magnetic base film, comprising a binder resin and acicular hematite particles as defined in any one of the second to eighth aspects.

DETAILED DESCRIPTION OF THE INVENTION

The present invention is explained in more detail below.

First, the acicular hematite particles for a non-magnetic undercoat layer of a magnetic recording medium according to the present invention is described.

The acicular hematite particles according to the present invention have substantially the same acicular shape as that of particles to be treated. The "acicular" shape may include not only a needle shape but also a spindle shape or a rice-ball shape. In addition, the lower limit of an aspect ratio of the particles (=average major axis diameter:average minor axis diameter, hereinafter referred to merely as "aspect ratio") is usually 2:1, preferably 3:1. With the consideration of dispersibility of the particles in vehicle, the upper limit of the aspect ratio is preferably 20:1, more preferably 10:1. When the aspect ratio is less than 2:1, it may be difficult to obtain a coating film having a sufficient strength. On the other hand, when the aspect ratio is more than 20:1, the particles may be entangled with each other in vehicle, thereby causing a tendency that the dispersibility thereof may be deteriorated or the viscosity thereof may be increased.

The upper limit of the average major axis diameter of the acicular hematite particles according to the present invention is usually 0.295 µm. The lower limit of the average major axis diameter of the acicular hematite particles according to the present invention is usually 0.004 µm. If the upper limit of the average major axis diameter exceeds 0.295 µm, the surface smoothness of the coating film formed using such particles may be impaired because the particle size is large. On the other hand, if the lower limit of the average major axis diameter is less than 0.004 µm, the dispersion in the vehicle may be difficult because of the increase of the intermolecular force due to the fine particles. With the consideration of the dispersibility in the vehicle and the surface smoothness of the coating film, the upper limit thereof is preferably 0.275 µm, more preferably 0.200 µm, still more preferably 0.100 µm, and the lower limit thereof is preferably 0.008 µm, more preferably 0.010 µm, still more preferably 0.020 µm.

The upper limit of the average minor axis diameter of the acicular hematite particles according to the present invention is usually 0.147 µm The lower limit of the average minor axis diameter of the acicular hematite particles according to the present invention is usually 0.002 µm. If the upper limit of the average minor axis diameter exceeds 0.147 µm, the surface smoothness of the coating film formed using such particles may be impaired because the particle size is large. On the other hand, if the lower limit of the average minor axis diameter is less than 0.002 µm, the dispersion in the vehicle may be difficult because of the increase of the intermolecular force due to the fine particles. With the consideration of the dispersibility in the vehicle and the surface smoothness of the coating film, the upper limit thereof is preferably 0.123 µm, more preferably 0.100 µm, still more preferably 0.050 µm, and the lower limit thereof is preferably 0.004 µm, more preferably 0.005 µm, still more preferably 0.010 µm.

The upper limit of the BET specific surface area ($S_{BET}$) of the acicular hematite particles according to the pre sent invention is usually 150 m$^2$/g. The lower limit of the BET specific surface area ($S_{BET}$) of the acicular hematite particles according to the present invention is usually 35.9 m$^2$/g. If the upper limit thereof is more than 150 m$^2$/g, the dispersion in the vehicle may be difficult because of the increase of the intermolecular force due to the fine particles. On the other hand, if the lower limit thereof is less than 35.9 m$^2$/g, the acicular hematite particles may be coarse particles or large particles produced by sintering a particle and between particles, which are apt to exert a deleterious influence on the surface smoothness of the coating film. With the consideration of the dispersibility in the vehicle and the surface smoothness of the coating film, the upper limit thereof ($S_{BET}$) is preferably 120 m$^2$/g, more preferably 100 m$^2$/g, still more preferably 80 m$^2$/g and the lower limit thereof ($S_{BET}$) is preferably 38 m$^2$/g, more preferably 40 m$^2$/g, still more preferably 50 m$^2$/.

The upper limit of the geometrical standard deviation of the major axis diameter of the acicular hematite particles used in the present invention is usually not more than 1.50. If upper limit of the geometrical standard deviation of the major axis diameter exceeds 1.50, the coarse particles existent sometimes exert a deleterious influence on the surface smoothness of the coating film. With the consideration of the surface smoothness of the coating film, the upper limit thereof is preferably 1.45, more preferably not more than 1.40, still more preferably not more than 1.35. From the point of view of industrial productivity, the lower limit thereof is preferably 1.01.

The upper limit of the geometrical standard deviation of the minor axis diameter of the acicular hematite particles according to the present invention is usually not more than 1.35. If upper limit of the geometrical standard deviation of the minor axis diameter exceeds 1.35, the coarse particles existent sometimes exert a deleterious influence on the surface smoothness of the coating film. With the consideration of the surface smoothness of the coating film, the upper limit thereof is preferably 1.33, more preferably not more than 1.30, still more preferably not more than 1.28. From the point of view of industrial productivity, the lower limit thereof is preferably 1.01.

The acicular hematite particles for a non-magnetic undercoat layer of a magnetic recording medium according to the present invention have a high degree of densification. When the degree of densification is represented by a ratio value of the specific surface area ($S_{BET}$) measured by a BET method to the surface area ($S_{TEM}$) calculated from the major axis diameter and the minor axis diameter which were measured from the particles in an electron micrograph of the acicular hematite particles (hereinafter referred to merely as "$S_{BET}/S_{TEM}$ value"), the $S_{BET}/S_{TEM}$ value is 0.5 to 2.5.

When the $S_{BET}/S_{TEM}$ value is less than 0.5, although the acicular hematite particles are highly densified, the particle diameter thereof may be increased due to sintering in each particle or between particles, so that a coating film formed using these particles, may not have a sufficient smooth surface. On the other hand, when the $S_{BET}/S_{TEM}$ value is more than 2.5, the degree of densification of the particles is insufficient, so that many pores tend to be formed on the surface and inside of the particle, resulting in insufficient dispersibility of the particles in vehicle. With the consideration of the smooth surface of the coating film and the dispersibility in the vehicle, the $S_{BET}/S_{TEM}$ value is preferably 0.7 to 2.0, more preferably 0.8 to 1.6.

With the consideration of the durability of the magnetic recording medium having a non-magnetic undercoat layer containing such acicular hematite particles, it is preferable acicular hematite particles contain aluminum in an amount of 0.05 to 50% by weight (calculated as Al) based on the total weight of the particles, which is present within the particle, substantially uniformly. When the aluminum content exceeds 50% by weight, although a magnetic recording medium having the non-magnetic undercoat layer containing such acicular hematite particles has a sufficient durability, the durability-improving effect becomes saturated, so that it is meaningless to add aluminum more than necessary. From the point of view of durability-improving effect of a magnetic recording medium and industrial productivity, the aluminum content therein is preferably 0.1 to 30% by weight, more preferably 0.2 to 20% by weight (calculated as Al) based on the total weight of the particles.

As the acicular hematite particles according to the present invention, it is preferable acicular hematite particles having higher resin adsorptivity, especially, acicular hematite particles containing aluminum which is present within the particle. With the consideration of the durability of the magnetic recording medium having a non-magnetic undercoat layer containing such acicular hematite particles, it is preferred that the resin adsorptivity of the acicular hematite particles according to the present invention is preferably not less than 60%, more preferably not less than 65%, still more preferably not less than 70%.

Various properties of the acicular hematite particles which contain aluminum within the particle, such as aspect ratio, average major axis diameter, average minor axis diameter, BET specific surface area, geometrical standard deviation of major axis diameter, geometrical standard deviation of minor axis diameter, and degree of densification are approximately equivalent in values to those of the acicular hematite particles in which aluminum is not contained within the particle.

At least a part of the surface of the acicular hematite particle which may contain aluminum within the particle according to the present invention may be coated with at least one selected from the group consisting of a hydroxide of aluminum, an oxide of aluminum, a hydroxide of silicon and an oxide of silicon. When the acicular hematite particles which are coated with the above-described coating material are dispersed in a vehicle, the treated particles have an affinity with the binder resin and it is more easy to obtain a desired dispersibility.

The amount of aluminum hydroxide, aluminum oxide, silicon hydroxide or silicon oxide used as the coating material is usually not less than 50% by weight, preferably 0.01 to 50% by weight (calculated as Al and/or $SiO_2$) based on the total weight of the particles. If it is less than 0.01% by weight (calculated as Al and/or $SiO_2$) based on the total weight of the particles, the dispersibility-improving effect caused by coating may be insufficient. If the amount exceeds 50.00% by weight (calculated as Al and/or $SiO_2$) based on the total weight of the particles, the dispersibility-improving effect caused by coating becomes saturated, so that it is meaningless to add a coating material more than necessary. From the point of view of dispersibility in the vehicle and industrial productivity, the more preferable amount of coating material is 0.05 to 20% by weight (calculated as Al and/or $SiO_2$) based on the total weight of the particles.

Various properties of the hematite particles which are coated with above-mentioned coating material, such as aspect ratio, average major axis diameter, average minor axis diameter, BET specific surface area, geometrical standard deviation of major axis diameter, geometrical standard deviation of major axis diameter, and degree of densification are approximately equivalent in values to those of the acicular hematite particles in which the surfaces thereof is not coated with the above-mentioned coating material.

The process for producing the acicular hematite particles according to the present invention is exemplified as follows.

As acicular hematite particles to be treated, acicular hematite particles having an average major axis diameter of 0.005 to 0.30 μm, a geometrical standard deviation of the minor axis diameter of not less than 1.37 and a BET specific surface area ($S_{BET}$) of 35 to 150 $m^2/g$ are usable. Such acicular hematite particles are obtained by heat-dehydrating the acicular goethite particles having an average major axis diameter of 0.005 to 0.40 μm, an average minor axis diameter of 0.0025 to 0.20 μm, and a BET specific surface area ($S_{BET}$) of 50 to 250 $m^2/g$, obtained by the following processes.

The acicular hematite particles for a nonmagnetic undercoat layer of a magnetic recording medium according to the present invention are produced by the following processes (1) and (2).

(1) The acicular hematite particles according to the present invention can be obtained by subjecting acicular hematite particles to be treated to acid-dissolving treatment under specific conditions.

The acicular hematite particles to be treated can be produced by various methods. Examples of these methods may include a method of directly producing the hematite particles by a wet process; a method of producing akaganeite particles (β-FeOOH) and then heat-dehydrating the akaganeite particles; or the like. As an ordinary production method, there may be industrially preferably used a method of producing acicular goethite particles as a precursor of the acicular hematite particles by the following wet process and then heat-dehydrating the obtained acicular goethite particles.

An ordinary method of producing acicular goethite particles as one of precursors of the acicular hematite particles is described below.

As described hereinafter, the acicular goethite particles can be produced by passing an oxygen-containing gas through a suspension containing ferrous precipitates such as hydroxides of iron or iron carbonate which are obtained by reacting a ferrous salt with either alkali hydroxide, alkali carbonate or mixed alkali composed of alkali hydroxide and alkali carbonate.

Acicular goethite particles are produced by an ordinary method:

(A) a method of producing needle-shaped goethite particles comprising oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas therein to at a temperature of not higher than 80° C.;

(B) a method of producing spindle-shaped goethite particles comprising oxidizing a suspension containing $FeCO_3$ which is obtained by reacting an aqueous ferrous salt solution with an aqueous alkali carbonate solution, by passing an oxygen-containing gas therein to after aging the suspension, if necessary;

(C) a method of producing spindle-shaped goethite particles comprising oxidizing a suspension containing precipitates containing iron which is obtained by reacting an aqueous ferrous salt solution with an aqueous alkali carbonate solution and an alkali hydroxide solution, by passing an oxygen-containing gas therein to after aging the suspension, if necessary;

(D) a method of growing needle-shaped seed goethite particles comprising oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas therein to, thereby producing needle-shaped seed goethite particles, adding not less than an equivalent of an alkali hydroxide solution to the $Fe^{2+}$ in the aqueous ferrous salt solution, to the aqueous ferrous salt solution containing the needle-shaped seed goethite particles, and passing an oxygen-containing gas into the aqueous ferrous salt solution;

(E) a method of growing needle-shaped seed goethite particles comprising oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas therein to, thereby producing needle-shaped seed goethite particles, adding not less than an equivalent of an aqueous alkali carbonate solution to the $Fe^{2+}$ in the aqueous ferrous salt solution, to the aqueous ferrous salt solution containing the needle-shaped seed goethite particles, and passing an oxygen-containing gas into the aqueous ferrous salt solution; and (F) a method of growing needle-shaped seed goethite particles comprising oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas therein to, thereby producing needle-shaped seed goethite particles and growing the obtained needle-shaped seed goethite particles in an acidic or neutral region.

Elements other than Fe such as Ni, Zn, P and Si, which are generally added in order to enhance various properties of the particles such as the major axis diameter, the minor axis diameter and the aspect ratio, may be added during the reaction system for producing the goethite particles.

Alternatively, the acicular hematite particles to be treated which contain aluminum therewithin in an amount of 0.05 to 50% by weight (calculated as Al) based on the total weight of the particles, can be produced by containing aluminum in the acicular goethite particles by preliminarily adding an aluminum compound upon the above-mentioned production reaction of the acicular goethite particles.

Further, in the production reaction of the acicular goethite particles, an aluminum compound may be added to at least one solution selected from suspensions containing a ferrous salt, alkali hydroxide, alkali carbonate, mixed alkali composed of alkali hydroxide and alkali carbonate, or ferrous precipitates such as hydroxides of iron or iron carbonate.

As the above-mentioned aluminum compounds, there may be used aluminum salts such as aluminum acetate, aluminum sulfate, aluminum chloride or aluminum nitrate, alkali aluminates such as sodium aluminate, alumina sol, aluminum hydroxide or the like.

The amount of the aluminum compound added is 0.05 to 50% by weight (calculated as Al) based on the total weight of the particles.

The obtained acicular goethite particles usually contain aluminum in an amount of 0.05 to 50% by weight (calculated as Al) based on the total weight of the particles.

Next, there is described a process for producing acicular hematite particles to be treated, which may substantially uniformly containing aluminum within the particle.

The acicular hematite particles which may substantially uniformly contain aluminum within the particle may be produced by heat-dehydrating the above-mentioned acicular goethite particles which may substantially uniformly contain aluminum within the particle.

The temperature of the heat-dehydration is preferably 550 to 850° C. to obtain high-density acicular hematite particles which may substantially uniformly contain aluminum within the particle.

Especially, in the case where the heat-dehydration is conducted at an elevated temperature as high as not less than 550° C., it is preferred that the surfaces of the acicular goethite particles which may substantially uniformly contain aluminum within the particle, be coated with an anti-sintering agent prior to the heat-dehydration, as is well known in the art.

As the sintering preventive, sintering preventives generally used are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum nitrate, alkali aluminate such as sodium aluminate, alumina sol and aluminum hydroxide, and titanium compounds such as titanyl sulfate may be exemplified.

The amount of the anti-sintering agent applied onto the surface of the acicular goethite particle is about 0.05 to 10% by weight based on the total weight of the particles, though the amount is varied depending upon kinds of anti-sintering agents used, pH value of the alkali aqueous solution or various conditions such as heat-treating temperature or the like.

The acicular goethite particles coated with a sintering preventive have the BET specific surface area ($S_{BET}$) Of usually about 50 to 250 m$^2$/g. The coating treatment using a sintering preventive is composed of the steps of: adding a sintering preventive to an aqueous suspension containing the acicular goethite particles, mixing and stirring the resultant suspension, filtering out the particles, washing the particles with water, and drying the particles.

Meanwhile, as the acicular hematite particles to be treated, there may be preferably used high-density acicular hematite particles which may substantially uniformly contain aluminum within the particle. In the case of low-density acicular hematite particles, many dehydration pores are present within particles or on surfaces thereof. Therefore, upon subjecting the particles to the acid-dissolving treatment, the dissolution is initiated from the dehydration pores, so that the particle shape can be no longer maintained, resulting in deteriorated dispersibility of the obtained particles.

In order to obtain high-density acicular hematite particles which can maintain a particle shape of the acicular goethite particles, it is preferred that the acicular goethite particles which may substantially uniformly contain aluminum within the particle, are first heat-treated at a temperature as low as 250 to 500° C. to form low-density acicular hematite particles which may contain aluminum which is present within the particle, and then the low-density hematite particles are heat-treated at an elevated temperature as high as 550 to 850° C.

If the temperature for heat-treating the goethite particles is less than 250° C., the dehydration reaction takes a long time. On the other hand, if the temperature exceeds 500° C., the dehydration reaction is abruptly brought out, so that it is difficult to retain the shapes because the sintering between particles is caused. The low-density acicular hematite particles obtained by heat-treating the acicular goethite particles at a low temperature are low-density particles having a large number of dehydration pores through which $H_2O$ is removed from the acicular goethite particles and the BET specific surface area thereof is about 1.2 to 2 times larger than that of the acicular goethite particles as the starting material.

The low-density acicular hematite particles obtained by heat-treating the acicular goethite particles coated with a sintering preventive at a temperature of 250 to 500° C., have an average major axis diameter of usually 0.005 to 0.30 μm, an average minor axis diameter of usually 0.0025 to 0.15 μm, a geometrical standard deviation of a major axis diameter of usually not more than 1.70, a geometrical standard deviation of a minor axis diameter of usually not more than 1.50, and a BET specific surface area ($S_{BET}$) of usually about 70 to 350 m$^2$/g.

The low-density acicular hematite particles containing aluminum which is present within the particle, obtained by heat-treating the acicular goethite particles coated with a sintering preventive at a temperature of 250 to 500° C., have an average major axis diameter of usually 0.005 to 0.30 μm, an average minor axis diameter of usually 0.0025 to 0.15 μm, a geometrical standard deviation of a major axis diameter of usually not more than 1.70, a geometrical standard deviation of a minor axis diameter of usually not more than 1.50 and a BET specific surface area ($S_{BET}$) of usually about 70 to 350 m$^2$/g, and containing aluminum in an amount of 0.05 to 50% by weight (calculated as Al) based on the total weight of the particles.

The low-density acicular hematite particles which may substantially uniformly contain aluminum within the particle, are then heat-treated at a temperature of not less than 550° C. to obtain a high-density acicular hematite particles which may substantially uniformly contain aluminum within the particle. The upper limit of the heating temperature is preferably 850° C., more preferably 800° C. If the heat-treating temperature is less than 550° C., since the densification is insufficient, a large number of dehydration pores may exist within and on the surface of the acicular hematite particles, so that the dispersion in the vehicle may become insufficient. Further, when the non-magnetic undercoat layer is formed from these particles, it may be difficult to obtain a coating film having a smooth surface. On the other hand, if the temperature exceeds 850° C., although the densification of the acicular hematite particles may be sufficient, since sintering is caused on and between particles, the particle size may increase, so that it may be difficult to obtain a coating film having a smooth surface.

The BET specific surface area of the high-density acicular hematite particles is usually about 35 to 150 m$^2$/g. The average major axis diameter of the high-density acicular hematite particles is usually 0.005 to 0.30 μm. The average minor axis diameter of the high-density acicular hematite particles is usually 0.0025 to 0.15 μm.

The BET specific surface area ($S_{BET}$) of the high-density acicular hematite particles containing aluminum which is present within the particle is usually about 35 to 150 m$^2$/g. The amount of aluminum contained in the high-density acicular hematite particles is usually 0.05 to 50% by weight (calculated as Al) based on the total weight of the particles.

The high-density acicular hematite particles which may substantially uniformly contain aluminum within the particle, are pulverized by a dry-process, and formed into a slurry. The slurry is then pulverized by a wet-process so as to deagglomerate coarse particles. In the wet-pulverization, ball mill, sand grinder, colloid mill or the like is used until coarse particles having a particle size of at least 44 μm are substantially removed. That is, the wet-pulverization is carried out until the amount of the coarse particles having a particle size of not less than 44 μm becomes to not more than 10% by weight, preferably not more than 5% by weight, more preferably 0% by weight based on the total weight of the particles. If the amount of the coarse particles having a particle size of not less than 44 μm is more than 10% by weight, the effect of treating the particles in an acid-dissolving treatment at the next step is not attained.

The acicular hematite particles according to the present invention, can be produced by subjecting a water suspension of acicular hematite particles to be treated, to the acid-dissolving treatment at an acid concentration of usually not less than 1.0 N and a pH value of usually not more than 3.0 and in a temperature range of usually 20 to 100° C., thereby dissolving usually 5 to 50% by weight of the acicular hematite particles based on the total weight of the acicular hematite particles in the water suspension, and then filtering out residual acicular hematite particles, followed by washing with water and drying.

First, the acicular hematite particles to be treated with acid, are described below.

The particle shape of the hematite particles to be treated, is an acicular shape. The "acicular" shape may include not only a needle shape but also a spindle shape or a rice ball shape, in addition, the aspect ratio of the particles is usually 2:1 to 20:1.

The average major axis diameter of the acicular hematite particles to be treated, is usually 0.005 to 0.3 μm, preferably 0.01 to 0.28 μm.

The average minor axis diameter of the acicular hematite particles to be treated, is usually 0.0025 to 0.15 μm, preferably 0.005 to 0.14 μm.

The geometrical standard deviation of the major axis diameter of the acicular hematite particles to be treated, is usually not more than 1.70, and the geometrical standard deviation of the minor axis diameter of the acicular hematite particles to be treated, is usually not more than 1.50.

The BET specific surface area ($S_{BET}$) of the acicular hematite particles to be treated, is usually 35 to 150 m$^2$/g.

The acicular hematite particles to be treated, may contain aluminum in an amount of usually 0.05 to 50% by weight (calculated as Al) which is present within the particle.

Next, the acid-dissolving treatment of the acicular hematite particles to be treated is described in detail.

The concentration of the acicular hematite particles in the water suspension is usually 1 to 500 g/liter, preferably 10 to 250 g/liter. When the concentration of the acicular hematite particles in the water suspension is less than 1 g/liter, the amount of the particles treated is too small, which is industrially disadvantageous. On the other hand, when the concentration of the acicular hematite particles in the water suspension is more than 500 g/liter, it becomes difficult to evenly subject the particles to the acid-dissolving treatment.

As the acids, there may be used any of sulfuric acid, hydrochloric acid, nitric acid, sulfurous acid, chloric acid, perchloric acid and oxalic acid. With the consideration of corrosion or deterioration of a container in which a high-temperature treatment or a dissolving treatment is conducted, economy or the like, sulfuric acid is preferred.

The concentration of the acid is usually not less than 1.0 N, preferably not less than 1.2 N, more preferably not less than 1.5 N. The upper limit of concentration of the acid is preferably 5 N. When the acid concentration is less than 1.0 N, the dissolution of the acicular hematite particles requires an extremely long period of time and is, therefore, industrially disadvantageous.

Upon the acid-dissolving treatment, the initial pH value is usually not more than 3.0, preferably not more than 2.0, more preferably not more than 1.0. With the consideration of the dissolving time or the like, it is industrially preferred that the pH value is not more than 1.0. When the pH value is more than 3.0, the dissolution of the acicular hematite particles requires an extremely long period of time and is, therefore, industrially disadvantageous.

The temperature of the water suspension is usually 20 to 100° C., preferably 50 to 100° C., more preferably 70 to 100° C. When the temperature of the water suspension is less than 20° C., the dissolution of the acicular hematite particles requires an extremely long period of time and is, therefore, industrially disadvantageous. On the other hand, when the temperature of the water suspension is more than 100° C., the dissolution of the particles proceeds too rapidly, so that it becomes difficult to control the dissolving treatment. Further, in that case, the dissolving treatment requires a special apparatus such as autoclave, resulting in industrially disadvantageous process.

Incidentally, in the case where the acicular hematite particles to be treated have a relatively large average major axis diameter, i.e., in the range of 0.05 to 0.30 $\mu$m, it is preferred that the dissolving treatment is conducted under the hard conditions, e.g., at a pH value of not more than 1.0 and a temperature of 70 to 100° C. On the other hand, in the case where the acicular hematite particles to be treated have a relatively small average major axis diameter, i.e., in the range of 0.005 to 0.05 $\mu$m, it is preferred that the dissolving treatment is conducted under the soft conditions, e.g., at a pH value of 1.0 to 3.0 and a temperature of 20 to 70° C.

The dissolving treatment with acid may be conducted until the amount of the acicular hematite particles dissolved reaches 5 to 50% by weight, preferably 10 to 45% by weight, more preferably 15 to 40% by weight based on the total weight of the acicular hematite particles to be treated. When the amount of the acicular hematite particles dissolved is less than 5% by weight, the fine particle components may not be sufficiently removed by the dissolving treatment. On the other hand, when the amount of the acicular hematite particles dissolved is more than 50% by weight, the particles as a whole may be finely divided and the dissolving loss is increased, resulting in industrially disadvantageous process.

Incidentally, the aqueous solution in which iron salts are dissolved in the above dissolving treatment, is separated from the slurry by filtration. From the standpoint of the reuse of resources, the thus-separated iron salts may be used as a raw material of the ferrous salt used for the production of acicular goethite particles.

After completion of the above dissolving treatment with acid, the acicular hematite particles remaining in the water suspension is filtered, washed with water and dried, thereby obtaining acicular hematite particles for a non-magnetic undercoat layer of a magnetic recording medium according to the present invention.

As the water-washing methods, there may be used those ordinarily used in industrial fields, such as a washing method by decantation, a washing method conducted according to a diluting process by using a filter thickener, a washing method of feeding water through a filter press, or the like.

(2) The acicular hematite particles according to the present invention are produced by heat-treating the specific acicular goethite particles which are produced by the aforementioned method, at a temperature of 100 to 200° C., thereby adhering at least one superfine goethite particles to the surface of the acicular goethite, and heat-treating at a temperature of 550 to 850° C.

As the acicular goethite particles as starting particles, acicular goethite particles having an average major axis diameter of usually 0.01 to 0.25 $\mu$m and a geometrical standard deviation of a minor axis diameter of usually not less than 1.37, are used. Especially, acicular goethite particles having an average major axis diameter of usually 0.01 to 0.25 $\mu$m, an average minor axis diameter of usually 0.05 to 0.17 $\mu$m, a geometrical standard deviation of a major axis diameter of usually not more than 1.70, a geometrical standard deviation of a minor axis diameter of usually not more than 1.50, and a BET specific surface area ($S_{BET}$) of usually 50 to 250 m$^2$/g, are preferable.

As the acicular goethite particles which substantially uniformly contain aluminum within the particle as starting particles, acicular goethite particles having an average major axis diameter of usually 0.01 to 0.25 $\mu$m and a geometrical standard deviation of a minor axis diameter of usually not less than 1.37, are used. Especially, acicular goethite particles having an average major axis diameter of usually 0.01 to 0.25 $\mu$m, an average minor axis diameter of usually 0.05 to 0.17 $\mu$m, a geometrical standard deviation of a major axis diameter of usually not more than 1.70, a geometrical standard deviation of a minor axis diameter of usually not more than 1.50, and a BET specific surface area ($S_{BET}$) of usually 50 to 250 m$^2$/g, and containing aluminum in amount of 0.05 to 50% by weight (calculated as Al) based on the total weight of the particles are preferable.

When the heating temperature is less than 100° C., it may be difficult to absorb a sufficient amount of the superfine goethite particles into the acicular goethite particles, thereby failing to obtain particles having a uniform particle size. On the other hand, when the heating temperature is more than 200° C., the acicular goethite particles is heat-dehydrated under such a condition that the superfine goethite particles still remain therein. As a result, the sintering between the particles is disadvantageously caused, thereby also failing to obtain particles having a uniform particle size. With the consideration of industrial productivity or the like, the heat-treating temperature is preferably 120 to 200° C.

The heat-treating time is preferably 5 to 60 minutes.

The acicular goethite particles obtained by heat-treating at a temperature of 100 to 200° C., have an average major axis diameter of usually 0.01 to 0.2 $\mu$m, and a geometrical standard deviation of minor axis diameter of usually not more than 1.30.

Especially, it is preferred that the acicular goethite particles obtained by heat-treating at a temperature of 100 to 200° C., have an average major axis diameter of usually 0.01 to 0.2 $\mu$m, an average minor axis diameter of usually 0.007 to 0.18 $\mu$m, a geometrical standard deviation of major axis diameter of usually not more than 1.50, a geometrical standard deviation of minor axis diameter of usually not more than 1.30, and a BET specific surface area ($S_{BET}$) of usually 50 to 250 m$^2$/g.

Especially, it is preferred that the acicular goethite particles which substantially uniformly contain aluminum within the particle as starting particles and are obtained by heat-treating at a temperature of 100 to 200° C., have an average major axis diameter of usually 0.01 to 0.20 and a geometrical standard deviation of a minor axis diameter of usually not more than 1.30, and containing aluminum in amount of 0.05 to 50% by weight (calculated as Al) based on the total weight of the particles.

The acicular goethite particles which substantially uniformly contain aluminum within the particle as starting particles and are obtained by heat-treating at a temperature of 100 to 200° C., have an average major axis diameter of usually 0.01 to 0.20, an average minor axis diameter of usually 0.007 to 0.18 μm, a geometrical standard deviation of a major axis diameter of usually not more than 1.50, a geometrical standard deviation of a minor axis diameter of usually not more than 1.30, and a BET specific surface area ($S_{BET}$) of usually 50 to 250 m²/g, and containing aluminum in amount of 0.05 to 50% by weight (calculated as Al) based on the total weight of the particles.

By subjecting the thus obtained acicular goethite particles to heat-dehydrating treatment at 550 to 850° C. as described above, there can be obtained the aimed acicular hematite particles according to the present invention.

Incidentally, as the acicular hematite particles according to the present invention, it is preferred high density acicular hematite particles obtained by heat-dehydrating at a temperature of 250 to 500° C. the acicular goethite particles obtained by heat-treating at a temperature of 100 to 200° C., thereby producing low density acicular hematite particles, and by heat-treating the thus obtained low density acicular hematite particles at a temperature of 550 to 850° C.

Preferably, the acicular hematite particles for a non-magnetic undercoat layer of a magnetic recording medium according to the present invention, may be coated with at least one compound selected from the group consisting of hydroxides of aluminum, oxides of aluminum, hydroxides of silicon and oxides of silicon, if required.

In order to coat the acicular hematite particles, an aluminum compound and/or a silicon compound is added to an aqueous suspension containing the acicular hematite particles after the acid-dissolving treatment or an aqueous suspension which is obtained by dispersing the cake, slurry or dried particles of the acicular hematite particles into an aqueous solution, and mixed under stirring. After mixing and stirring, the pH value of the mixed solution is adjusted by using an alkali or acid, if necessary. The acicular hematite particles thus coated with at least one selected from the group consisting of a hydroxide of aluminum, an oxide of aluminum, a hydroxide of silicon and an oxide of silicon are then filtered out, washed with water, dried and pulverized. They may be further deaerated and compacted, if necessary.

As the aluminum compound for the coating, the same aluminum compounds as those described above as the sintering preventive are usable.

The amount of aluminum compound added is usually 0.01 to 50% by weight (calculated as Al) based on the total weight of the particles. If the amount is less than 0.01% by weight, the dispersibility-improving effect in the vehicle may be insufficient. On the other hand, if the amount exceeds 50% by weight, the coating dispersibility-improving effect becomes saturated, so that it is meaningless to add an aluminum compound more than necessary.

As the silicon compound, the same silicon compounds as those described above as the sintering preventive are usable.

The amount of silicon compound added is 0.01 to 50% by weight (calculated as $SiO_2$) based on the total weight of the particles. If the amount is less than 0.01% by weight, the improvement of the dispersibility in the vehicle may be insufficient. On the other hand, if the amount exceeds 50.00% by weight, the coating dispersibility-improving effect becomes saturated, so that it is meaningless to add an silicon compound more than necessary.

When both an aluminum compound and a silicon compound are used, the amount thereof used is preferably 0.01 to 50% by weight (calculated as Al and $SiO_2$) based on the total weight of the particles.

Next, the magnetic recording medium according to the present invention is described.

The magnetic recording medium according to the present invention comprises:
 a non-magnetic base film;
 a non-magnetic undercoat layer formed on the non-magnetic base film, comprising a binder resin and the acicular hematite particles; and
 a magnetic coating film formed on the non-magnetic undercoat layer, comprising a binder resin and magnetic particles.

The magnetic recording medium according to the present invention has a coercive force of usually 250 to 4000 Oe; a squareness (residual magnetic flux density Br/saturation magnetic flux density Bm) of usually 0.85 to 0.95; a gloss (of the coating film) of usually 122 to 300%; a surface roughness Ra (of the coating film) of usually not more than 12.0 nm; a Young's modulus (relative value to a commercially available video tape: AV T-120 produced by Victor Company of Japan, Limited) of usually not less than 120; and a linear adsorption coefficient (of the coating film) of usually 1.10 to 2.00 $\mu m^{-1}$.

In case of using the acicular hematite particles which substantially uniformly contain aluminum within the particle as non-magnetic particles, the magnetic recording medium according to the present invention has a coercive force of usually 250 to 4000 Oe; a squareness (residual magnetic flux density Br/saturation magnetic flux density Bm) of usually 0.85 to 0.95; a gloss (of the coating film) of usually 126 to 300%; a surface roughness Ra (of the coating film) of usually not more than 12.0 nm; a Young's modulus (relative value to a commercially available video tape: AV T-120 produced by Victor Company of Japan, Limited) of usually not less than 122; and a linear adsorption coefficient (of the coating film) of usually 1.10 to 2.00 $\mu m^{-1}$. As to the durability, the running durability thereof is usually not less than 20 minutes. Also, the scratch resistance thereof is usually A or B, preferably A, when evaluated into four ranks: A (No scratch), B (A few scratches), C (Many scratches) and D (A great many scratches). and D (a great many scratches).

In case of using magnetic iron oxide particles as the magnetic particles, the magnetic properties of the magnetic recording medium according to the present invention are a coercive force of usually 250 to 1700 Oe, preferably 300 to 1700 Oe; a squareness (residual magnetic flux density Br/saturation magnetic flux density Bm) of usually 0.85 to 0.95, preferably 0.86 to 0.95.

In case of using magnetic acicular metal particles containing iron as a main component as the magnetic particles, the magnetic properties of the magnetic recording medium according to the present invention are a coercive force of usually 800 to 3500 Oe, preferably 900 to 3500 Oe; a squareness (residual magnetic flux density Br/saturation magnetic flux density Bm) of usually 0.87 to 0.95, preferably 0.88 to 0.95.

In case of using plate-like magnetoplumbite-type ferrite particles as the magnetic particles, the magnetic properties of the magnetic recording medium according to the present invention are a coercive force of usually 800 to 4000 Oe, preferably 1000 to 4000 Oe; a squareness (residual magnetic flux density Br/saturation magnetic flux density Bm) of usually 0.85 to 0.95, preferably 0.86 to 0.95.

In case of using the acicular hematite particles as defined in first aspect as non-magnetic particles, the magnetic recording medium according to the present invention has a gloss (of the coating film) of usually 122 to 300%, preferably 130 to 300%; a surface roughness Ra (of the coating film) of usually not more than 12.0 nm, preferably 2.0 to 11.8 nm, more preferably 2.0 to 11.5 m; a Young's modulus (relative value to a commercially available video tape: AV T-120 produced by Victor Company of Japan, Limited) of usually 120 to 160, preferably 122 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in first aspect as non-magnetic particles and magnetic acicular metal particles containing iron as a main component as the magnetic particles, the magnetic recording medium according to the present invention has a gloss (of the coating film) of preferably 190 to 300%, more preferably 194 to 300%; a surface roughness Ra (of the coating film) of preferably not more than 10.0 nm, more preferably 2.0 to 9.5 nm.

In case of using the acicular hematite particles as defined in second aspect as non-magnetic particles, the magnetic recording medium according to the present invention has a gloss (of the coating film) of usually 126 to 300%, preferably 135 to 300%; a surface roughness Ra (of the coating film) of usually not more than 12.0 nm, preferably 2.0 to 11.4 nm, more preferably 2.0 to 10.5 nm; a Young's modulus (relative value to a commercially available video tape: AV T-120 produced by Victor Company of Japan, Limited) of usually 122 to 160, preferably 124 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 20 minutes, preferably not less than 22 minutes. Also, the scratch resistance thereof is usually A or B, preferably A.

In case of using the acicular hematite particles as defined in second aspect as non-magnetic particles and magnetic acicular metal particles containing iron as a main component as the magnetic particles, the magnetic recording medium according to the present invention has a gloss (of the coating film) of preferably 192 to 300%, more preferably 196 to 300%; a surface roughness Ra (of the coating film) of preferably not more than 9.8 nm, more preferably 2.0 to 9.3 nm.

In case of using the acicular hematite particles as defined in third aspect as non-magnetic particles, the magnetic recording medium according to the present invention has a gloss (of the coating film) of usually 124 to 300%, preferably 133 to 300%; a surface roughness Ra (of the coating film) of usually not more than 12.0 nm, preferably 2.0 to 11.6 nm, more preferably 2.0 to 11.0 nm; a Young's modulus (relative value to a commercially available video tape: AV T-120 produced by Victor Company of Japan, Limited) of usually 122 to 160, preferably 124 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in third aspect as non-magnetic particles and magnetic acicular metal particles containing iron as a main component as the magnetic particles, the magnetic recording medium according to the present invention has a gloss (of the coating film) of preferably 192 to 300%, more preferably 196 to 300%; a surface roughness Ra (of the coating film) of preferably not more than 9.8 nm, more preferably 2.0 to 9.3 nm.

In case of using the acicular hematite particles as defined in fourth aspect as non-magnetic particles, the magnetic recording medium according to the present invention has a gloss (of the coating film) of usually 128 to 300%, preferably 138 to 300%; a surface roughness Ra (of the coating film) of usually not more than 12.0 nm, preferably 2.0 to 11.2 nm, more preferably 2.0 to 10.2 nm; a Young's modulus (relative value to a commercially available video tape: AV T-120 produced by Victor Company of Japan, Limited) of usually 124 to 160, preferably 128 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 22 minutes, preferably not less than 24 minutes. Also, the scratch resistance thereof is usually A or B, preferably A.

In case of using the acicular hematite particles as defined in fourth aspect as non-magnetic particles and magnetic acicular metal particles containing iron as a main component as the magnetic particles, the magnetic recording medium according to the present invention has a gloss (of the coating film) of preferably 194 to 300%, more preferably 198 to 300%; a surface roughness Ra (of the coating film) of preferably not more than 9.6 nm, more preferably 2.0 to 9.1 nm.

In case of using the acicular hematite particles as defined in fifth aspect as non-magnetic particles, the magnetic recording medium according to the present invention has a gloss (of the coating film) of usually 130 to 300%, preferably 140 to 300%; a surface roughness Ra (of the coating film) of usually not more than 12.0 nm, preferably 2.0 to 11.0 nm, more preferably 2.0 to 10.0 nm; a Young's modulus (relative value to a commercially available video tape: AV T-120 produced by Victor Company of Japan, Limited) of usually 124 to 160, preferably 128 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in fifth aspect as non-magnetic particles and magnetic acicular metal particles containing iron as a main component as the magnetic particles, the magnetic recording medium according to the present invention has a gloss (of the coating film) of preferably 194 to 300%, more preferably 198 to 300%; a surface roughness Ra (of the coating film) of preferably not more than 9.6 nm, more preferably 2.0 to 9.1 nm.

In case of using the acicular hematite particles as defined in sixth aspect as non-magnetic particles, the magnetic recording medium according to the present invention has a gloss (of the coating film) of usually 135 to 300%, preferably 145 to 300%; a surface roughness Ra (of the coating film) of usually not more than 11.6 nm, preferably 2.0 to 10.5 nm, more preferably 2.0 to 9.5 nm; a Young's modulus (relative value to a commercially available video tape: AV T-120 produced by Victor Company of Japan, Limited) of usually 126 to 160, preferably 130 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 23 minutes, preferably not less than 25 minutes. Also, the scratch resistance thereof is usually A or B, preferably A.

In case of using the acicular hematite particles as defined in sixth aspect as non-magnetic particles and magnetic acicular metal particles containing iron as a main component as the magnetic particles, the magnetic recording medium according to the present invention has a gloss (of the coating film) of preferably 196 to 300%, more preferably 200 to 300%; a surface roughness Ra (of the coating film) of preferably not more than 9.4 nm, more preferably 2.0 to 8.9 nm.

In case of using the acicular hematite particles as defined in seventh aspect as non-magnetic particles, the magnetic recording medium according to the present invention has a gloss (of the coating film) of usually 133 to 300%, preferably 143 to 300%; a surface roughness Ra (of the coating film) of usually not more than 11.8 nm, preferably 2.0 to 10.8 nm, more preferably 2.0 to 9.8 nm; a Young's modulus (relative value to a commercially available video tape: AV T-120 produced by Victor Company of Japan, Limited) of usually 126 to 160, preferably 130 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in seventh aspect as non-magnetic particles and magnetic acicular metal particles containing iron as a main component as the magnetic particles, the magnetic recording medium according to the present invention has a gloss (of the coating film) of preferably 196 to 300%, more preferably 200 to 300%; a surface roughness Ra (of the coating film) of preferably not more than 9.4 nm, more preferably 2.0 to 8.9 nm.

In case of using the acicular hematite particles as defined in eighth aspect as non-magnetic particles, the magnetic recording medium according to the present invention has a gloss (of the coating film) of usually 138 to 300%, preferably 148 to 300%; a surface roughness Ra (of the coating film) of usually not more than 11.4 nm, preferably 2.0 to 10.2 nm, more preferably 2.0 to 9.2 nm; a Young's modulus (relative value to a commercially available video tape: AV T-120 produced by Victor Company of Japan, Limited) of usually 128 to 160, preferably 132 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 24 minutes, preferably not less than 26 minutes. Also, the scratch resistance thereof is usually A or B, preferably A.

In case of using the acicular hematite particles as defined in eighth aspect as non-magnetic particles and magnetic acicular metal particles containing iron as a main component as the magnetic particles, the magnetic recording medium according to the present invention has a gloss (of the coating film) of preferably 198 to 300%, more preferably 202 to 300%; a surface roughness Ra (of the coating film) of preferably not more than 9.2 nm, more preferably 2.0 to 8.7 nm.

The non-magnetic substrate according to the present invention comprises:

a non-magnetic base film; and a non-magnetic undercoat layer formed on said non-magnetic base film, comprising a binder resin and the acicular hematite particles.

In case of using the acicular hematite particles as defined in first aspect as non-magnetic particles, the non-magnetic substrate according to the present invention has a gloss (of the coating film) of usually 185 to 300%, preferably 190 to 300%, more preferably 193 to 300%; a surface roughness Ra (of the coating film) of usually 0.5 to 10.0 nm, preferably 0.5 to 9.5 nm, more preferably 0.5 to 9.0 nm; a Young's modulus (relative value to a commercially available video tape: and AV T-120 produced by Victor Company of Japan, Limited) of usually 119 to 160, preferably 120 to 160.

In case of using the acicular hematite particles as defined in second aspect as non-magnetic particles, the non-magnetic substrate according to the present invention has a gloss (of the coating film) of usually 187 to 300%, preferably 193 to 300%, more preferably 195 to 300%; a surface roughness Ra (of the coating film) of usually 0.5 to 9.5 nm, preferably 0.5 to 9.0 nm, more preferably 0.5 to 8.5 nm; a Young's modulus (relative value to a commercially available video tape: and AV T-120 produced by Victor Company of Japan, Limited) of usually 121 to 160, preferably 124 to 160.

In case of using the acicular hematite particles as defined in third aspect as non-magnetic particles, the non-magnetic substrate according to the present invention has a gloss (of the coating film) of usually 190 to 300%, preferably 193 to 300%, more preferably 196 to 300%; a surface roughness Ra (of the coating film) of usually 0.5 to 9.5 nm, preferably 0.5 to 9.0 nm, more preferably 0.5 to 8.5 nm; a Young's modulus (relative value to a commercially available video tape: and AV T-120 produced by Victor Company of Japan, Limited) of usually 120 to 160, preferably 123 to 160.

In case of using the acicular hematite particles as defined in fourth aspect as non-magnetic particles, the non-magnetic substrate according to the present invention has a gloss (of the coating film) of usually 191 to 300%, preferably 194 to 300%, more preferably 197 to 300%; a surface roughness Ra (of the coating film) of usually 0.5 to 9.3 nm, preferably 0.5 to 8.8 nm, more preferably 0.5 to 8.3 nm; a Young's modulus (relative value to a commercially available video tape: and AV T-120 produced by Victor Company of Japan, Limited) of usually 122 to 160, preferably 125 to 160.

In case of using the acicular hematite particles as defined in fifth aspect as non-magnetic particles, the non-magnetic substrate according to the present invention has a gloss (of the coating film) of usually 191 to 300%, preferably 194 to 300%, more preferably 198 to 300%; a surface roughness Ra (of the coating film) of usually 0.5 to 9.2 nm, preferably 0.5 to 8.7 nm, more preferably 0.5 to 8.2 nm; a Young's modulus (relative value to a commercially available video tape: and AV T-120 produced by Victor Company of Japan, Limited) of usually 121 to 160, preferably 123 to 160.

In case of using the acicular hematite particles as defined in sixth aspect as non-magnetic particles, the non-magnetic substrate according to the present invention has a gloss (of the coating film) of usually 194 to 300%, preferably 198 to 300%, more preferably 202 to 300%; a surface roughness Ra (of the coating film) of usually 0.5 to 8.9 nm, preferably 0.5 to 8.5 nm, more preferably 0.5 to 8.0 nm; a Young's modulus (relative value to a commercially available video tape: and AV T-120 produced by Victor Company of Japan, Limited) of usually 124 to 160, preferably 126 to 160.

In case of using the acicular hematite particles as defined in seventh aspect as non-magnetic particles, the non-magnetic substrate according to the present invention has a gloss (of the coating film) of usually 193 to 300%, preferably 196 to 300%, more preferably 200 to 300%; a surface roughness Ra (of the coating film) of usually 0.5 to 9.0 nm, preferably 0.5 to 8.5 nm, more preferably 0.5 to 8.0 nm; a Young's modulus (relative value to a commercially available video tape: and AV T-120 produced by Victor Company of Japan, Limited) of usually 122 to 160, preferably 124 to 160.

In case of using the acicular hematite particles as defined in eighth aspect as non-magnetic particles, the non-magnetic substrate according to the present invention has a gloss (of the coating film) of usually 196 to 300%, preferably 200 to 300%, more preferably 205 to 300%; a surface roughness Ra (of the coating film) of usually 0.5 to 8.7 nm, preferably 0.5 to 8.3 nm, more preferably 0.5 to 7.8 nm; a Young's modulus (relative value to a commercially available video tape: and AV T-120 produced by Victor Company of Japan, Limited) of usually 126 to 160, preferably 128 to 160.

The non-magnetic substrate of the present invention is produced by forming a coating film on the base film and drying the coating film. The coating film is formed by applying a non-magnetic coating composition which contains the acicular hematite particles, a binder resin and a solvent, to the surface of the base film.

As the base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the base film varies depending upon the material, but it is usually about 1.0 to 300 μm, preferably 2.0 to 200 μm. In the case of a magnetic disc, polyethylene terephthalate is usually used as the base film. The thickness thereof is usually 50 to 300 μm, preferably 60 to 200 μm. In the case of a magnetic tape, when polyethylene terephthalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OPO$_2$M$_2$ and —NH$_2$, wherein M represents H, Na or K. With the consideration of the dispersibility of the particles, a binder resin containing a functional group —COOH or —SO$_3$M is preferable.

The mixing ratio of the acicular hematite particles with the binder resin is usually 5 to 2000 parts by weight, preferably 100 to 1000 parts by weight based on 100 parts by weight of the binder resin.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the acicular hematite particles. When the amount of the solvent used is less than 65 parts by weight, the viscosity of the non-magnetic coating composition prepared therefrom becomes too high, thereby making it difficult to apply the non-magnetic coating composition. On the other hand, when the amount of the solvent used is more than 1,000 parts by weight, the amount of the solvent volatilized during the formation of the coating film becomes too large, thereby rendering the coating process industrially disadvantageous.

It is possible to add a lubricant, a polishing agent, an antistatic agent, etc. which are generally used for the production of a magnetic recording medium to the non-magnetic undercoat layer.

The thickness of the non-magnetic undercoat layer obtained by applying a non-magnetic coating composition on the surface of the base film and drying, is usually 0.2 to 10.0 μm, preferably 0.5 to 5.0 μm. If the thickness is less than 0.2 μm, not only it is impossible to ameliorate the surface roughness of the non-magnetic substrate but also the strength is insufficient. If the thickness is more than 10 μm, it is difficult to reduce the thickness of the magnetic recording medium.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the magnetic particles used in the present invention, magnetic particles containing iron as a main component are usable, and there may be exemplified magnetic iron oxide particles such as maghemite particles, magnetite particles and berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; Co modified particles obtained by modifying the said magnetic iron oxide particles with cobalt; magnetic acicular metal particles containing iron as a main component and elements other than Fe at least one selected from the group consisting of Co, Al, Ni, P, Si, Zn, Ti, B, Nd, La and Y, including magnetic acicular iron-based alloy particles; magnetoplumbite-type ferrite particles such as plate-like ferrite particles containing Ba, Sr or Ba-Sr; plate-like magnetoplumbite-type ferrite particles obtained by incorporating divalent metals (such as Co, Ni, Zn, Mg, Mn or the like) or tetravalent metals (such as Ti, Sn, Zr or the like) as a coercive force-reducing agent in the plate-like magnetoplumbite-type ferrite particles; or the like. With the consideration of the short-wavelength recording and the high-density recording, magnetic acicular metal particles containing iron as a main component and magnetic acicular iron-based alloy particles containing elements other than Fe at least one selected from the group consisting of Co, Al, Ni, P, Si, Zn, Si, B, Nd, La, Y or the like are preferable.

The magnetic acicular metal particles containing iron as a main component comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is even more preferable from the point of the durability of the magnetic recording medium. Further, the magnetic acicular metal particles containing iron as a main component comprising iron, Al and at least one rare-earth metal such as Nd, La and Y is most preferable.

The iron content in the particles is the balance, and is preferably 50 to 99% by weight, more preferably 60 to 95% by weight (calculated as Fe) based on the weight of the magnetic acicular metal particles containing iron as a main component.

The magnetic particles containing iron as a main component used in the present invention have an average major axis diameter of usually 0.01 to 0.50 μm, preferably 0.03 to 0.30 μm, an average minor axis diameter of usually 0.0007 to 0.17 μm, preferably 0.003 to 0.10 μm. It is preferred that the shape of the magnetic particles containing iron as a main component is acicular or plate-like. The acicular shape may include not only needle-shape but also spindle-shape, rice ball-shape or the like.

In the case that the shape of the magnetic particles is acicular, the magnetic particles have an aspect ratio of usually not less than 3:1, preferably and not less than 5:1. The upper limit of the aspect ratio is usually 15:1, preferably 10:1 with the consideration of the dispersibility in the vehicle.

In the case that the shape of the magnetic particles is plate-like, the magnetic particles have an aspect ratio (an average plate surface diameter/average plate thickness) of usually not less than 2:1, preferably and not less than 3:1. The upper limit of the aspect ratio is usually 20:1, preferably 15:1 with the consideration of the dispersibility in the vehicle.

The geometrical standard deviation of the major axis diameter of the magnetic particles used in the present invention is preferably not more than 2.50 in. If it exceeds 2.50, the coarse particles existent sometimes exert a deleterious influence on the surface smoothness of the magnetic recording layer. From the point of view of industrial productivity, the lower limit of the geometrical standard deviation of the major axis diameter is preferably 1.01.

As to the magnetic properties of the magnetic particles used in the present invention, the coercive force is usually 250 to 4000 Oe, and the saturation magnetization is usually 40 to 170 emu/g.

As to the magnetic properties of the magnetic iron oxide particles used in the present invention, the coercive force is usually 250 to 1700 Oe, preferably 300 to 1700 Oe, more preferably 350 to 1700 Oe, and the saturation magnetization is usually 60 to 90 emu/g, preferably 65 to 90 emu/g, more preferably 70 to 90 emu/g.

As to the magnetic properties of the magnetic acicular metal particles containing iron as a main component used in the present invention, the coercive force is usually 800 to 3500 Oe, preferably 900 to 3500 Oe, more preferably 1000 to 3500 Oe, and the saturation magnetization is usually 90 to 170 emu/g, preferably 100 to 170 emu/g, more preferably 110 to 170 emu/.

As to the magnetic properties of the magnetoplumbite-type ferrite particles used in the present invention, the coercive force is usually 800 to 4000 Oe, preferably 1000 to 4000 Oe, more preferably 1200 to 4000 Oe, and the saturation magnetization is usually 40 to 70 emu/g, preferably 45 to 70 emu/g, more preferably 50 to 70 emu/g.

As the binder resin for the magnetic recording layer, the same binder resin as that used for the production of the non-magnetic undercoat layer is usable.

The mixing ratio of the magnetic acicular metal particles containing iron as a main component with the binder resin in the magnetic recording layer is usually 200 to 2000 parts by weight, preferably 300 to 1500 parts by weight based on 100 parts by weight of the binder resin.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the magnetic particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

It is possible to add a lubricant, a polishing agent, an antistatic agent, etc., which are generally used for the production of a magnetic recording medium to the magnetic recording layer.

The thickness of the magnetic recording layer obtained by applying the magnetic coating composition on the surface of the non-magnetic undercoat layer and dried, is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.05 to 1.0 $\mu$m.

The important feature of the present invention lies in such a fact that when the acicular hematite particles are acid-dissolving treatment, there can be obtained acicular hematite particles which have such a uniform particle size as being expressed by the geometrical standard deviation of major axis diameter of not more than 1.50 and the geometrical standard deviation of minor axis diameter of preferably not more than 1.35, and are, in particular, excellent in particle size distribution of minor axis diameter thereof.

The reason why the acicular hematite particles according to the present invention can exhibit a uniform particle size, is considered, such that by acid-treating acicular hematite particles in the strongly acidic solution, superfine hematite particles can be removed therefrom, whereby it is possible to obtain acicular goethite particles having a uniform particle size with respect to both major axis diameter and minor axis diameter thereof, because the amount of the superfine hematite particles be reduced.

Further, another important feature of the present invention lies in such a fact that when the acicular goethite particles are heat-treated at a temperature of 100 to 200° C. before subjecting to heat-dehydration treatment, there can be obtained acicular hematite particles which have such a uniform particle size as being expressed by the geometrical standard deviation of major axis diameter of not more than 1.50 and the geometrical standard deviation of minor axis diameter of preferably not more than 1.30, and are, in particular, excellent in particle size distribution of minor axis diameter thereof.

The reason why the acicular hematite particles according to the present invention can exhibit a uniform particle size, is considered, such that by heat-treating acicular goethite particles at a temperature of 100 to 200° C., superfine goethite particles can be absorbed into the acicular goethite particles, whereby it is possible to obtain acicular goethite particles having a uniform particle size with respect to both major axis diameter and minor axis diameter thereof, and further since the amount of the superfine goethite particles be reduced, the sintering between the particles due to the presence of the superfine goethite particles is unlikely to occur upon the subsequent heat-dehydration treatment, whereby it is possible to obtain acicular hematite particles which still maintain the uniform particle size of the acicular goethite particles.

In the magnetic recording medium according to the present invention, when the acicular hematite particles of the present invention are used as non-magnetic particles for non-magnetic undercoat layer, there can be obtained such a magnetic recording medium having a small light transmittance, a more excellent smooth surface and a high strength.

The reason why the magnetic recording medium according to the present invention can exhibit a more excellent smooth surface, is considered by the present inventors, such that by the synergistic effect of such a uniform particle size as being expressed by the geometrical standard deviation of major axis diameter of not more than 1.50 and the geometrical standard deviation of minor axis diameter of not more than 1.35 which results in less amount of coarse or fine particles, and the BET specific surface area of 35.9 to 150 m$^2$/g which results in less amount of dehydration pores in the particles or on the surfaces of the particles, the acicular hematite non-magnetic undercoat layer can have a more excellent smooth surface.

In the magnetic recording medium according to the present invention, when the acicular hematite particles containing aluminum in specific amount within the particle of the present invention are used as non-magnetic particles for non-magnetic undercoat layer, there can be obtained such a magnetic recording medium having a small light transmittance, a more excellent smooth surface, a high strength and a high durability.

The reason why the strength and the durability of the magnetic recording medium is more enhanced is considered that by using the acicular hematite particles containing aluminum uniformly within the particle, the resin adsorptivity of the acicular hematite particles to the binder resin in the vehicles are enhanced due to the use of the above-described particles, as will be shown in later-described examples, the degree of adhesion of the acicular hematite particles in the non-magnetic undercoat layer or the non-magnetic undercoat layer itself to the base film is enhanced.

In the case where the acicular hematite particles according to the present invention are used as non-magnetic particles for non-magnetic undercoat layer, since the acicular hematite particles contain little amount of fine particle components and have an excellent dispersibility in vehicle, there can be obtained such a non-magnetic undercoat layer which can exhibit an excellent strength and a more excellent smooth surface. In addition, since the acicular hematite particles contain aluminum therewithin, there can be obtained a non-magnetic undercoat layer having a more excellent strength. In the case where the above non-magnetic undercoat layer is used to produce a magnetic recording medium, there can be obtained such a magnetic recording medium which can exhibit a low light transmittance, an excellent smooth surface, a high mechanical strength and a more excellent durability. Accordingly, the acicular hematite particles according to the present invention can be suitably used as non-magnetic particles for a non-magnetic undercoat layer of a high-density magnetic recording medium.

Further, as described above, the magnetic recording medium according to the present invention exhibits a low light transmittance, an excellent smooth surface, a high mechanical strength and an excellent durability and, therefore, can be suitably used as a high-density magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The residue on sieve after the wet-pulverization was obtained by measuring the concentration of the slurry after pulverization by a wet-process in advance, and determining the quantity of the solid content on the sieve remaining after the slurry equivalent to 100 g of the particles content was passed through the sieve of 325 meshes (mesh size: 44 $\mu$m).

(2) The average major axis diameter and the average minor axis diameter of the particles are expressed by the average values of 350 particles measured in the photograph obtained by magnifying an electron micrograph (×30000) by 4 times in the vertical and horizontal directions, respectively.

(3) The aspect ratio is the ratio of the average major axis diameter and the average minor axis diameter.

(4) The geometrical standard deviation for particle size distribution of the major axis diameter and minor axis diameter was obtained by the following method.

The major axis diameters and minor axis diameters of the particles were measured from the magnified electron microphotograph in the above-mentioned (2). The actual major axis diameters and minor axis diameters of the particles and the number of particles were obtained from the calculation on the basis of the measured values. On logarithmico-normal probability paper, the major axis diameters or minor axis diameters were plotted at regular intervals on the abscissa-axis and the accumulative number of particles belonging to each interval of the major axis diameters or minor axis diameters was plotted by percentage on the ordinate-axis by a statistical technique. The major axis diameters or minor axis diameters corresponding to the number of particles of 50% and 84.13%, respectively, were read from the graph, and each geometrical standard deviation was measured from the following formulae:

Geometrical standard deviation of the major axis diameter or minor axis diameter={major axis diameter ($\mu$m) or minor axis diameter ($\mu$m) corresponding to 84.13% under integration sieve}/{major axis diameter or minor axis diameter (geometrical average diameter) corresponding to 50% under integration sieve}.

The smaller the geometrical standard deviation, the more excellent the particle size distribution of the major axis diameters and minor axis diameters of the particles.

(5) The specific surface area is expressed by the value measured by a BET method.

(6) The degree of denseness of the particles is represented by $S_{BET}/S_{TEM}$ value as described above. $S_{BET}$ is a specific surface area measured by the above-described BET method. $S_{TEM}$ is a value calculated from the average major axis diameter d cm and the average minor axis diameter w cm measured from the electron microphotograph described in (2) on the assumption that a particle is a rectangular parallelopiped in accordance with the following formula:

$$S_{TEM}(m^2/g)=\{(4\cdot d\cdot w+2w^2)/(d\cdot w^2\cdot \rho_p)\}\times 10^{-4}$$

wherein $\rho_p$ the true specific gravity of the hematite particles, and 5.2 g/cm$^3$ was used.

(7) The content of each of Al, Si, P, Co, Ti and Ni in and/or on the particle was measured according to JIS K0119 using "fluorescent X-ray spectroscopy device 3063 M" (manufactured by RIGAKU DENKI KOGYO CO., LTD.).

(8) The viscosity of the coating composition was obtained by measuring the viscosity of the coating composition at 25° C. at a shear rate D of 1.92 sec$^{-1}$ by using "E type viscometer EMD-R" (manufactured by Tokyo Keiki, Co., Ltd.).

(9) The resin adsorptivity of the particles represents the degree at which a resin is adsorbed to the particles. The closer to 100 the value obtained in the following manner, the firmer the resin adsorption to the particles surfaces in the vehicle and the more favorable.

The resin adsorption Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mm$_\phi$ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorption Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%)=[(Wa-We)/Wa]\times 100.$$

(10) The gloss of the surface of the coating film of each of the non-magnetic undercoat layer and the magnetic recording layer was measured at an angle of incidence of 45° C. by "glossmeter UGV-5D" (manufactured by Suga Shikenki, Co., Ltd.).

(11) The surface roughness Ra is expressed by the average value of the center-line average roughness of the profile curve of the surface of the coating film by using "Surfcom-575A" (manufactured by Tokyo Seimitsu Co., Ltd.).

(12) The durability of the magnetic medium was evaluated by the following running durability and the scratch resistance.

The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch
B: A few scratches
C: Many scratches
D: A great many scratches

(13) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(14) The magnetic properties of the magnetic particles and magnetic recording medium were measured under an external magnetic field of 10 kOe by "Vibration Sample Magnetometer VSM-3S-15 (manufactured by Toei Kogyo, Co., Ltd.)".

(15) The light transmittance is expressed by the linear adsorption coefficient measured by using "UV-Vis Recording Spectrophotometer UV-2100" (manufactured by Shimazu Seisakusho, Ltd.). The linear adsorption coefficient is defined by the following formula, and the larger the value, the more difficult it is for the magnetic recording medium to transmit light:

Linear adsorption coefficient $(\mu m^{-1})=\{1n(1/t)\}/FT$ wherein t represents a light transmittance (–) at $\lambda=900$ nm, and FT represents thickness ($\mu$m) of the coating composition of the film used for the measurement.

(16) The thickness of each of the base film, the non-magnetic undercoat layer and the magnetic recording layer constituting the magnetic recording medium was measured in the following manner by using "Digital Electronic Micrometer R351C" (manufactured by Anritsu Corp.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1
<Production of Spindle-shaped Hematite Particles>

1200 g of spindle-shaped goethite particles obtained by the above production method (B) of goethite particles using a ferrous sulfate aqueous solution and a sodium carbonate aqueous solution (average major axis diameter: 0.164 $\mu$m, average minor axis diameter: 0.0213 $\mu$m, aspect ratio: 7.7:1, geometrical standard deviation of major axis diameter: 1.33, geometrical standard deviation of minor axis diameter: 1.40, BET specific surface area: 146.8 m$^2$/g) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 42 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles coated with an oxide of silicon. The silicon content was 0.91% by weight (calculated as $SiO_2$).

1000 g of the spindle-shaped goethite particles obtained were charged into a stainless steel rotary furnace, and heat-dehydrated in the air at 340° C. for 30 minutes while rotating the furnace, to obtain low-density spindle-shaped hematite particles. The thus obtained low-density spindle-shaped hematite particles had an average major axis diameter of 0.141 $\mu$m, an average minor axis diameter of 0.0192 $\mu$m, an aspect ratio of 7.3:1, a geometrical standard deviation of major axis diameter of 1.40, a geometrical standard deviation of minor axis diameter of 1.36, a BET specific surface area of 179.1 m$^2$/g and a $S_{BET}/S_{TEM}$ value of densification of 4.18.

850 g of the low-density spindle-shaped hematite particles were then charged into a ceramic rotary furnace, and heat-treated in the air at 630° C. for 20 minutes while rotating the furnace so as to fill in dehydration pores. The resultant high-density spindle-shaped hematite particles had an average major axis diameter of 0.134 μm, an average minor axis diameter of 0.0196 μm, an aspect ratio of 6.8:1, a geometrical standard deviation of major axis diameter of 1.40, a geometrical standard deviation of minor axis diameter of 1.36, a BET specific surface area ($S_{BET}$) of 53.1 m$^2$/g and a $S_{BET}/S_{TEM}$ value of densification of 1.26. The silicon content was 1.00% by weight (calculated as $SiO_2$).

After 800 g of the high-density spindle-shaped hematite particles obtained were roughly pulverized by a Nara mill in advance, the obtained high-density spindle-shaped hematite particles were charged into 4.7 liter of pure water and deagglomerated by a homomixer (manufactured by Tokushu-kika Kogyo, CO., Ltd.) for 60 minutes.

The slurry of the high-density spindle-shaped hematite particles obtained was then dispersed for 3 hours at an axial rotation frequency of 2000 rpm while being circulated by a horizontal SGM (Dispermat SL, manufactured by S.C. Adichem, CO., Ltd.). The high-density spindle-shaped hematite particles in the slurry remaining on a sieve of 325 meshes (mesh size: 44 μm) was 0% by weight.

<Dissolving Treatment with Acid>

The slurry of the high-density spindle-shaped hematite particles obtained was mixed with water, thereby adjusting the concentration of the slurry to 100 g/liter. A 70% aqueous sulfuric acid solution was added to 7 liter of the slurry under stirring so as to adjust the sulfuric acid concentration to 1.3 N and the pH value to 0.59. The slurry was then heated to 80° C. under stirring, and was held for 5 hours at 80° C., thereby dissolving 30.3% by weight of the spindle-shaped hematite particles based on the total weight of the spindle-shaped hematite in the slurry.

The slurry was filtered to separate a filtrate (aqueous acid solution of iron sulfate) therefrom. The slurry from which the filtrate had been separated, was then washed with water by a decantation method and the pH value of the slurry was adjusted to 5.0. When the concentration of the slurry at this point was checked so as to ensure the accuracy, it was 68 g/liter.

2 liter of the obtained slurry was filtered through a Buchner filter, and pure water was passed until the electric conductivity of the filtrate became not more than 30 μs. The high-density spindle-shaped hematite particles were then dried by an ordinary method and pulverized so as to obtain the high-density spindle-shaped hematite particles. The high-density spindle-shaped hematite particles obtained had an average major axis diameter of 0.129 μm, an average minor axis diameter of 0.0182 μm, an aspect ratio of 7.1:1, a geometric standard deviation of major axis diameter of 1.35, a geometric standard deviation of major axis diameter of 1.34, a BET specific surface area ($S_{BET}$) of 55.6 m$^2$/g and a $S_{BET}/S_{TEM}$ value of densification of 1.23.

Example 2

<Production of Non-magnetic Substrate: Formation of Non-magnetic Undercoat Layer on Base Film>

12 g of the high-density spindle-shaped hematite particles obtained in the above were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene= 1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition containing the high-density spindle-shaped hematite particles was as follows:

| | |
|---|---|
| High-density spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The non-magnetic coating composition obtained was applied to a polyethylene terephthalate film of 12 μm thick to a thickness of 55 μm by an applicator, and the coating film was then dried, thereby forming a non-magnetic undercoat layer. The thickness of the non-magnetic undercoat layer was 3.3 μm.

The non-magnetic undercoat layer produced from the high-density spindle-shaped hematite particles as the non-magnetic particles had a gloss of 196%, and a surface roughness Ra of 7.2 nm. The Young's modulus (relative value) thereof was 133.

Example 3

<Production of Magnetic Recording Medium: Formation of Magnetic Recording Layer>

12 g of magnetic acicular metal particles containing iron as a main component (average major axis diameter: 0.116 μm, average minor axis diameter: 0.0155 μm, a geometrical standard deviation of major axis diameter of 1.38, aspect ratio: 7.5:1, coercive force: 1913 Oe, saturation magnetization: 135.2 emu/g), 1.2 g of a polishing agent (AKP-30: trade name, produced by Sumitomo Chemical Co., Ltd.), 0.12 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |

| | |
|---|---|
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.0 μm.

The coercive force Hc of the magnetic tape produced by forming a magnetic recording layer on the non-magnetic undercoat layer was 1985 Oe, the squareness (Br/Bm) thereof was 0.87, the gloss thereof was 203%, the surface roughness Ra thereof was 7.2 nm, the Young's modulus (relative value) thereof was 135, the linear absorption coefficient thereof was 1.24 μm$^{-1}$.

Example 4
<Production of Spindle-shaped Hematite Particles>

1200 g of spindle-shaped goethite particles obtained by the above production method (B) of goethite particles using a ferrous sulfate aqueous solution, a sodium carbonate aqueous solution and aluminum sulfate aqueous solution, and containing aluminum in an amount of 1.12% by weight (calculated as Al) based on the total weight of the particles, uniformly within the particles (average major axis diameter: 0.167 μm, average minor axis diameter: 0.0196 μm, aspect ratio: 8.5:1, geometrical standard deviation of major axis diameter: 1.32, geometrical standard deviation of minor axis diameter: 1.38, BET specific surface area: 165.3 m$^2$/g) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 24 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles which substantially uniformly contain aluminum within the particle, coated with an oxide of silicon. The silicon content was 0.52% by weight (calculated as SiO$_2$).

1000 g of the spindle-shaped goethite particles which substantially uniformly contain aluminum within the particle, obtained were charged into a stainless steel rotary furnace, and heat-dehydrated in the air at 340° C. for 30 minutes while rotating the furnace, to obtain low-density spindle-shaped hematite particles which substantially uniformly contain aluminum within the particle. The thus obtained low-density spindle-shaped hematite particles which substantially uniformly contain aluminum within the particle, had an average major axial diameter of 0.143 μm, an average minor axial diameter of 0.0191 μm, a geometric standard deviation of major axis diameter of 1.32, a geometric standard deviation of minor axis diameter of 1.38, an aspect ratio of 7.5:1, a BET specific surface area of 188.9 m$^2$/g and a $S_{BET}/S_{TEM}$ value of densification of 4.40.

850 g of the low-density spindle-shaped hematite particles which substantially uniformly contain aluminum within the particle, were then charged into a ceramic rotary furnace, and heat-treated in the air at 630° C. for 20 minutes while rotating the furnace so as to fill in dehydration pores. The resultant high-density spindle-shaped hematite particles which substantially uniformly contain aluminum within the particle, had an average major axial diameter of 0.141 μm, an average minor axial diameter of 0.0192 μm, a geometric standard deviation of major axis diameter of 1.33, a geometric standard deviation of minor axis diameter of 1.37, an aspect ratio of 7.3:1, a BET specific surface area ($S_{BET}$) of 56.1 m$^2$/g and a $S_{BET}/S_{TEM}$ value of densification of 1.31. The silicon content was 0.57% by weight (calculated as SiO$_2$) and the aluminum content was 1.23% by weight (calculated as Al).

After 800 g of the high-density spindle-shaped hematite particles which substantially uniformly contain aluminum within the particle, obtained were roughly pulverized by a Nara mill in advance, the obtained high-density spindle-shaped hematite particles which substantially uniformly contain aluminum within the particle, were charged into 4.7 liter of pure water and deagglomerated by a homomixer (manufactured by Tokushu-kika Kogyo, CO., Ltd.) for 60 minutes.

The slurry of the high-density spindle-shaped hematite particles which substantially uniformly contain aluminum within the particle, obtained was then dispersed for 3 hours at an axial rotation frequency of 2000 rpm while being circulated by a horizontal SGM (Dispermat SL, manufactured by S.C. Adichem, CO., Ltd.). The high-density spindle-shaped hematite particles which substantially uniformly contain aluminum within the particle, in the slurry remaining on a sieve of 325 meshes (mesh size: 44 μm) was 0% by weight.

<Dissolving Treatment with Acid>

The slurry of the high-density spindle-shaped hematite particles which substantially uniformly contain aluminum within the particle, obtained was mixed with water, thereby adjusting the concentration of the slurry to 100 g/liter. A 70% aqueous sulfuric acid solution was added to 7 liter of the slurry under stirring so as to adjust the sulfuric acid concentration to 1.3N and the pH value to 0.58. The slurry was then heated to 80° C. under stirring, and was held for 5 hours at 80° C., thereby dissolving 29.5% by weight of the high density spindle-shaped hematite particles which substantially uniformly contain aluminum within the particle, based on the total weight of the spindle-shaped hematite particles in the slurry.

The slurry was filtered to separate a filtrate (aqueous acid solution of iron sulfate) therefrom. The slurry from which the filtrate had been separated, was then washed with water by a decantation method and the pH value of the slurry was adjusted to 5.0. When the concentration of the slurry at this point was checked so as to ensure the accuracy, it was 68 g/liter.

A part of the water-washed slurry obtained was separated and filtered through a Buchner filter, and pure water was passed until the electric conductivity of the filtrate became not more than 30 μs. The resultant particles were then dried by an ordinary method and pulverized so as to obtain the spindle-shaped hematite particles which substantially uniformly contain aluminum within the particle. The spindle-shaped hematite particles which substantially uniformly contain aluminum within the particle, obtained had an average major axis diameter of 0.133 μm, an average minor axis diameter of 0.0182 μm, an aspect ratio of 7.3:1, a geometric standard deviation of major axis diameter of 1.34, a geometric standard deviation of minor axis diameter of 1.33, a BET specific surface area ($S_{BET}$) of 60.3 m$^2$/g, a $S_{BET}/S_{TEM}$ value of densification of 1.34, an aluminum content of 1.23% by weight (calculated as Al), and a resin adsorption of 77.8%.

Example 5
<Production of Non-magnetic Substrate: Formation of Non-magnetic Undercoat Layer on Base Film>

The same procedure as defined in Example 2 was conducted except that the spindle-shaped hematite particles which substantially uniformly contain aluminum within the particle, obtained in Example 4 were used instead of the spindle-shaped hematite particles, thereby obtaining a non-magnetic undercoat layer. The thickness of the non-magnetic undercoat layer was 3.5 μm.

The thus obtained non-magnetic undercoat layer had a gloss of 211%, a surface roughness Ra of 6.2 nm, and a Young's modulus (relative value) of coating film of 126.

Example 6
<Production of Magnetic Recording Medium: Formation of Magnetic Recording Layer>

The same procedure as defined in Example 3 was conducted except that the magnetic particles were changed to acicular magnetic metal particles (average major axis diameter: 0.125 μm, average minor axis diameter: 0.0160 μm, a geometric standard deviation of major axis diameter of 1.36, aspect ratio: 7.8:1, coercive force: 1903 Oe, saturation magnetization: 136.5 emu/g), and that the non-magnetic undercoat layer obtained in Example 5 was used, thereby producing a magnetic tape.

The thickness of the magnetic coating film was 1.1 μm.

The thus obtained magnetic tape had a coercive force Hc of 1989 Oe, a squareness (Br/Bm) of 0.87, a gloss of 231%, a surface roughness Ra of 6.2 nm, a Young's modulus (relative value) of coating film of 130, a linear absorption of 1.24 μm$^{-1}$, a running durability of 27.6 minutes and a scratch resistance of A.

Example 7
<Production of Spindle-shaped Hematite Particles>

1200 g of spindle-shaped goethite particles obtained by the above production method (B) of goethite particles using a ferrous sulfate aqueous solution and a sodium carbonate aqueous solution (average major axis diameter: 0.0812 μm, geometrical standard deviation of major axis diameter: 1.53, average minor axis diameter: 0.0110 μm, geometrical standard deviation of minor axis diameter: 1.37, aspect ratio: 7.4:1, BET specific surface area: 168.9 m$^2$/g) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 36.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles coated with an oxide of silicon. The silicon content was 0.78% by weight (calculated as SiO$_2$).

The spindle-shaped goethite particles obtained were charged into a heat treatment metal furnace, and heat-treated therein at 150° C. for 30 minutes, thereby absorbing superfine goethite particles present within the spindle-shaped goethite particles, into the spindle-shaped goethite particles.

The thus obtained spindle-shaped goethite particles were charged again into the heat treatment metal furnace, and heat-dehydrated therein at 320° C. for 30 minutes, thereby obtaining low-density spindle-shaped hematite particles. The thus obtained low-density spindle-shaped hematite particles had an average major axis diameter of 0.0736 μm, a geometrical standard deviation of major axis diameter of 1.38, an average minor axis diameter of 0.0118 μm, a geometrical standard deviation of minor axis diameter of 1.16, an aspect ratio of 6.2:1, a BET specific surface area of 190.3 m$^2$/g, a $S_{BET}/S_{TEM}$ value of densification of 2.70. The silicon content was 0.78% by weight (calculated as SiO$_2$).

850 g of the low-density spindle-shaped hematite particles were then charged into a ceramic rotary furnace, and heat-treated in the air at 650° C. for 30 minutes while rotating the furnace so as to fill in dehydration pores. The resultant high-density spindle-shaped hematite particles had an average major axis diameter of 0.0727 μm, a geometrical standard deviation of major axis diameter of 1.38, an average minor axis diameter of 0.0120 μm, a geometrical standard deviation of minor axis diameter of 1.17, an aspect ratio of 6.1:1, a BET specific surface area of 86.8 m$^2$/g, a $S_{BET}/S_{TEM}$ value of densification of 1.25. The silicon content was 0.87% by weight (calculated as SiO$_2$).

Example 8
<Production of Non-magnetic Substrate: Formation of Non-magnetic Undercoat on Base Film>

The same procedure as defined in Example 2 was conducted except that the spindle-shaped hematite particles obtained in Example 7 were used instead of the spindle-shaped hematite particles, thereby obtaining a non-magnetic undercoat layer. The thickness of non-magnetic undercoat layer was 3.3 μm.

The thus obtained non-magnetic undercoat layer had a gloss of 213%, a surface roughness Ra of 6.0 nm, and a Young's modulus (relative value) of coating film of 131.

Example 9
<Production of Magnetic Recording Medium: Formation of Magnetic Recording Layer>

The same procedure as defined in Example 3 was conducted except that the magnetic particles were changed to acicular magnetic metal particles (average major axis diameter: 0.103 μm, average minor axis diameter: 0.0152 μm, a geometric standard deviation of major axis diameter of 1.38, aspect ratio: 6.8:1, coercive force: 1910 Oe, saturation magnetization: 136 emu/g), and that the non-magnetic undercoat layer obtained in Example 8 was used, thereby producing a magnetic tape.

The thickness of the magnetic coating film was 1.1 μm.

The thus obtained magnetic tape had a coercive force Hc of 2011 Oe, a squareness (Br/Bm) of 0.88, a gloss of 235%, a surface roughness Ra of 6.0 nm, a Young's modulus (relative value) of coating film of 133, a linear absorption of 1.25 μm$^{-1}$.

Example 10

<Production of Spindle-shaped Hematite Particles>

1200 g of spindle-shaped goethite particles obtained by the above production method (B) of goethite particles using a ferrous sulfate aqueous solution, a sodium carbonate aqueous solution and aluminum sulfate aqueous solution (average major axis diameter: 0.0846 μm, geometrical standard deviation of major axis diameter: 1.49, average minor axis diameter: 0.0115 μm, geometrical standard deviation of minor axis diameter: 1.38, aspect ratio: 7.4:1, BET specific surface area: 161.6 m$^2$/g, aluminum content: 1.50% by weight (calculated as Al) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 42.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles which substantially uniformly contain aluminum within the particle, coated with an oxide of silicon. The silicon content was 0.90% by weight (calculated as $SiO_2$).

The spindle-shaped goethite particles which substantially uniformly contain aluminum within the particle, obtained were charged into a heat treatment metal furnace, and heat-treated therein at 140° C. for 30 minutes, thereby absorbing superfine goethite particles present within the spindle-shaped goethite particles, into the spindle-shaped goethite particles.

The thus obtained spindle-shaped goethite particles which substantially uniformly contain aluminum within the particle, were charged again into the heat treatment metal furnace, and heat-dehydrated therein at 340° C. for 30 minutes, thereby obtaining low-density spindle-shaped hematite particles which substantially uniformly contain aluminum within the particle. The thus obtained low-density spindle-shaped hematite particles which substantially uniformly contain aluminum within the particle, had an average major axis diameter of 0.0793 μm, a geometrical standard deviation of major axis diameter of 1.37, an average minor axis diameter of 0.0119 μm, a geometrical standard deviation of minor axis diameter of 1.23, an aspect ratio of 6.7:1, a BET specific surface area of 181.0 m$^2$/g, a $S_{BET}/S_{TEM}$ value of densification of 2.60. The silicon content was 0.99% by weight (calculated as $SiO_2$) and the aluminum content was 2.35% by weight (calculated as Al).

850 g of the low-density spindle-shaped hematite particles which substantially uniformly contain aluminum within the particle, were then charged into a ceramic rotary furnace, and heat-treated in the air at 650° C. for 30 minutes while rotating the furnace so as to fill in dehydration pores. The resultant high-density spindle-shaped hematite particles which substantially uniformly contain aluminum within the particle, had an average major axis diameter of 0.0753 μm, a geometrical standard deviation of major axis diameter of 1.37, an average minor axis diameter of 0.0122 μm, a geometrical standard deviation of minor axis diameter of 1.24, an aspect ratio of 6.2:1, a BET specific surface area of 83.8 m$^2$/g, a $S_{BET}/S_{TEM}$ value of densification of 1.23. The silicon content was 1.00% by weight (calculated as $SiO_2$) and the aluminum content was 2.35% by weight (calculated as Al).

Example 11

<Production of Non-magnetic Substrate: Formation of Non-magnetic Undercoat Layer on Base Film>

The same procedure as defined in Example 2 was conducted except that the spindle-shaped hematite particles which substantially uniformly contain aluminum within the particle, obtained in Example 10 were used instead of the spindle-shaped hematite particles, thereby obtaining a non-magnetic undercoat layer. The thickness of the non-magnetic undercoat layer was 3.4 μm.

The thus obtained non-magnetic undercoat layer had a gloss of 219%, a surface roughness Ra of 5.8 nm, and a Young's modulus (relative value) of coating film of 132.

Example 12

<Production of Magnetic Recording Medium: Formation of Magnetic Recording Layer>

The same procedure as defined in Example 3 was conducted except that the magnetic particles were changed to acicular magnetic metal particles (average major axis diameter: 0.110 μm, average minor axis diameter: 0.0146 μm, a geometric standard deviation of major axis diameter of 1.38, aspect ratio: 7.5:1, coercive force: 1943 Oe, saturation magnetization: 132 emu/g), and that the non-magnetic undercoat layer obtained in Example 11 was used, thereby producing a magnetic tape.

The thickness of the magnetic coating film was 1.0 μm.

The thus obtained magnetic tape had a coercive force Hc of 2042 Oe, a squareness (Br/Bm) of 0.88, a gloss of 239%, a surface roughness Ra of 5.8 nm, a Young's modulus (relative value) of coating film of 134, a linear absorption of 1.25 μm$^{-1}$, a running durability of 29.6 minutes and a scratch resistance of A.

Examples 13 to 68 and Comparative Examples 1 to 31

<Kinds of Acicular Goethite Particles>

Precursor 1 to 6:

Various properties of acicular goethite particles as a precursor of acicular hematite particles are shown in Table 1.

Examples 13 to 19 and Comparative Examples 1 to 6

<Production of Low-Density Acicular Hematite Particles>

Low-density acicular hematite particles were obtained in the same way as in Example 1 except for varying the kind of acicular goethite particles as a precursor, the kind and amount added of sintering preventive, and heat-dehydration temperature and time. Incidentally, the particles obtained in Comparative Example 4 were goethite particles.

The main producing conditions and various properties are shown in Tables 2 to 3.

Examples 20 to 26 and Comparative Examples 7 to 11

<Production of High-density Acicular Hematite Particles>

High-density acicular hematite particles were obtained in the same way as in Example 1 except for varying the kind of low-density acicular hematite particles, and heat-treating temperature and time for high densification.

The main producing conditions and various properties are shown in Tables 4 to 5.

Examples 27 to 33 and Comparative Examples 12 to 13

<Acid-dissolving Treatment of Acicular Hematite Particles>

Acicular hematite particles were obtained in the same way as in Example 1 except for varying the kind of high-density acicular hematite particles, use or non-use of the wet pulverization, the acid concentration, the pH value of slurry, and the heating temperature and time.

The main producing conditions and various properties are shown in Tables 6 to 7.

Example 34

<Surface Coating of Acicular Hematite Particles>

The concentration of the slurry having a pH value of 5.0 which was obtained in Example 27 by washing the particles after heat-treatment in an aqueous acid solution, with water by a decantation method, was 68 g/liter. 5 liter of the slurry was re-heated to 60° C., and 126 ml (equivalent to 1.0 wt % (calculated as Al) based on the acicular hematite particles) of a 1.0-N aqueous aluminum acetate solution was added to the slurry, and the mixture was held for 30 minutes. Thereafter, the pH value of the mixture was adjusted to 7.5 by using an aqueous sodium hydroxide solution. The particles were then filtered out, washed with water, dried and pulverized in the same way as in Example 1, thereby obtaining acicular hematite particles coated with a coating material.

The main producing conditions and various properties are shown in Tables 8 and 9.

Examples 35 to 40

Acicular hematite particles coated with a coating material by an ordinary method were obtained in the same way as in Example 34 except for varying the kind of acicular hematite particles and the kind and amount of the coating material.

The main producing conditions and various properties are shown in Tables 8 and 9.

Examples 41 to 54 and Comparative Examples 14 to 22

<Production of Non-magnetic Substrate: Formation of Non-magnetic Undercoat Layer on Non-magnetic Base Film>

By using the acicular hematite particles obtained in Example 27 to 40 and Comparative Examples 1, 3 and 7 to 13, non-magnetic undercoat layers were formed in the same way as in Example 2.

The main producing conditions and various properties are shown in Table 10.

<Production of Magnetic Recording Medium: Formation of Magnetic Coating Film>

Magnetic particles used for forming the magnetic recording layers and various properties thereof are shown in Table 11.

Examples 55 to 68 and Comparative Examples 23 to 31

Magnetic recording media were produced in the same way as in Example 3 except for varying the kind of non-magnetic undercoat layer and the kind of magnetic particles.

The main producing conditions and various properties are shown in Tables 12 and 13.

Examples 69 to 124 and Comparative Examples 32 to 62

<Kinds of Acicular Goethite Particles which Substantially Uniformly Contain Aluminum within the Particle>

Precursor 7 to 13:

Various properties of acicular goethite particles as a precursor of acicular hematite particles are shown in Table 14.

Examples 69 to 75 and Comparative Examples 32 to 37

<Production of Low-density Acicular Hematite Particles which Substantially Uniformly Contain Aluminum within the Particle>

Low-density acicular hematite particles were obtained in the same way as in Example 4 except for varying the kind of acicular goethite particles as a precursor, the kind and amount added of sintering preventive, and heat-dehydration temperature and time. Incidentally, the particles obtained in Comparative Example 35 were goethite particles.

The main producing conditions and various properties are shown in Tables 15 to 16.

Examples 76 to 82 and Comparative Examples 38 to 42

<Production of High-density Acicular Hematite Particles which Substantially Uniformly Contain Aluminum within the Particle>

High-density acicular hematite particles were obtained in the same way as in Example 4 except for varying the kind of low-density acicular hematite particles, and heat-treating temperature and time for high densification.

The main producing conditions and various properties are shown in Tables 17 to 18.

Examples 83 to 89 and Comparative Examples 43 to 44

<Acid-dissolving Treatment of Acicular Hematite Particles which Substantially Uniformly Contain Aluminum within the Particle>

Acicular hematite particles were obtained in the same way as in Example 4 except for varying the kind of high-density acicular hematite particles, use or non-use of the wet pulverization, the acid concentration, the pH value of slurry, and the heating temperature and time.

The main producing conditions and various properties are shown in Tables 19 to 20.

Example 90

<Surface Coating of Acicular Hematite Particles which Substantially Uniformly Contain Aluminum within the Particle>

The concentration of the slurry having a pH value of 5.0 which was obtained in Example 83 by washing the particles after heat-treatment in an aqueous acid solution, with water by a decantation method, was 67 g/liter. 5 liter of the slurry was re-heated to 60° C., and 248.1 ml (equivalent to 2.0 wt % (calculated as Al) based on the acicular hematite particles) of a 1.0-N aqueous aluminum acetate solution was added to the slurry, and the mixture was held for 30 minutes. Thereafter, the pH value of the mixture was adjusted to 8.0 by using an aqueous sodium hydroxide solution. The particles were then filtered out, washed with water, dried and pulverized in the same way as in Example 4, thereby obtaining acicular hematite particles coated with a coating material.

The main producing conditions and various properties are shown in Tables 21 and 22.

Examples 91 to 96

Acicular hematite particles coated with a coating material by an ordinary method were obtained in the same way as in Example 90 except for varying the kind of acicular hematite particles and the kind and amount of the coating material.

The main producing conditions and various properties are shown in Tables 21 and 22.

Examples 97 to 110 and Comparative Examples 45 to 53

<Production of Non-magnetic Substrate: Formation of Non-magnetic Undercoat Layer on Non-magnetic Base Film>

By using the acicular hematite particles obtained in Example 83 to 96 and Comparative Examples 32, 34 and 38 to 44, non-magnetic undercoat layers were formed in the same way as in Example 2.

The main producing conditions and various properties are shown in Table 23.

Examples 111 to 124 and Comparative Examples 54 to 62

<Production of Magnetic Recording Medium: Formation of Magnetic Coating Film>

Magnetic recording media were produced in the same way as in Example 3 except for varying the kind of non-magnetic undercoat layer and the kind of magnetic particles.

The main producing conditions and various properties are shown in Tables 24 and 25.

Goethite Particles 1 to 2:

Acicular goethite particles 1 and 2 as pecursors having properties shown in Table 26 were prepared.

Goethite Particles 3 to 5:

Acicular goethite particles 3 to 5 which were subjected to a sintering preventing treatment, were obtained in the same way as in Example 7 except for varying the kind of starting particles and the element and amount of sintering preventive.

Various properties of the obtained acicular goethite particles are shown in Table 27.

<Heat Treatment>

Goethite Particles 6 to 9:

Acicular goethite particles 6 to 9 were obtained in the same way as in Example 7 except for varying the kind of precursors and the heat-treating conditions.

The main producing conditions are shown in Table 28 and various properties of the obtained acicular goethite particles are shown in Table 29.

<Production of Low-density Acicular Hematite Particles>

Hematite Particles 1 to 4:

Low-density acicular hematite particles 1 to 4 were obtained in the same way as in Example 7 except for varying the kind of precursors and the heat-dehydrating conditions.

The main producing conditions are shown in Table 30 and various properties of the obtained low-density acicular hematite particles are shown in Table 31.

Examples 125 to 128 and Comparative Examples 63 to 67

<Production of High-density Acicular Hematite Particles>

High-density acicular hematite particles were obtained in the same way as in Example 7 except for varying the kind of particles to be treated and the heat-treating conditions.

The main producing conditions are shown in Table 32 and various properties of the obtained high-density hematite particles are shown in Table 33.

Example 129

<Surface Coating of Acicular Hematite Particles>

After 700 g of the high-density acicular hematite particles obtained in the Example 125 were roughly pulverized by a Nara mill in advance, the obtained particles were charged into 7 liters of pure water and diagglomerated by a homo-mixer (manufactured by Tokushu-kika Kogyo, Co., Ltd.) for 60 minutes.

The slurry of the acicular hematite particles obtained was then dispersed for 6 hours at an axial rotation frequency of 2000 rpm while being circulated by a horizontal sand grinder (Dispermat SL, manufactured by S.C. Adichem, CO., Ltd.).

The pH value of the obtained slurry containing the acicular hematite particles was adjusted to 4.0 by using a 0.1 N acetic acid aqueous solution. By adding water to the slurry, the concentration of the resultant slurry was adjusted to 45 g/liter. 10 liter of the slurry was re-heated to 60° C., and 500 ml (equivalent to 3.0% by weight (calculated as Al) based on the acicular hematite particles) of a 1.0 mol/liter aqueous aluminum acetate solution was added to the slurry, and the mixture was held for 30 minutes. Thereafter, the pH value of the mixture was adjusted to 7.0 by using aqueous sodium hydroxide solution. After holding the mixture for 30 minutes, the particles were then filtered out, washed with water, dried and, thereby obtaining acicular hematite particles coated with a coating material.

The main producing conditions and various properties are shown in Tables 34 and 35.

Examples 130 to 132

<Surface Coating Treatment of Acicular Hematite Particles>

Acicular hematite particles coated with a coating material were obtained in the same way as in Example 129 except for varying the kind of particles to be treated, the pH value before coating, the kind and amount of additives, and the final pH value.

The main producing conditions are shown in Table 34 and various properties of the obtained acicular hematite particles are shown in Table 35.

Examples 133 to 140 and Comparative Examples 68 to 76

<Production of Non-magnetic Substrate: Formation of Non-magnetic Undercoat Layer on Non-magnetic Base Film>

By using the hematite particles 1 to 4 and the non-magnetic particles obtained in Example 125 to 132 and Comparative Examples 63 to 67, non-magnetic undercoat layers were formed in the same way as in Example 8.

The main producing conditions and various properties of the obtained non-magnetic undercoat layers are shown in Table 36.

Examples 141 to 148 and Comparative Examples 77 and 85

<Production of Magnetic Recording Medium: Formation of Magnetic Coating Film>

Magnetic recording media were produced in the same way as in Example 9 except for varying the kind of non-magnetic undercoat layer and the kind of magnetic particles.

The main producing conditions and various properties of the obtained magnetic recording media are shown in Table 37.

Goethite Particles 10 to 11:

Acicular goethite particles 10 and 11 as precursors having properties shown in Table 38 were prepared.

Goethite Particles 12 to 14:

Acicular goethite particles 12 to 14 which were subjected to a sintering preventing treatment, were obtained in the same way as in Example 10 except for varying the kind of precursors and the element and amount of sintering preventive.

Various properties of the obtained acicular goethite particles are shown in Table 39.

<Heat Treatment>

Goethite Particles 15 to 18:

Acicular goethite particles 15 to 18 were obtained in the same way as in Example 10 except for varying the kind of starting particles and the heat-treating conditions.

The main producing conditions are shown in Table 40 and various properties of the obtained acicular goethite particles are shown in Table 41.

<Production of Low-density Acicular Hematite Particles>

Hematite Particles 5 to 8:

Low-density acicular hematite particles 5 to 8 were obtained in the same way as in Example 10 except for varying the kind of precursors and the heat-dehydrating conditions.

The main producing conditions are shown in Table 42 and various properties of the obtained low-density acicular hematite particles are shown in Table 43.

Examples 149 to 152 and Comparative Examples 86 to 90
<Production of High-density Acicular Hematite Particles>

High-density acicular hematite particles were obtained in the same way as in Example 10 except for varying the kind of particles to be treated and the heat-treating conditions.

The main producing conditions are shown in Table 44 and various properties of the obtained high-density acicular hematite particles are shown in Table 45.

Example 153
<Surface Coating of Acicular Hematite Particles>

After 700 g of the high-density acicular hematite particles obtained in the Example 149 were roughly pulverized by a Nara mill in advance, the obtained particles were charged into 7 liters of pure water and diagglomerated by a homo-mixer (manufactured by Tokushu-kika Kogyo, CO., Ltd.) for 60 minutes.

The slurry of the acicular hematite particles obtained was then dispersed for 6 hours at an axial rotation frequency of 2000 rpm while being circulated by a horizontal sand grinder (Dispermat SL, manufactured by S.C. Adichem, CO., Ltd.).

The pH value of the obtained slurry containing the acicular hematite particles was adjusted to 4.1 by using a 0.1 N acetic acid aqueous solution. By adding water to the slurry, the concentration of the resultant slurry was adjusted to 45 g/liter. 10 liter of the slurry was re-heated to 60° C., and 500 ml (equivalent to 3.0% by weight (calculated as Al) based on the acicular hematite particles) of a 1.0 mol/liter aqueous aluminum acetate solution was added to the slurry, and the mixture was held for 30 minutes. Thereafter, the pH value of the mixture was adjusted to 7.5 by using aqueous sodium hydroxide solution. After holding the mixture for 30 minutes, the particles were then filtered out, washed with water, dried and, thereby obtaining acicular hematite particles coated with a coating material.

The main producing conditions and various properties are shown in Tables 46 and 47.

Examples 154 to 156
<Surface Coating Treatment>

Acicular hematite particles coated with a coating material were obtained in the same way as in Example 153 except for varying the kind of particles to be treated, the pH value before coating, the kind and amount of additives, and the final pH value.

The main producing conditions are shown in Table 46 and various properties of the obtained acicular hematite particles are shown in Table 47.

Examples 157 to 164 and Comparative Examples 91 to 99
<Production of Non-magnetic Substrate: Formation of Non-magnetic Undercoat Layer on Non-magnetic Base Film>

By using the hematite particles 5 to 8 and the non-magnetic particles obtained in Example 149 to 156 and Comparative Examples 86 to 90, non-magnetic undercoat layers were formed in the same way as in Example 11.

The main producing conditions and various properties of the obtained non-magnetic undercoat layers are shown in Table 48.

Examples 165 to 172 and Comparative Examples 100 and 108
<Production of Magnetic Recording Medium: Formation of Magnetic Coating Film>

Magnetic recording media were produced in the same way as in Example 12 except for varying the kind of non-magnetic undercoat layer and the kind of magnetic particles.

The main producing conditions and various properties of the obtained magnetic recording media are shown in Table 49.

TABLE 1

| | | Properties of acicular goethite particles | | Properties of acicular goethite particles | | | |
|---|---|---|---|---|---|---|---|
| | | | | | Geometrical | | |
| Precursors | Method for production of acicular goethite particles | Average major axis diameter (μm) | Geometrical standard deviation of major axis diameter (−) | Average minor axis diameter (μm) | standard deviation of minor axis diameter (−) | Aspect ratio (−) | BET specific surface area (m²/g) |
| Precursor 1 | (B) | 0.181 | 1.32 | 0.0229 | 1.41 | 7.9:1 | 138.2 |
| Precursor 2 | (C) | 0.230 | 1.31 | 0.0277 | 1.38 | 8.3:1 | 98.6 |
| Precursor 3 | (D) | 0.251 | 1.28 | 0.0285 | 1.37 | 8.8:1 | 86.1 |
| Precursor 4 | (A) | 0.200 | 1.36 | 0.0225 | 1.42 | 8.9:1 | 81.8 |
| Precursor 5 | (E) | 0.160 | 1.35 | 0.0210 | 1.38 | 7.6:1 | 163.8 |
| Precursor 6 | (F) | 0.271 | 1.32 | 0.0319 | 1.39 | 8.5:1 | 65.1 |

TABLE 2

| Examples and Comparative Examples | Kind of acicular goethite particles | Anti-sintering treatment | | | Heat-dehydration | |
|---|---|---|---|---|---|---|
| | | Kind | Calculated as | Amount added (wt %) | Temperature (° C.) | Time (min) |
| Example 13 | Particles obtained in Example 1 | Water glass #3 | SiO$_2$ | 1.0 | 330 | 60 |
| Example 14 | Precursor 1 | Water glass #3 Phosphoric acid | SiO$_2$ P | 2.0 1.0 | 360 | 30 |
| Example 15 | Precursor 2 | Phosphoric acid | P | 2.5 | 340 | 60 |
| Example 16 | Precursor 3 | Sodium hexametaphosphate | P | 1.8 | 310 | 120 |
| Example 17 | Precursor 4 | Water glass #3 | SiO$_2$ | 3.0 | 360 | 75 |
| Example 18 | Precursor 5 | Sodium hexametaphosphate | P | 1.0 | 330 | 90 |
| Example 19 | Precursor 6 | Water glass #3 Phosphoric acid | SiO$_2$ P | 3.5 1.5 | 380 | 60 |
| Comparative Example 1 | Particles obtained in Example 1 | — | — | — | 310 | 60 |
| Comparative Example 2 | Particles obtained in Example 1 | — | — | — | 340 | 30 |
| Comparative Example 3 | Particles obtained in Example 1 | Water glass #3 | SiO$_2$ | 1.0 | 320 | 60 |
| Comparative Example 4 | Particles obtained in Example 1 | Phosphoric acid | P | 1.0 | — | — |
| Comparative Example 5 | Particles obtained in Example 1 | Phosphoric acid | P | 1.5 | 350 | 60 |
| Comparative Example 6 | Precursor 6 | Water glass #3 | SiO$_2$ | 1.5 | 330 | 60 |

TABLE 3

| Examples and Comparative Examples | Properties of low-density acicular hematite particles | | | | | | | | Properties of low-density acicular hematite particles Amount of sintering preventive | |
|---|---|---|---|---|---|---|---|---|---|---|
| | Average major axis diameter (μm) | Geometrical standard deviation of major axis (-) | Average minor axis diameter (μm) | Geometrical standard deviation minor axis of diameter (-) | Aspect ratio (-) | $S_{BET}$ (m²/g) | $S_{TEM}$ (m²/g) | $S_{BET}/S_{TEM}$ value (-) | Calculated as | Content (wt %) |
| Ex. 13 | 0.142 | 1.37 | 0.0192 | 1.41 | 7.4:1 | 151.6 | 42.8 | 3.54 | $SiO_2$ | 1.09 |
| Ex. 14 | 0.153 | 1.35 | 0.0196 | 1.41 | 7.8:1 | 179.4 | 41.8 | 4.30 | $SiO_2$ P | 2.77 1.07 |
| Ex. 15 | 0.199 | 1.34 | 0.0246 | 1.38 | 8.1:1 | 143.0 | 33.2 | 4.31 | P | 2.73 |
| Ex. 16 | 0.213 | 1.31 | 0.0250 | 1.37 | 8.5:1 | 123.7 | 32.6 | 3.80 | P | 1.95 |
| Ex. 17 | 0.168 | 1.39 | 0.0195 | 1.42 | 8.6:1 | 143.7 | 41.7 | 3.44 | $SiO_2$ | 3.21 |
| Ex. 18 | 0.126 | 1.36 | 0.0172 | 1.38 | 7.3:1 | 196.6 | 47.8 | 4.12 | P | 1.10 |
| Ex. 19 | 0.230 | 1.35 | 0.0291 | 1.41 | 7.9:1 | 110.5 | 28.1 | 3.93 | $SiO_2$ P | 3.81 1.64 |
| Comp. Ex. 1 | 0.139 | 1.37 | 0.0194 | 1.41 | 7.2:1 | 146.8 | 42.4 | 3.46 | — | — |
| Comp. Ex. 2 | 0.138 | 1.37 | 0.0197 | 1.41 | 7.0:1 | 130.6 | 41.8 | 3.12 | — | — |
| Comp. Ex. 3 | 0.141 | 1.36 | 0.0191 | 1.41 | 7.4:1 | 168.6 | 43.0 | 3.92 | $SiO_2$ | 1.09 |
| Comp. Ex. 4 | — | — | — | — | — | — | — | — | — | — |
| Comp. Ex. 5 | 0.142 | 1.37 | 0.0191 | 1.41 | 7.4:1 | 163.2 | 43.0 | 3.80 | P | 1.64 |
| Comp. Ex. 6 | 0.230 | 1.35 | 0.0291 | 1.41 | 7.9:1 | 91.2 | 28.1 | 3.24 | $SiO_2$ | 1.63 |

TABLE 4

| Examples and Comparative Examples | Kind of low-density acicular hematite particles | Heat treatment for high densification | |
|---|---|---|---|
| | | Temperature (° C.) | Time (min) |
| Example 20 | Example 13 | 680 | 60 |
| Example 21 | Example 14 | 690 | 30 |
| Example 22 | Example 15 | 720 | 20 |
| Example 23 | Example 16 | 660 | 60 |
| Example 24 | Example 17 | 640 | 30 |
| Example 25 | Example 18 | 680 | 60 |
| Example 26 | Example 19 | 730 | 30 |
| Comparative Example 7 | Comparative Example 2 | 680 | 20 |
| Comparative Example 8 | Comparative Example 4 | 670 | 30 |
| Comparative Example 9 | Comparative Example 5 | 450 | 60 |
| Comparative Example 10 | Comparative Example 6 | 850 | 20 |
| Comparative Example 11 | Comparative Example 6 | 680 | 30 |

TABLE 5

| Examples and Comparative Examples | Properties of high-density acicular hematite particles ||||||||| Properties of high-density acicular hematite particles Amount of sintering preventive ||
| | Average major axis diameter (μm) | Geometrical standard deviation of major axis (-) | Average minor axis diameter (μm) | Geometrical standard deviation of major axis (-) | Aspect ratio (-) | $S_{BET}$ (m²/g) | $S_{TEM}$ (m²/g) | $S_{BET}/S_{TEM}$ (-) | Calculated as | Content (wt %) |
|---|---|---|---|---|---|---|---|---|---|---|
| Ex. 20 | 0.136 | 1.37 | 0.0195 | 1.41 | 7.0:1 | 50.4 | 42.3 | 1.19 | $SiO_2$ | 1.08 |
| Ex. 21 | 0.152 | 1.36 | 0.0200 | 1.41 | 7.6:1 | 52.5 | 41.0 | 1.28 | $SiO_2$ P | 2.76 1.07 |
| Ex. 22 | 0.197 | 1.35 | 0.0249 | 1.38 | 7.9:1 | 41.4 | 32.8 | 1.26 | P | 2.73 |
| Ex. 23 | 0.211 | 1.33 | 0.0252 | 1.37 | 8.4:1 | 41.4 | 32.3 | 1.28 | P | 1.95 |
| Ex. 24 | 0.166 | 1.41 | 0.0195 | 1.42 | 8.5:1 | 53.6 | 41.8 | 1.28 | $SiO_2$ | 3.22 |
| Ex. 25 | 0.126 | 1.36 | 0.0173 | 1.38 | 7.3:1 | 55.1 | 47.5 | 1.16 | P | 1.11 |
| Ex. 26 | 0.231 | 1.36 | 0.0296 | 1.41 | 7.8:1 | 42.9 | 27.7 | 1.55 | $SiO_2$ P | 3.82 1.65 |
| Comp. Ex. 7 | 0.070 | 1.83 | 0.0330 | 1.41 | 2.1:1 | 14.6 | 28.8 | 0.51 | — | — |
| Comp. Ex. 8 | 0.126 | 1.64 | 0.0228 | 1.41 | 5.5:1 | 26.7 | 36.8 | 0.73 | — | — |
| Comp. Ex. 9 | 0.142 | 1.37 | 0.0191 | 1.41 | 7.4:1 | 111.6 | 43.0 | 2.60 | P | 1.64 |
| Comp. Ex. 10 | 0.100 | 1.71 | 0.263 | 1.41 | 3.8:1 | 25.6 | 33.1 | 0.77 | $SiO_2$ | 1.63 |
| Comp. Ex. 11 | 0.229 | 1.36 | 0.0292 | 1.41 | 7.8:1 | 41.3 | 28.0 | 1.47 | $SiO_2$ | 1.64 |

TABLE 6

| Examples and Comparative Examples | Kind of high-density acicular hematite particles | Wet-pulverization Use or non-use | Residue on sieve (wt %) | Dissolving treatment with acid |||||
| | | | | Kind of acid | Concentration (N) | Temperature (° C.) | Time (min) | pH value (-) |
|---|---|---|---|---|---|---|---|---|
| Example 27 | Example 20 | used | 0 | Sulfuric acid | 1.4 | 90 | 3.0 | 0.68 |
| Example 28 | Example 21 | used | 0 | Sulfuric acid | 1.5 | 85 | 5.5 | 0.56 |
| Example 29 | Example 22 | used | 0 | Sulfuric acid | 2.0 | 90 | 5.0 | 0.32 |
| Example 30 | Example 23 | used | 0 | Sulfuric acid | 1.5 | 75 | 7.0 | 0.74 |
| Example 31 | Example 24 | used | 0 | Sulfuric acid | 1.2 | 70 | 2.0 | 0.81 |
| Example 32 | Example 25 | used | 0 | Sulfuric acid | 1.3 | 90 | 1.0 | 0.91 |
| Example 33 | Example 26 | used | 0 | Sulfuric acid | 1.5 | 85 | 8.0 | 0.70 |
| Comparative Example 12 | Particles obtained in Example 1 | used | 0 | Sulfuric acid | 3.2E-05 | 80 | 5.0 | 4.5 |
| Comparative Example 13 | Comparative Example 11 | used | 0 | Sulfuric acid | 3.8E-04 | 80 | 7.0 | 3.8 |

TABLE 7

| Examples and Comparative Examples | Properties of high-density acicular hematite particles washed with water after acid-dissolving treatment | | | | | | | | |
|---|---|---|---|---|---|---|---|---|---|
| | Average major axis diameter ($\mu$m) | Geometrical standard deviation of major axis diameter (-) | Average minor axis diameter ($\mu$m) | Geometrical standard deviation of minor axis diameter (-) | Aspect ratio (-) | Amount dissolved (wt %) | $S_{BET}$ (m$^2$/g) | $S_{TEM}$ (m$^2$/g) | $S_{BET}/S_{TEM}$ value (-) |
| Ex. 27 | 0.130 | 1.34 | 0.0188 | 1.34 | 6.9:1 | 26.5 | 55.4 | 43.9 | 1.26 |
| Ex. 28 | 0.143 | 1.32 | 0.0181 | 1.35 | 7.9:1 | 35.6 | 58.1 | 45.2 | 1.29 |
| Ex. 29 | 0.175 | 1.31 | 0.0216 | 1.33 | 8.1:1 | 41.2 | 46.6 | 37.8 | 1.23 |
| Ex. 30 | 0.200 | 1.31 | 0.0235 | 1.32 | 8.5:1 | 21.6 | 43.2 | 34.7 | 1.25 |
| Ex. 31 | 0.164 | 1.39 | 0.0193 | 1.35 | 8.5:1 | 10.2 | 57.8 | 42.2 | 1.37 |
| Ex. 32 | 0.126 | 1.35 | 0.0173 | 1.34 | 7.3:1 | 6.8 | 56.2 | 47.5 | 1.18 |
| Ex. 33 | 0.193 | 1.32 | 0.0238 | 1.35 | 8.1:1 | 49.6 | 46.6 | 34.3 | 1.36 |
| Comp. Ex. 12 | 0.136 | 1.37 | 0.0195 | 1.41 | 7.0:1 | 0.3 | 51.0 | 42.3 | 1.21 |
| Comp. Ex. 13 | 0.230 | 1.36 | 0.0296 | 1.41 | 7.8:1 | 1.2 | 41.8 | 27.7 | 1.51 |

TABLE 8

| Examples | Kind of acicular hematite particles subjected to acid-dissolving treatment | Surface treatment | | Coating material | |
|---|---|---|---|---|---|
| | | Kind of surface treatment material | Amount added (calculated as Al or SiO$_2$) (wt %) | Kind* of coating material | Coating amount (calculated as Al or SiO$_2$) (wt %) |
| Example 34 | Example 27 | Sodium aluminate | 1.0 | A | 0.99 |
| Example 35 | Example 28 | Water glass #3 | 1.0 | S | 0.98 |
| Example 36 | Example 29 | Aluminum sulfate | 1.5 | A | 1.47 |
| | | Water glass #3 | 0.5 | S | 0.48 |
| Example 37 | Example 30 | Aluminum acetate | 5.0 | A | 4.78 |
| Example 38 | Example 31 | Aluminum sulfate | 0.5 | A | 0.49 |
| | | Colloidal silica | 2.0 | S | 1.93 |
| Example 39 | Example 32 | Sodium aluminate | 3.0 | A | 2.89 |
| Example 40 | Example 33 | Sodium aluminate | 15.0 | A | 13.00 |

Note
*: "A" represents a hydroxide of aluminum    "S" represents an oxide of silicon.

TABLE 9

| Examples | Properties of acicular hematite particles washed with water after surface treatment | | | | | | | |
|---|---|---|---|---|---|---|---|---|
| | Average major axis diameter ($\mu$m) | Geometrical standard deviation of major axis diameter (-) | Average minor axis diameter ($\mu$m) | Geometrical standard deviation of minor axis diameter (-) | Aspect ratio (-) | $S_{BET}$ (m$^2$/g) | $S_{TEM}$ (m$^2$/g) | $S_{BET}/S_{TEM}$ value (-) |
| Ex. 34 | 0.130 | 1.34 | 0.0188 | 1.34 | 6.9:1 | 56.1 | 43.9 | 1.28 |
| Ex. 35 | 0.143 | 1.32 | 0.0181 | 1.34 | 7.9:1 | 58.4 | 45.2 | 1.29 |
| Ex. 36 | 0.174 | 1.31 | 0.0216 | 1.33 | 8.1:1 | 47.1 | 37.8 | 1.25 |
| Ex. 37 | 0.199 | 1.31 | 0.0236 | 1.32 | 8.4:4 | 43.1 | 34.5 | 1.25 |
| Ex. 38 | 0.165 | 1.39 | 0.0193 | 1.34 | 8.5:1 | 57.1 | 42.2 | 1.35 |
| Ex. 39 | 0.127 | 1.35 | 0.0172 | 1.34 | 7.4:1 | 55.9 | 47.8 | 1.17 |
| Ex. 40 | 0.194 | 1.32 | 0.0240 | 1.34 | 8.1:1 | 45.3 | 34.0 | 1.33 |

TABLE 10

| Examples and Comparative Examples | Production of non-magnetic coating composition - Kind of acicular hematite particles | Weight ratio of particles to resin (-) | Non-magnetic coating composition Viscosity (cP) | Properties of non-magnetic undercoat layer - Thickness (μm) | Gloss (%) | Surface roughness Ra (nm) | Young's modulus (relative value) |
|---|---|---|---|---|---|---|---|
| Example 41 | Example 27 | 5.0 | 384 | 3.5 | 203 | 6.8 | 121 |
| Example 42 | Example 28 | 5.0 | 410 | 3.4 | 193 | 7.0 | 122 |
| Example 43 | Example 29 | 5.0 | 435 | 3.3 | 201 | 6.8 | 125 |
| Example 44 | Example 30 | 5.0 | 205 | 3.4 | 196 | 7.6 | 135 |
| Example 45 | Example 31 | 5.0 | 384 | 3.3 | 211 | 6.4 | 123 |
| Example 46 | Example 32 | 5.0 | 538 | 3.5 | 216 | 5.8 | 121 |
| Example 47 | Example 33 | 5.0 | 410 | 3.4 | 209 | 6.1 | 131 |
| Example 48 | Example 34 | 5.0 | 384 | 3.5 | 209 | 5.4 | 123 |
| Example 49 | Example 35 | 5.0 | 358 | 3.5 | 198 | 6.6 | 124 |
| Example 50 | Example 36 | 5.0 | 410 | 3.5 | 206 | 6.8 | 127 |
| Example 51 | Example 37 | 5.0 | 230 | 3.4 | 203 | 7.6 | 138 |
| Example 52 | Example 38 | 5.0 | 435 | 3.4 | 216 | 6.9 | 126 |
| Example 53 | Example 39 | 5.0 | 563 | 3.5 | 220 | 5.1 | 121 |
| Example 54 | Example 40 | 5.0 | 207 | 3.4 | 212 | 7.2 | 134 |
| Comparative Example 14 | Comparative Example 1 | 5.0 | 8,320 | 3.6 | 128 | 21.6 | 108 |
| Comparative Example 15 | Comparative Example 3 | 5.0 | 10,880 | 3.8 | 86 | 42.6 | 96 |
| Comparative Example 16 | Comparative Example 7 | 5.0 | 435 | 3.5 | 141 | 19.8 | 109 |
| Comparative Example 17 | Comparative Example 8 | 5.0 | 563 | 3.5 | 176 | 12.4 | 113 |
| Comparative Example 18 | Comparative Example 9 | 5.0 | 5,760 | 3.6 | 121 | 27.6 | 105 |
| Comparative Example 19 | Comparative Example 10 | 5.0 | 230 | 3.5 | 159 | 16.6 | 109 |
| Comparative Example 20 | Comparative Example 11 | 5.0 | 384 | 3.4 | 186 | 9.6 | 116 |
| Comparative Example 21 | Comparative Example 12 | 5.0 | 435 | 3.5 | 188 | 9.3 | 118 |
| Comparative Example 22 | Comparative Example 13 | 5.0 | 410 | 3.5 | 176 | 13.1 | 115 |

TABLE 11

| Magnetic particles | Kind of magnetic particles | Properties of magnetic particles - Average major axis diameter (μm) | Average minor axis diameter (μm) | Aspect ratio (-) | Properties of magnetic particles - Geometrical standard deviation of major axis diameter (-) | Coercive force Hc (Oe) | Saturation magnetization (emu/g) |
|---|---|---|---|---|---|---|---|
| Magnetic particles (1) | Acicular magnetic metal particles containing iron as a main component | 0.127 | 0.0177 | 7.2:1 | 1.39 | 1,915 | 135.6 |
| Magnetic particles (2) | Acicular magnetic metal particles containing iron as a main component | 0.105 | 0.0148 | 7.1:1 | 1.36 | 1,680 | 128.3 |
| Magnetic particles (3) | Co-coated magnetite particles (Co content = 4.82 wt %) | 0.151 | 0.0221 | 6.8:1 | 1.44 | 913 | 81.3 |
| Magnetic particles (4) | Co-coated maghemite particles (Co content = 4.21 wt %) | 0.211 | 0.0285 | 7.4:1 | 1.36 | 845 | 78.9 |
| Magnetic particles (5) | Barium ferrite particles (Ti/Fe = 1.5 mol %, Ni/Fe = 2.8 mol %) | 0.0320 (plate surface diameter) | 0.0090 (thickness) | 3.6:1 (plate ratio) | 1.40 | 2,587 | 50.1 |

TABLE 12

| Examples | Production of magnetic recording medium - Kind of non-magnetic undercoat layer | Kind of magnetic particles | Weight ratio of particles to resin (-) | Properties of magnetic recording medium - Thickness of Magnetic coating film (μm) | Coercive force (Hc) (Oe) | Br/Bm value (-) | Gloss (%) | Properties of magnetic recording medium - Surface roughness Ra (nm) | Young's modulus (relative value) | Linear absorption (μm$^{-1}$) |
|---|---|---|---|---|---|---|---|---|---|---|
| Example 55 | Example 41 | Particles obtained in Example 1 | 5.0 | 1.1 | 1,972 | 0.87 | 223 | 6.8 | 123 | 1.22 |
| Example 56 | Example 42 | Magnetic particles (1) | 5.0 | 1.1 | 1,983 | 0.87 | 212 | 6.8 | 125 | 1.24 |
| Example 57 | Example 43 | Magnetic particles (2) | 5.0 | 1.1 | 1,785 | 0.88 | 221 | 6.4 | 126 | 1.23 |
| Example 58 | Example 44 | Magnetic particles (2) | 5.0 | 1.1 | 1,778 | 0.88 | 218 | 6.8 | 132 | 1.28 |
| Example 59 | Example 45 | Magnetic particles (3) | 5.0 | 1.0 | 983 | 0.89 | 231 | 6.2 | 125 | 1.25 |
| Example 60 | Example 46 | Magnetic particles (3) | 5.0 | 1.1 | 990 | 0.88 | 235 | 5.6 | 123 | 1.21 |
| Example 61 | Example 47 | Magnetic particles (4) | 5.0 | 1.0 | 896 | 0.90 | 221 | 5.8 | 132 | 1.22 |
| Example 62 | Example 48 | Magnetic particles (1) | 5.0 | 1.1 | 1,985 | 0.87 | 224 | 5.5 | 125 | 1.24 |
| Example 63 | Example 49 | Magnetic particles (1) | 5.0 | 1.1 | 1,996 | 0.88 | 210 | 5.6 | 126 | 1.25 |
| Example 64 | Example 50 | Magnetic particles (1) | 5.0 | 1.0 | 1,978 | 0.88 | 221 | 6.2 | 130 | 1.26 |
| Example 65 | Example 51 | Magnetic particles (1) | 5.0 | 1.1 | 1,976 | 0.87 | 216 | 6.8 | 141 | 1.29 |
| Example 66 | Example 52 | Magnetic particles (1) | 5.0 | 1.1 | 1,982 | 0.88 | 231 | 6.1 | 128 | 1.23 |
| Example 67 | Example 53 | Magnetic particles (1) | 5.0 | 1.0 | 1,991 | 0.89 | 240 | 5.0 | 124 | 1.21 |
| Example 68 | Example 54 | Magnetic particles (1) | 5.0 | 1.1 | 1,996 | 0.87 | 231 | 6.4 | 135 | 1.25 |

TABLE 13

| Comparative Examples | Production of magnetic recording medium - Kind of non-magnetic undercoat layer | Kind of magnetic particles | Weight ratio of particles to resin (-) | Properties of magnetic recording medium - Thickness of magnetic coating film (μm) | Coercive force (Hc) (Oe) | Br/Bm value (-) | Gloss (%) | Properties of magnetic recording medium - Surface roughness Ra (nm) | Young's modulus (relative value) | Linear absorption (μm$^{-1}$) |
|---|---|---|---|---|---|---|---|---|---|---|
| Comparative Example 23 | Comparative Example 14 | Magnetic particles (1) | 5.0 | 1.3 | 1,958 | 0.74 | 136 | 18.8 | 116 | 1.03 |
| Comparative Example 24 | Comparative Example 15 | Magnetic particles (1) | 5.0 | 1.2 | 1,941 | 0.78 | 121 | 26.5 | 100 | 1.10 |
| Comparative Example 25 | Comparative Example 16 | Magnetic particles (1) | 5.0 | 1.1 | 1,975 | 0.83 | 171 | 14.4 | 113 | 1.18 |
| Comparative Example 26 | Comparative Example 17 | Magnetic particles (1) | 5.0 | 1.0 | 1,969 | 0.84 | 186 | 10.2 | 116 | 1.16 |
| Comparative Example 27 | Comparative Example 18 | Magnetic particles (1) | 5.0 | 1.3 | 1,953 | 0.76 | 158 | 16.6 | 109 | 1.06 |
| Comparative Example 28 | Comparative Example 19 | Magnetic particles (2) | 5.0 | 1.1 | 1,775 | 0.82 | 183 | 11.2 | 114 | 1.12 |
| Comparative Example 29 | Comparative Example 20 | Magnetic particles (2) | 5.0 | 1.1 | 1,768 | 0.85 | 194 | 8.2 | 119 | 1.19 |
| Comparative Example 30 | Comparative Example 21 | Magnetic particles (2) | 5.0 | 1.0 | 1,732 | 0.85 | 193 | 8.4 | 119 | 1.16 |
| Comparative Example 31 | Comparative Example 22 | Magnetic particles (2) | 5.0 | 1.1 | 1,763 | 0.84 | 180 | 10.2 | 117 | 1.13 |

TABLE 14

| | Production of acicular goethite particles | | Properties of acicular goethite particles | | | | | Properties of acicular goethite particles | | |
|---|---|---|---|---|---|---|---|---|---|---|
| | | | | Geometrical | | Geometrical | | | | |
| Precursors | Production method | Kind of aluminum compound added | Average major axial diameter (μm) | standard deviation of major axis diameter (-) | Average minor axial diameter (μm) | standard deviation of minor axis diameter (-) | Aspect ratio (-) | BET specific surface area (m²/g) | Al content (wt %) |
| Precursor 7 | (B) | Aluminum sulfate | 0.185 | 1.31 | 0.0235 | 1.41 | 7.9:1 | 141.1 | 1.68 |
| Precursor 8 | (C) | Aluminum acetate | 0.233 | 1.33 | 0.0281 | 1.38 | 8.3:1 | 96.1 | 0.82 |
| Precursor 9 | (D) | Aluminum sulfate | 0.246 | 1.26 | 0.0289 | 1.38 | 8.5:1 | 85.8 | 3.58 |
| Precursor 10 | (A) | Sodium aluminate | 0.218 | 1.31 | 0.0228 | 1.39 | 9.6:1 | 73.8 | 1.65 |
| Precursor 11 | (E) | Aluminum sulfate | 0.150 | 1.34 | 0.0205 | 1.41 | 7.3:1 | 171.6 | 2.13 |
| Precursor 12 | (F) | Aluminum sulfate | 0.268 | 1.31 | 0.0331 | 1.41 | 8.1:1 | 60.6 | 0.46 |
| Precursor 13 | (A) | — | 0.333 | 1.42 | 0.0370 | 1.42 | 9.0:1 | 55.8 | — |

TABLE 15

| Examples and Comparative Examples | Kind of acicular goethite particles | Anti-sintering treatment | | | Heat-dehydration | |
|---|---|---|---|---|---|---|
| | | Kind | Calculated as | Amount (wt %) | Temperature (° C.) | Time (min) |
| Example 69 | Particles obtained in Example 4 | Water glass #3 | SiO₂ | 0.5 | 340 | 30 |
| Example 70 | Precursor 7 | Water glass #3 Phosphoric acid | SiO₂ P | 1.0 1.0 | 350 | 60 |
| Example 71 | Precursor 8 | Phosphoric acid | P | 1.5 | 330 | 60 |
| Example 72 | Precursor 9 | Sodium hexametaphosphate | P | 2.0 | 330 | 60 |
| Example 73 | Precursor 10 | Water glass #3 | SiO₂ | 3.0 | 340 | 45 |
| Example 74 | Precursor 11 | Sodium hexametaphosphate | P | 1.5 | 300 | 120 |
| Example 75 | Precursor 12 | Water glass #3 Phosphoric acid | SiO₂ P | 2.0 1.0 | 360 | 30 |
| Comparative Example 32 | Particles obtained in Example 4 | — | — | — | 320 | 60 |
| Comparative Example 33 | Particles obtained in Example 4 | — | — | — | 330 | 45 |
| Comparative Example 34 | Particles obtained in Example 4 | Water glass #3 | SiO₂ | 1.5 | 340 | 30 |
| Comparative Example 35 | Particles obtained in Example 4 | Phosphoric acid | P | 1.5 | — | — |
| Comparative Example 36 | Particles obtained in Example 4 | Phosphoric acid | P | 1.0 | 340 | 30 |
| Comparative Example 37 | Precursor 13 | Water glass #3 | SiO₂ | 1.0 | 320 | 60 |

TABLE 16

| Examples and Comparative Examples | Properties of low-density acicular hematite particles ||||||||| Properties of low-density acicular hematite particles Amount of sintering preventive ||  |
|---|---|---|---|---|---|---|---|---|---|---|---|---|
| | Average major axis diameter (μm) | Geometrical standard deviation of major axis diameter (-) | Average minor axis diameter (μm) | Geometrical standard deviation of minor axis diameter (-) | Aspect ratio (-) | Content of Al (wt %) | $S_{BET}$ (m²/g) | $S_{TEM}$ (m²/g) | $S_{BET}/S_{TEM}$ value (-) | Calculated as | Content (wt %) | Resin adsorption (%) |
| Example 69 | 0.144 | 1.35 | 0.0194 | 1.41 | 7.4:1 | 1.23 | 153.8 | 42.3 | 3.63 | $SiO_2$ | 0.55 | — |
| Example 70 | 0.150 | 1.36 | 0.0191 | 1.38 | 7.9:1 | 1.82 | 149.0 | 42.8 | 3.48 | $SiO_2$ P | 1.07 1.07 | — |
| Example 71 | 0.195 | 1.29 | 0.0240 | 1.38 | 8.1:1 | 0.90 | 115.3 | 34.0 | 3.39 | P | 1.68 | — |
| Example 72 | 0.215 | 1.33 | 0.0250 | 1.39 | 8.6:1 | 3.90 | 111.5 | 32.6 | 3.42 | P | 2.27 | — |
| Example 73 | 0.171 | 1.33 | 0.0193 | 1.41 | 8.9:1 | 1.83 | 95.9 | 42.1 | 2.28 | $SiO_2$ | 3.27 | — |
| Example 74 | 0.120 | 1.36 | 0.0168 | 1.41 | 7.1:1 | 2.35 | 180.6 | 49.0 | 3.69 | P | 1.67 | — |
| Example 75 | 0.234 | 1.33 | 0.0285 | 1.42 | 8.2:1 | 0.51 | 81.2 | 28.6 | 2.84 | $SiO_2$ P | 2.21 1.11 | — |
| Comparative Example 32 | 0.142 | 1.36 | 0.0193 | 1.42 | 7.4:1 | 1.23 | 148.3 | 42.6 | 3.48 | — | — | 46.8 |
| Comparative Example 33 | 0.137 | 1.37 | 0.0198 | 1.42 | 6.9:1 | 1.24 | 136.8 | 41.7 | 3.28 | — | — | — |
| Comparative Example 34 | 0.140 | 1.36 | 0.0193 | 1.41 | 7.3:1 | 1.23 | 151.2 | 42.6 | 3.55 | $SiO_2$ | 1.65 | 40.6 |
| Comparative Example 35 | — | — | — | — | — | — | — | — | — | P | — | — |
| Comparative Example 36 | 0.143 | 1.37 | 0.0190 | 1.42 | 7.5:1 | 1.22 | 158.6 | 43.2 | 3.67 | P | 1.09 | — |
| Comparative Example 37 | 0.256 | 1.42 | 0.0331 | 1.41 | 7.7:1 | — | 78.8 | 24.7 | 3.18 | $SiO_2$ | 1.10 | — |

TABLE 17

| Examples and Comparative Examples | Kind of low-density acicular hematite particles | Heat treatment for high densification ||
|---|---|---|---|
| | | Temperature (° C.) | Time (min) |
| Example 76 | Example 69 | 630 | 60 |
| Example 77 | Example 70 | 650 | 60 |
| Example 78 | Example 71 | 680 | 30 |
| Example 79 | Example 72 | 640 | 75 |
| Example 80 | Example 73 | 680 | 30 |
| Example 81 | Example 74 | 660 | 30 |
| Example 82 | Example 75 | 710 | 20 |
| Comparative Example 38 | Comparative Example 33 | 680 | 30 |
| Comparative Example 39 | Comparative Example 35 | 680 | 30 |
| Comparative Example 40 | Comparative Example 36 | 450 | 30 |
| Comparative Example 41 | Comparative Example 37 | 850 | 30 |
| Comparative Example 42 | Comparative Example 37 | 670 | 30 |

TABLE 18

| Examples and Comparative Examples | Properties of high-density acicular hematite particles | | | | | | | | | Properties of high-density acicular hematite particles | | |
|---|---|---|---|---|---|---|---|---|---|---|---|---|
| | Average major axis diameter (μm) | Geometrical standard deviation of major axis diameter (-) | Average minor axis diameter (μm) | Geometrical standard deviation of minor axis diameter (-) | Aspect ratio (-) | Content of Al (wt %) | $S_{BET}$ (m²/g) | $S_{TEM}$ (m²/g) | $S_{BET}/S_{TEM}$ value (-) | Amount of sintering preventive | | Resin adsorption (%) |
| | | | | | | | | | | Calculated as | Content (wt %) | |
| Example 76 | 0.138 | 1.35 | 0.0193 | 1.41 | 7.2:1 | 1.23 | 51.4 | 42.6 | 1.21 | $SiO_2$ | 0.55 | — |
| Example 77 | 0.151 | 1.36 | 0.0198 | 1.39 | 7.6:1 | 1.82 | 52.6 | 41.4 | 1.27 | $SiO_2$ P | 1.07 1.06 | — |
| Example 78 | 0.195 | 1.31 | 0.0245 | 1.38 | 8.0:1 | 0.90 | 43.1 | 33.4 | 1.29 | P | 1.66 | — |
| Example 79 | 0.213 | 1.34 | 0.0253 | 1.40 | 8.4:1 | 3.91 | 41.2 | 32.2 | 1.28 | P | 2.25 | — |
| Example 80 | 0.168 | 1.34 | 0.0196 | 1.41 | 8.6:1 | 1.83 | 55.2 | 41.5 | 1.33 | $SiO_2$ | 3.29 | — |
| Example 81 | 0.120 | 1.35 | 0.0170 | 1.42 | 7.1:1 | 2.35 | 56.1 | 48.5 | 1.16 | P | 1.68 | — |
| Example 82 | 0.230 | 1.34 | 0.0287 | 1.42 | 8.0:1 | 0.51 | 41.0 | 28.5 | 1.44 | $SiO_2$ P | 2.23 1.10 | — |
| Comparative Example 38 | 0.068 | 1.86 | 0.0333 | 1.56 | 2.0:1 | 1.24 | 13.8 | 28.8 | 0.48 | — | — | 21.8 |
| Comparative Example 39 | 0.128 | 1.65 | 0.0226 | 1.48 | 5.7:1 | 1.23 | 25.6 | 37.0 | 0.69 | — | — | 36.8 |
| Comparative Example 40 | 0.142 | 1.37 | 0.0193 | 1.41 | 7.4:1 | 1.23 | 100.8 | 42.6 | 2.37 | P | 1.09 | 51.3 |
| Comparative Example 41 | 0.110 | 1.68 | 0.0260 | 1.47 | 4.2:1 | — | 26.8 | 33.1 | 0.81 | $SiO_2$ | 1.10 | 36.8 |
| Comparative Example 42 | 0.234 | 1.44 | 0.0295 | 1.42 | 7.9:1 | — | 42.5 | 27.7 | 1.53 | $SiO_2$ | 1.10 | 37.8 |

TABLE 19

| Examples and Comparative Examples | Kind of high-density acicular hematite particles | Wet-pulverization | | Dissolving treatment with acid | | | | |
|---|---|---|---|---|---|---|---|---|
| | | Use or non-use | Residue on sieve (wt %) | Kind of acid | Concentration (N) | Temperature (° C.) | Time (min) | pH value (-) |
| Example 83 | Example 76 | used | 0 | Sulfuric acid | 1.5 | 85 | 5.0 | 0.55 |
| Example 84 | Example 77 | used | 0 | Sulfuric acid | 1.4 | 90 | 6.0 | 0.61 |
| Example 85 | Example 78 | used | 0 | Sulfuric acid | 1.8 | 85 | 7.0 | 0.48 |
| Example 86 | Example 79 | used | 0 | Sulfuric acid | 1.6 | 75 | 5.0 | 0.50 |
| Example 87 | Example 80 | used | 0 | Sulfuric acid | 1.3 | 75 | 2.5 | 0.71 |
| Example 88 | Example 81 | used | 0 | Sulfuric acid | 1.5 | 80 | 2.0 | 0.68 |
| Example 89 | Example 82 | used | 0 | Sulfuric acid | 2.0 | 90 | 7.0 | 0.36 |
| Comparative Example 43 | Particles obtained in Example 4 | used | 0 | Sulfuric acid | 3.0E-05 | 80 | 5.5 | 4.7 |
| Comparative Example 44 | Comparative Example 42 | used | 0 | Sulfuric acid | 4.0E-04 | 80 | 8.0 | 3.4 |

TABLE 20

| Examples and Comparative Examples | Properties of acicular hematite particles washed with water after acid-dissolving treatment | | | | Properties of acicular hematite particles washed with water after acid-dissolving treatment | | | Properties of acicular hematite particles washed with water after acid-dissolving treatment | | | |
|---|---|---|---|---|---|---|---|---|---|---|---|
| | Average major axis diameter ($\mu$m) axis | Geometrical standard deviation of major axis diameter (-) | Average minor axis diameter ($\mu$m) | Geometrical standard deviation of minor diameter (-) | Aspect ratio (-) | Amount dissolved (wt %) | Content of Al (wt %) | $S_{BET}$ (m$^2$/g) | $S_{TEM}$ (m$^2$/g) | $S_{BET}/S_{TEM}$ value (-) | Resin adsorption (%) |
| Example 83 | 0.132 | 1.34 | 0.0187 | 1.34 | 7.1:1 | 25.8 | 1.22 | 56.1 | 44.0 | 1.27 | 68.6 |
| Example 84 | 0.142 | 1.35 | 0.0179 | 1.32 | 7.9:1 | 31.2 | 1.83 | 57.6 | 45.7 | 1.26 | 68.3 |
| Example 85 | 0.173 | 1.31 | 0.0218 | 1.31 | 7.9:1 | 39.8 | 0.91 | 48.2 | 37.5 | 1.29 | 66.8 |
| Example 86 | 0.195 | 1.33 | 0.0231 | 1.33 | 8.4:1 | 21.3 | 3.92 | 45.6 | 35.3 | 1.29 | 67.1 |
| Example 87 | 0.163 | 1.33 | 0.0195 | 1.34 | 8.4:1 | 11.6 | 1.85 | 58.1 | 41.8 | 1.39 | 71.2 |
| Example 88 | 0.121 | 1.35 | 0.0165 | 1.34 | 7.3:1 | 18.2 | 2.36 | 61.2 | 49.8 | 1.23 | 70.6 |
| Example 89 | 0.195 | 1.33 | 0.0227 | 1.35 | 8.6:1 | 42.8 | 0.52 | 47.1 | 35.9 | 1.31 | 66.9 |
| Comparative Example 43 | 0.438 | 1.35 | 0.0194 | 1.41 | 7.1:1 | 0.3 | 1.2 | 50.8 | 42.4 | 1.20 | 61.2 |
| Comparative Example 44 | 0.234 | 1.44 | 0.0296 | 1.42 | 7.9:1 | 1.0 | — | 40.6 | 27.6 | 1.47 | 54.3 |

TABLE 21

| Examples | Kind of acicular hematite particles subjected to acid-dissolving treatment | Surface treatment | | Coating material | |
|---|---|---|---|---|---|
| | | Kind of surface treatment material | Amount added (calculated as Al or SiO$_2$) (wt %) | Kind* of coating material | Coating amount (calculated as Al or SiO$_2$) (wt %) |
| Example 90 | Example 83 | Sodium aluminate | 2.0 | A | 1.96 |
| Example 91 | Example 84 | Water glass #3 | 0.5 | S | 0.49 |
| Example 92 | Example 85 | Aluminum sulfate Water glass #3 | 1.0 1.5 | A S | 0.98 1.46 |
| Example 93 | Example 86 | Aluminum acetate | 4.0 | A | 3.85 |
| Example 94 | Example 87 | Aluminum sulfate Colloidal silica | 1.0 1.0 | A S | 0.98 0.97 |
| Example 95 | Example 88 | Sodium aluminate | 3.0 | A | 2.88 |
| Example 96 | Example 89 | Sodium aluminate | 12.0 | A | 10.74 |

Note
*: "A" represents a hydroxide of aluminum. "S" represents an oxide of silicon.

TABLE 22

| Examples | Properties of hematite particles washed with water after surface treatment | | | | Properties of hematite particles washed with water after surface treatment | | Properties of hematite particles washed with water after surface treatment | | | |
|---|---|---|---|---|---|---|---|---|---|---|
| | Average major axis diameter (μm) | Geometrical standard deviation of major axis diameter (-) | Average minor axis diameter (μm) | Geometrical standard deviation of minor axis diameter (-) | Aspect ratio (-) | Content of Al (wt %) | $S_{BET}$ (m²/g) | $S_{TEM}$ (m²/g) | $S_{BET}/S_{TEM}$ value (-) | Resin adsorption (%) |
| Example 90 | 0.131 | 1.34 | 0.0187 | 1.34 | 7.0:1 | 1.22 | 56.3 | 44.1 | 1.28 | 76.3 |
| Example 91 | 0.142 | 1.35 | 0.0180 | 1.32 | 7.9:1 | 1.83 | 57.9 | 45.4 | 1.27 | 75.1 |
| Example 92 | 0.173 | 1.31 | 0.0220 | 1.31 | 7.9:1 | 0.91 | 49.6 | 37.2 | 1.33 | 77.1 |
| Example 93 | 0.195 | 1.33 | 0.0231 | 1.33 | 8.4:1 | 3.92 | 46.1 | 35.3 | 1.31 | 76.1 |
| Example 94 | 0.162 | 1.33 | 0.0195 | 1.34 | 8.3:1 | 1.85 | 59.6 | 41.8 | 1.43 | 75.8 |
| Example 95 | 0.121 | 1.35 | 0.0165 | 1.34 | 7.3:1 | 2.36 | 63.2 | 49.8 | 1.27 | 78.0 |
| Example 96 | 0.196 | 1.33 | 0.0228 | 1.35 | 8.6:1 | 0.52 | 47.0 | 35.7 | 1.32 | 76.1 |

TABLE 23

| Examples and Comparative Examples | Production of non-magnetic coating composition | | Non-magnetic coating composition Viscosity (cP) | Properties of non-magnetic undercoat layer | | | |
|---|---|---|---|---|---|---|---|
| | Kind of acicular hematite particles | Weight ratio of particles to resin (-) | | Thickness (μm) | Gloss (%) | Surface roughness Ra (nm) | Young's modulus (relative value) |
| Example 97 | Example 83 | 5.0 | 410 | 3.5 | 210 | 6.2 | 123 |
| Example 98 | Example 84 | 5.0 | 307 | 3.5 | 204 | 6.4 | 124 |
| Example 99 | Example 85 | 5.0 | 410 | 3.5 | 208 | 6.4 | 125 |
| Example 100 | Example 86 | 5.0 | 384 | 3.3 | 200 | 6.8 | 133 |
| Example 101 | Example 87 | 5.0 | 410 | 3.5 | 218 | 6.2 | 125 |
| Example 102 | Example 88 | 5.0 | 358 | 3.4 | 220 | 5.6 | 124 |
| Example 103 | Example 89 | 5.0 | 512 | 3.5 | 211 | 5.9 | 132 |
| Example 104 | Example 90 | 5.0 | 435 | 3.5 | 213 | 5.1 | 123 |
| Example 105 | Example 91 | 5.0 | 230 | 3.5 | 201 | 6.4 | 125 |
| Example 106 | Example 92 | 5.0 | 435 | 3.4 | 209 | 6.8 | 128 |
| Example 107 | Example 93 | 5.0 | 410 | 3.3 | 214 | 6.8 | 136 |
| Example 108 | Example 94 | 5.0 | 563 | 3.5 | 218 | 6.2 | 125 |
| Example 109 | Example 95 | 5.0 | 230 | 3.5 | 223 | 5.0 | 124 |
| Example 110 | Example 96 | 5.0 | 384 | 3.4 | 221 | 6.4 | 133 |
| Comparative Example 45 | Comparative Example 32 | 5.0 | 9,220 | 3.6 | 131 | 20.8 | 110 |
| Comparative Example 46 | Comparative Example 34 | 5.0 | 8,450 | 3.6 | 96 | 52.1 | 100 |
| Comparative Example 47 | Comparative Example 38 | 5.0 | 563 | 3.5 | 144 | 21.6 | 104 |
| Comparative Example 48 | Comparative Example 39 | 5.0 | 538 | 3.5 | 178 | 12.0 | 110 |
| Comparative Example 49 | Comparative Example 40 | 5.0 | 5,890 | 3.7 | 126 | 31.2 | 103 |
| Comparative Example 50 | Comparative Example 41 | 5.0 | 435 | 3.5 | 165 | 17.2 | 111 |
| Comparative Example 51 | Comparative Example 42 | 5.0 | 666 | 3.5 | 184 | 10.0 | 118 |
| Comparative Example 52 | Comparative Example 43 | 5.0 | 512 | 3.5 | 188 | 9.6 | 117 |
| Comparative Example 53 | Comparative Example 44 | 5.0 | 384 | 3.5 | 181 | 11.2 | 118 |

TABLE 24

| Examples | Production of magnetic recording medium - Kind of non-magnetic undercoat layer | Production of magnetic recording medium - Kind of magnetic particles | Weight ratio of particles to resin (−) | Thickness of magnetic coating film (μm) | Coercive force (Hc) (Oe) | Br/Bm value (−) | Gloss (%) | Surface roughness Ra (nm) | Young's modulus (relative value) | Durability - Running time (min) | Durability - Scratch resistance | Linear absorption ($\mu m^{-1}$) |
|---|---|---|---|---|---|---|---|---|---|---|---|---|
| Example 111 | Example 97 | Particles obtained in Example 6 | 5.0 | 1.0 | 1,986 | 0.88 | 227 | 6.4 | 123 | 28.5 | A | 1.21 |
| Example 112 | Example 98 | Magnetic particles (1) | 5.0 | 1.1 | 1,991 | 0.88 | 215 | 6.6 | 123 | 27.6 | B | 1.23 |
| Example 113 | Example 99 | Magnetic particles (2) | 5.0 | 1.0 | 1,786 | 0.89 | 224 | 6.0 | 125 | 28.9 | A | 1.23 |
| Example 114 | Example 100 | Magnetic particles (2) | 5.0 | 1.1 | 1,786 | 0.88 | 226 | 6.4 | 130 | 27.5 | B | 1.26 |
| Example 115 | Example 101 | Magnetic particles (3) | 5.0 | 1.0 | 991 | 0.89 | 238 | 5.8 | 125 | ≧30 | A | 1.25 |
| Example 116 | Example 102 | Magnetic particles (3) | 5.0 | 1.1 | 999 | 0.89 | 241 | 5.1 | 125 | ≧30 | A | 1.22 |
| Example 117 | Example 103 | Magnetic particles (4) | 5.0 | 1.0 | 893 | 0.90 | 226 | 5.6 | 131 | ≧30 | A | 1.22 |
| Example 118 | Example 104 | Magnetic particles (1) | 5.0 | 1.1 | 1,987 | 0.88 | 230 | 5.1 | 125 | ≧30 | A | 1.25 |
| Example 119 | Example 105 | Magnetic particles (1) | 5.0 | 1.0 | 1,994 | 0.89 | 216 | 5.2 | 124 | ≧30 | A | 1.25 |
| Example 120 | Example 106 | Magnetic particles (1) | 5.0 | 1.0 | 1,975 | 0.89 | 224 | 5.8 | 131 | ≧30 | A | 1.25 |
| Example 121 | Example 107 | Magnetic particles (1) | 5.0 | 1.1 | 1,981 | 0.89 | 220 | 6.3 | 138 | ≧30 | A | 1.27 |
| Example 122 | Example 108 | Magnetic particles (1) | 5.0 | 1.1 | 1,991 | 0.89 | 235 | 5.6 | 125 | 28.3 | A | 1.24 |
| Example 123 | Example 109 | Magnetic particles (1) | 5.0 | 1.0 | 2,001 | 0.90 | 245 | 5.0 | 126 | 29.8 | A | 1.23 |
| Example 124 | Example 110 | Magnetic particles (1) | 5.0 | 1.0 | 2,003 | 0.88 | 236 | 6.0 | 133 | ≧30 | A | 1.26 |

TABLE 25

| Comparative Examples | Production of magnetic recording medium | | | Properties of magnetic recording medium | | | | | | | | |
|---|---|---|---|---|---|---|---|---|---|---|---|---|
| | Kind of non-magnetic undercoat layer | Kind of magnetic particles | Weight ratio of particles to resin (-) | Thickness of magnetic film (μm) | Coercive force (Hc) (Oe) | Br/Bm value (-) | Gloss (%) | Surface roughness Ra (nm) | Young's modulus (relative value) | Durability | | Linear absorption (μm⁻¹) |
| | | | | | | | | | | Running time (min) | Scratch resistance | |
| Comparative Example 54 | Comparative Example 45 | Magnetic particles (1) | 5.0 | 1.2 | 1,961 | 0.73 | 131 | 19.6 | 114 | 11.6 | D | 1.05 |
| Comparative Example 55 | Comparative Example 46 | Magnetic particles (1) | 5.0 | 1.2 | 1,943 | 0.76 | 124 | 24.6 | 98 | 13.8 | D | 1.09 |
| Comparative Example 56 | Comparative Example 47 | Magnetic particles (1) | 5.0 | 1.0 | 1,976 | 0.83 | 174 | 13.8 | 115 | 9.6 | D | 1.16 |
| Comparative Example 57 | Comparative Example 48 | Magnetic particles (1) | 5.0 | 1.1 | 1,971 | 0.83 | 188 | 10.0 | 117 | 8.8 | C | 1.18 |
| Comparative Example 58 | Comparative Example 49 | Magnetic particles (1) | 5.0 | 1.1 | 1,954 | 0.77 | 159 | 13.8 | 111 | 20.6 | C | 1.09 |
| Comparative Example 59 | Comparative Example 50 | Magnetic particles (2) | 5.0 | 1.1 | 1,781 | 0.83 | 180 | 10.8 | 112 | 16.8 | C | 1.14 |
| Comparative Example 60 | Comparative Example 51 | Magnetic particles (2) | 5.0 | 1.0 | 1,770 | 0.85 | 193 | 8.0 | 116 | 15.4 | C | 1.16 |
| Comparative Example 61 | Comparative Example 52 | Magnetic particles (2) | 5.0 | 1.0 | 1,728 | 0.85 | 190 | 8.0 | 118 | 18.9 | C | 1.19 |
| Comparative Example 62 | Comparative Example 53 | Magnetic particles (2) | 5.0 | 1.1 | 1,765 | 0.85 | 184 | 9.2 | 115 | 17.8 | C | 1.14 |

TABLE 26

| Kind of precursors | Properties of acicular goethite particles | | | | | Properties of acicular goethite particles | |
|---|---|---|---|---|---|---|---|
| | Shape | Average major axis diameter (μm) | Geometrical standard deviation of major axis diameter (-) | Average minor axis diameter (μm) | Geometrical standard deviation of minor axis diameter (-) | Aspect ratio (-) | BET specific surface area (m²/g) |
| Goethite particles 1 | Spindle-shaped | 0.0593 | 1.56 | 0.0096 | 1.37 | 6.2:1 | 231.3 |
| Goethite particles 2 | Acicular | 0.0932 | 1.53 | 0.0126 | 1.39 | 7.4:1 | 186.8 |

TABLE 27

| | | Properties of acicular goethite particles subjected to anti-sintering treatment | | Properties of acicular goethite particles subjected to anti-sintering treatment | | | | Properties of acicular goethite particles subjected to anti-sintering treatment | |
|---|---|---|---|---|---|---|---|---|---|
| | | | | | Geometrical standard | | | | |
| | | Average major axis | Geometrical standard deviation of major axis | Average minor axis of minor | deviation of minor axis | Aspect | BET specific surface | Sintering preventive | |
| Kind of precursors | Kind of precursors | diameter ($\mu$m) | diameter (-) | diameter ($\mu$m) | diameter (-) | ratio (-) | area ($m^2/g$) | Calculated as | Amount (wt %) |
| Goethite particles 3 | Goethite particles used in Example 7 | 0.0813 | 1.53 | 0.0110 | 1.37 | 7.4:1 | 190.8 | P | 1.08 |
| Goethite particles 4 | Goethite particles 1 | 0.0593 | 1.56 | 0.0096 | 1.37 | 6.2:1 | 228.6 | P | 1.64 |
| Goethite particles 5 | Goethite particles 2 | 0.0931 | 1.53 | 0.0128 | 1.39 | 7.3:1 | 185.2 | SiO$_2$ | 1.09 |

TABLE 28

| | | Heat-treating conditions | | |
|---|---|---|---|---|
| Kind of goethite particles | Kind of precursors | Atmosphere | Temperature (° C.) | Time (min) |
| Goethite particles 6 | Goethite particles 3 | Air | 150 | 30 |
| Goethite particles 7 | Goethite particles 4 | Air | 180 | 30 |
| Goethite particles 8 | Goethite particles 5 | Air | 120 | 20 |
| Goethite particles 9 | Goethite particles 4 | Air | 80 | 30 |

TABLE 30

| Kind of particles to be treated | Kind of goethite particles | Conditions of heat-dehydrating treatment | | |
|---|---|---|---|---|
| | | Atmosphere | Temperature (° C.) | Time (min) |
| Hematite particles 1 | Goethite particles 6 | Air | 320 | 20 |
| Hematite particles 2 | Goethite particles 7 | Air | 340 | 30 |
| Hematite particles | Goethite particles | Air | 350 | 20 |

TABLE 29

| | Properties of acicular goethite particles after heat-treatment | | | | Properties of acicular goethite particles after heat-treatment | | | |
|---|---|---|---|---|---|---|---|---|
| | | Geometrical standard | | Geometrical standard | | | Sintering preventive | |
| Kind of goethite particles | Average major axis | deviation of major axis | Average minor axis | deviation of minor axis | Aspect ratio | BET specific surface area | Calculated as | Amount |
| | diameter ($\mu$m) | diameter (-) | diameter (-) | diameter (-) | (-) | ($m^2/g$) | | (wt %) |
| Goethite particles 6 | 0.0812 | 1.38 | 0.0109 | 1.16 | 7.4:1 | 191.2 | P | 1.18 |
| Goethite particles 7 | 0.0591 | 1.43 | 0.0098 | 1.21 | 6.0:1 | 227.6 | P | 1.82 |
| Goethite particles 8 | 0.0930 | 1.36 | 0.0128 | 1.25 | 7.3:1 | 184.8 | SiO$_2$ | 1.20 |
| Goethite particles 9 | 0.0590 | 1.53 | 0.0099 | 1.37 | 6.0:1 | 225.1 | P | 1.80 |

TABLE 30-continued

| Kind of particles to be treated | Kind of goethite particles | Conditions of heat-dehydrating treatment | | |
|---|---|---|---|---|
| | | Atmosphere | Temperature (° C.) | Time (min) |
| 3 Hematite particles 4 | 8 Goethite particles 4 | Air | 340 | 20 |

TABLE 31

| Kind of particles to be treated | Properties of low-density acicular hematite particles | | | | | | | | Properties of low-density acicular hematite particles | |
|---|---|---|---|---|---|---|---|---|---|---|
| | Average major axis diameter (–) | Geometrical standard deviation of major axis (–) | Average minor axis diameter (μm) | Geometrical standard deviation of minor axis (–) | Aspect ratio (–) | $S_{BET}$ (m$^2$/g) | $S_{TEM}$ (m$^2$/g) | $S_{BET}/S_{TEM}$ value (–) | Sintering preventive Calculated as | Amount (wt %) |
| Hematite particles | 0.0731 | 1.37 | 0.0113 | 1.16 | 6.5:1 | 226.5 | 73.3 | 3.09 | P | 1.18 |
| Hematite particles 2 | 0.0533 | 1.43 | 0.0103 | 1.20 | 5.2:1 | 263.8 | 81.9 | 3.22 | P | 1.81 |
| Hematite particles 3 | 0.0841 | 1.36 | 0.0131 | 1.25 | 6.4:1 | 216.8 | 63.3 | 3.43 | SiO$_2$ | 1.20 |
| Hematite particles 4 | 0.0531 | 1.56 | 0.0104 | 1.37 | 5.1:1 | 226.6 | 81.2 | 2.79 | P | 1.79 |

TABLE 32

| Examples and Comparative Examples | Kind of particles to be treated | Heat-treating conditions | | |
|---|---|---|---|---|
| | | Atmosphere | Temperature (° C.) | Time (min) |
| Example 125 | Hematite particles 1 | Air | 680 | 30 |
| Example 126 | Hematite particles 2 | Air | 630 | 40 |
| Example 127 | Hematite particles 3 | Air | 600 | 40 |
| Example 128 | Goethite particles 7 | Air | 650 | 20 |
| Comparative Example 63 | Goethite particles 1 | Air | 700 | 30 |
| Comparative Example 64 | Goethite particles 9 | Air | 630 | 30 |
| Comparative Example 65 | Hematite particles 4 | Air | 680 | 30 |
| Comparative Example 66 | Hematite particles 3 | Air | 450 | 30 |
| Comparative | Hematite | Air | 900 | 30 |

TABLE 32-continued

| Examples and Comparative Examples | Kind of particles to be treated | Heat-treating conditions | | |
|---|---|---|---|---|
| | | Atmosphere | Temperature (° C.) | Time (min) |
| Example 67 | particles 3 | | | |

TABLE 33

| Examples and Comparative Examples | Properties of acicular hematite particles | | | | | | | | Properties of acicular hematite particles Sintering preventive | |
|---|---|---|---|---|---|---|---|---|---|---|
| | Average major axis diameter (μm) | Geometrical standard deviation of major axis diameter (−) | Average minor axis diameter (μm) | Geometrical standard deviation of minor axis diameter (−) | Aspect ratio (−) | $S_{BET}$ (m²/g) | $S_{TEM}$ (m²/g) | $S_{BET}/S_{TEM}$ value (−) | Calculated as | Amount (wt %) |
| Example 125 | 0.0730 | 1.37 | 0.0114 | 1.16 | 6.4:1 | 81.2 | 72.7 | 1.12 | P | 1.18 |
| Example 126 | 0.0531 | 1.43 | 0.0103 | 1.20 | 5.2:1 | 91.6 | 81.9 | 1.12 | P | 1.81 |
| Example 127 | 0.0840 | 1.36 | 0.0130 | 1.25 | 6.5:1 | 71.6 | 63.8 | 1.12 | $SiO_2$ | 1.20 |
| Example 128 | 0.0583 | 1.40 | 0.0108 | 1.27 | 5.4:1 | 84.6 | 77.8 | 1.09 | P | 1.82 |
| Comparative Example 63 | 0.0432 | 1.61 | 0.0156 | 1.39 | 2.8:1 | 58.2 | 58.2 | 1.00 | P | 1.79 |
| Comparative Example 64 | 0.0456 | 1.59 | 0.0152 | 1.39 | 3.0:1 | 72.3 | 59.0 | 1.22 | P | 1.81 |
| Comparative Example 65 | 0.0528 | 1.56 | 0.0107 | 1..37 | 4.9:1 | 65.6 | 79.2 | 0.83 | P | 1.79 |
| Comparative Example 66 | 0.0841 | 1.35 | 0.0132 | 1.28 | 6.4:1 | 186.2 | 62.8 | 2.96 | $SiO_2$ | 1.20 |
| Comparative Example 67 | 0.0613 | 1.59 | 0.0232 | 1.38 | 2.6:1 | 36.8 | 39.4 | 0.93 | $SiO_2$ | 1.21 |

TABLE 34

| Examples | Kind of acicular hematite particles | Concentration of water suspension | pH value before addition (−) | Coating treatment with aluminum compound or silicon compound | | |
|---|---|---|---|---|---|---|
| | | | | Aluminum compound or silicon compound | | Final pH value (−) |
| | | | | Kind of compound added | Amount added: (calculated as Al (wt %) or calculated as $SiO_2$ (wt %)) | |
| Example 129 | Example 125 | 45 | 4.0 | Aluminum acetate | 3.0 | 7.0 |
| Example 130 | Example 126 | 45 | 10.0 | Water glass #3 | 1.0 | 6.8 |
| Example 131 | Example 127 | 45 | 10.1 | Sodium aluminate | 5.0 | 7.5 |
| Example 132 | Example 128 | 45 | 10.3 | Sodium aluminate | 2.0 | 7.0 |
| | | | | Water glass #3 | 0.5 | |

TABLE 35

| Examples | Properties of acicular hematite particles after surface-coating treatment ||||||||| Properties of acicular hematite particles after surface- coating treatment |||
|---|---|---|---|---|---|---|---|---|---|---|---|---|
| | Geometrical standard || Geometrical standard || Properties of acicular hematite particles after surface-coating treatment ||| | Sintering preventive || Coating amount of hydroxide of aluminum | Coating amount of oxide of silicon |
| | Average major axis diameter (μm) | deviation of major axis diameter (-) | Average minor axis diameter (μm) | deviation of minor axis diameter (-) | Aspect ratio (-) | $S_{BET}$ (m²/g) | $S_{TEM}$ (m²/g) | $S_{BET}/S_{TEM}$ value (-) | Calculated as | Amount (wt %) | (calculated as Al) (wt %) | (calculated as $SiO_2$) (wt %) |
| Example 129 | 0.0730 | 1.37 | 0.0114 | 1.16 | 6.4:1 | 80.1 | 72.7 | 1.10 | P | 1.16 | 2.91 | — |
| Example 130 | 0.0531 | 1.42 | 0.0103 | 1.19 | 5.2:1 | 92.1 | 81.9 | 1.12 | P | 1.76 | — | 0.99 |
| Example 131 | 0.0841 | 1.36 | 0.0130 | 1.25 | 6.5:1 | 73.8 | 63.7 | 1.16 | $SiO_2$ | 1.10 | 4.73 | — |
| Example 132 | 0.0583 | 1.39 | 0.0108 | 1.27 | 5.4:1 | 85.1 | 77.8 | 1.09 | P | 1.78 | 1.94 | 0.49 |

TABLE 36

| Examples and Comparative Examples | Production of non-magnetic coating composition || Non-magnetic coating composition Viscosity (cP) | Properties of non-magnetic undercoat layer |||
|---|---|---|---|---|---|---|
| | Kind of non-magnetic | Weight ratio of particles to resin | | Thickness (μm) | Gloss (%) | Surface roughness Ra (μm) | Young's modulus (relative value) |
| Example 133 | Example 125 | 5.0 | 640 | 0.35 | 211 | 6.2 | 135 |
| Example 134 | Example 126 | 5.0 | 712 | 0.35 | 219 | 5.8 | 132 |
| Example 135 | Example 127 | 5.0 | 512 | 0.36 | 206 | 6.0 | 138 |
| Example 136 | Example 128 | 5.0 | 896 | 0.34 | 198 | 6.8 | 131 |
| Example 137 | Example 129 | 5.0 | 589 | 0.35 | 213 | 6.0 | 136 |
| Example 138 | Example 130 | 5.0 | 563 | 0.35 | 223 | 5.5 | 132 |
| Example 139 | Example 131 | 5.0 | 410 | 0.35 | 209 | 5.7 | 138 |
| Example 140 | Example 132 | 5.0 | 793 | 0.36 | 206 | 6.1 | 132 |
| Comparative Example 68 | Hematite particles 1 | 5.0 | 21,760 | 0.41 | 84 | 48.2 | 87 |
| Comparative Example 69 | Hematite particles 2 | 5.0 | 19,200 | 0.38 | 76 | 58.3 | 81 |
| Comparative Example 70 | Hematite particles 3 | 5.0 | 20,300 | 0.37 | 53 | 89.0 | 73 |
| Comparative Example 71 | Hematite particles 4 | 5.0 | 20,810 | 0.37 | 75 | 41.6 | 76 |
| Comparative Example 72 | Comparative Example 63 | 5.0 | 717 | 0.36 | 153 | 21.6 | 108 |
| Comparative Example 73 | Comparative Example 64 | 5.0 | 614 | 0.35 | 158 | 18.9 | 113 |
| Comparative Example 74 | Comparative Example 65 | 5.0 | 563 | 0.35 | 168 | 16.8 | 119 |
| Comparative Example 75 | Comparative Example 66 | 5.0 | 14,410 | 0.37 | 102 | 32.1 | 90 |
| Comparative Example 76 | Comparative Example 67 | 5.0 | 307 | 0.34 | 173 | 36.2 | 81 |

TABLE 37

| Examples and Comparative Examples | Production of magnetic recording medium | | | Properties of magnetic recording medium | | | | Properties of magnetic recording medium | | |
|---|---|---|---|---|---|---|---|---|---|---|
| | Kind of non-magnetic undercoat layer | Kind of magnetic particles | Weight ratio of particles to resin (−) | Thickness of magnetic coating film (μm) | Coercive force (Hc) (Oe) | Br/Bm value (−) | Gloss (%) | Surface roughness Ra (nm) | Young's modulus (relative value) | Liner absorption (μm⁻¹) |
| Example 141 | Example 133 | Magnetic particles (1) | 5.0 | 1.0 | 2,009 | 0.87 | 236 | 6.0 | 138 | 1.23 |
| Example 142 | Example 134 | Magnetic particles (2) | 5.0 | 1.1 | 1,781 | 0.87 | 241 | 5.6 | 133 | 1.26 |
| Example 143 | Example 135 | Magnetic particles (5) | 5.0 | 1.0 | 2,689 | 0.87 | 198 | 6.4 | 136 | 1.22 |
| Example 144 | Example 136 | Magnetic particles (3) | 5.0 | 1.1 | 923 | 0.89 | 195 | 6.2 | 135 | 1.22 |
| Example 145 | Example 137 | Magnetic particles (1) | 5.0 | 1.0 | 2,015 | 0.88 | 236 | 5.8 | 138 | 1.24 |
| Example 146 | Example 138 | Magnetic particles (2) | 5.0 | 1.0 | 1,786 | 0.89 | 245 | 5.5 | 135 | 1.25 |
| Example 147 | Example 139 | Magnetic particles (3) | 5.0 | 1.0 | 993 | 0.89 | 194 | 5.8 | 140 | 1.21 |
| Example 148 | Example 140 | Magnetic particles (4) | 5.0 | 1.1 | 930 | 0.91 | 196 | 5.8 | 134 | 1.23 |
| Comparative Example 77 | Comparative Example 68 | Magnetic particles (1) | 5.0 | 1.2 | 1,968 | 0.68 | 158 | 38.4 | 95 | 1.07 |
| Comparative Example 78 | Comparative Example 69 | Magnetic particles (1) | 5.0 | 1.2 | 1,956 | 0.70 | 161 | 41.6 | 90 | 1.09 |
| Comparative Example 79 | Comparative Example 70 | Magnetic particles (1) | 5.0 | 1.1 | 1,985 | 0.71 | 166 | 68.2 | 81 | 1.12 |
| Comparative Example 80 | Comparative Example 71 | Magnetic particles (1) | 5.0 | 1.1 | 1,975 | 0.69 | 155 | 32.0 | 83 | 1.15 |
| Comparative Example 81 | Comparative Example 72 | Magnetic particles (1) | 5.0 | 1.1 | 1,986 | 0.76 | 176 | 18.6 | 112 | 1.08 |
| Comparative Example 82 | Comparative Example 73 | Magnetic particles (1) | 5.0 | 1.1 | 1,938 | 0.78 | 176 | 16.5 | 116 | 1.18 |
| Comparative Example 83 | Comparative Example 74 | Magnetic particles (5) | 5.0 | 1.0 | 2,656 | 0.68 | 134 | 36.4 | 98 | 1.06 |
| Comparative Example 84 | Comparative Example 75 | Magnetic particles (3) | 5.0 | 1.1 | 966 | 0.78 | 110 | 18.6 | 101 | 1.08 |
| Comparative Example 85 | Comparative Example 76 | Magnetic particles (4) | 5.0 | 1.1 | 923 | 0.80 | 113 | 17.2 | 95 | 1.10 |

TABLE 38

| | | Properties of acicular goethite particles | | | Properties of acicular goethite particles | | | |
| --- | --- | --- | --- | --- | --- | --- | --- | --- |
| | | | | | Geometrical | | | |
| Kind of precursors | Shape | Average major axis diameter (μm) | Geometrical standard deviation of major axis diameter (–) | Average minor axis diameter (μm) | standard deviation of minor axis diameter (–) | Aspect ratio (–) | BET specific surface area ($m^2/g$) | Al content (wt %) |
| Goethite particles | Spindle-shaped | 0.0586 | 1.53 | 0.0084 | 1.41 | 7.0:1 | 242.6 | 2.86 |
| Goethite particles | Acicular | 0.0893 | 1.52 | 0.0118 | 1.42 | 7.6:1 | 190.6 | 1.32 |

TABLE 39

| | | Properties of acicular goethite particles subjected to anti-sintering treatment | | Properties of acicular goethite particles subjected to anti-sintering treatment | | | | Properties of acicular goethite particles subjected to anti-sintering treatment | | |
| --- | --- | --- | --- | --- | --- | --- | --- | --- | --- | --- |
| | | | | | Geometrical | | | Sintering preventive | | |
| Kind of precursors | Kind of precursors | Average major axis diameter (μm) | Geometrical standard deviation of major axis diameter (–) | Average minor axis diameter (82 m) | standard deviation of minor axis diameter (–) | Aspect ratio (–) | BET specific surface area ($m^2g$) | Calculated as | Amount (wt %) | Al Content (wt %) |
| Goethite particles 12 | Goethite particles used in Example 10 | 0.0808 | 1.52 | 0.0113 | 1.41 | 7.2:1 | 200.6 | P | 1.16 | 3.36 |
| Goethite particles 13 | Goethite particles 10 | 0.0586 | 1.53 | 0.0084 | 1.41 | 7.0:1 | 240.6 | P | 1.59 | 2.85 |
| Goethite particles 14 | Goethite particles 11 | 0.0893 | 1.52 | 0.0118 | 1.42 | 7.6:1 | 189.8 | $SiO_2$ | 1.11 | 1:31 |

TABLE 40

| | | Heat-treating conditions | | |
| --- | --- | --- | --- | --- |
| Kind of particles | Kind of precursors | Atmosphere | Temperature (° C.) | Time (min) |
| Goethite particles 15 | Goethite particles 12 | Air | 130 | 40 |
| Goethite particles 16 | Goethite particles 13 | Air | 150 | 30 |
| Goethite | Goethite | Air | 150 | 20 |
| particles 17 | particles 14 | | | |
| Goethite particles 18 | Goethite particles 13 | Air | 80 | 30 |

TABLE 41

| Kind of goethite particles | Properties of acicular goethite particles after heat treatment | | | | | Properties of acicular goethite particles after heat-treatment | | | |
|---|---|---|---|---|---|---|---|---|---|
| | Average major axis diameter (μm) | Geometrical standard deviation of major axis diameter (-) | Average minor axis diameter (μm) | Geometrical standard deviation of minor axis diameter (-) | Aspect ratio (-) | BET specific surface area (m²/g) | Sintering preventive | | Al content (wt %) |
| | | | | | | | Calculated as | Amount (wt %) | |
| Goethite particles 15 | 0.0808 | 0.37 | 0.0112 | 1.26 | 7.2:1 | 201.8 | P | 1.17 | 3.36 |
| Goethite particles 16 | 0.0586 | 1.38 | 0.0084 | 1.27 | 7.0:1 | 239.4 | P | 1.59 | 2.86 |
| Goethite particles 17 | 0.0893 | 1.36 | 0.0117 | 1.29 | 7.6:1 | 190.1 | SiO₂ | 1.12 | 1.31 |
| Goethite particles 18 | 0.0586 | 1.52 | 0.0084 | 1.41 | 7.0:1 | 239.8 | P | 1.59 | 2.85 |

TABLE 42

| Kind of particles to be treated | Kind of goethite particles | Conditions of heat-dehydrating treatment | | |
|---|---|---|---|---|
| | | Atmosphere | Temperature (° C.) | Time (min) |
| Hematite particles 5 | Goethite particles 15 | Air | 330 | 30 |
| Hematite particles 6 | Goethite particles 16 | Air | 350 | 30 |
| Hematite particles 7 | Goethite particles 17 | Air | 370 | 25 |
| Hematite particles 8 | Goethite particles 18 | Air | 340 | 30 |

TABLE 43

| Kind of particles to be treated | Properties of low-density acicular hematite particles | | | | | | | | Properties of low-density acicular hematite particles | | |
|---|---|---|---|---|---|---|---|---|---|---|---|
| | Average major axis diameter (μm) | Geometrical standard deviation of major axis diameter (-) | Average minor axis diameter (μm) | Geometrical standard deviation of minor axis diameter (-) | Aspect ratio (-) | $S_{BET}$ (m²/g) | $S_{TEM}$ (m²/g) | $S_{BET}/S_{TEM}$ value (-) | Sintering preventive | | Al content (wt %) |
| | | | | | | | | | Calculated as | Amount (wt %) | |
| Hematite particles 5 | 0.0727 | 1.37 | 0.0110 | 1.27 | 6.6:1 | 218.6 | 75.2 | 2.91 | P | 1.30 | 3.73 |
| Hematite particles 6 | 0.0533 | 1.38 | 0.0085 | 1.27 | 6.3:1 | 251.2 | 97.7 | 2.57 | P | 1.74 | 3.18 |
| Hematite particles 7 | 0.0822 | 1.36 | 0.0116 | 1.29 | 7.1:1 | 209.6 | 71.0 | 2.95 | SiO₂ | 1.24 | 1.45 |
| Hematite particles 8 | 0.0539 | 1.52 | 0.0086 | 1.42 | 6.3:1 | 246.8 | 96.6 | 2.56 | P | 1.75 | 3.17 |

TABLE 44

| Examples and Comparative Examples | Kind of particles to be treated | Heat-treating conditions | | |
|---|---|---|---|---|
| | | Atmosphere | Temperature (° C.) | Time (min) |
| Example 149 | Hematite particles 5 | Air | 670 | 20 |
| Example 150 | Hematite particles 6 | Air | 630 | 30 |
| Example 151 | Hematite particles 7 | Air | 610 | 40 |
| Example 152 | Goethite particles 16 | Air | 640 | 30 |
| Comparative Example 86 | Goethite particles 10 | Air | 650 | 30 |
| Comparative Example 87 | Goethite particles 18 | Air | 650 | 30 |
| Comparative Example 88 | Hematite particles 8 | Air | 650 | 30 |
| Comparative Example 89 | Hematite particles 7 | Air | 440 | 30 |
| Comparative Example 90 | Hematite particles 7 | Air | 910 | 30 |

TABLE 45

| | Properties of acicular menatite particles | | | | | | | | Properties of acicular hematite particles | | | |
|---|---|---|---|---|---|---|---|---|---|---|---|---|
| Examples and Comparative Examples | Average major axis diameter (μm) | Geometrical standard deviation of major axis diameter (-) | Average minor axis diameter (μm) | Geometrical standard deviation of minor axis diameter (-) | Properties of acicular hematite particles | | | | Sintering preventive | | | |
| | | | | | Aspect ratio | $S_{BET}$ (m²/g) | $S_{TEM}$ (m²/g) | $S_{BET}/S_{TEM}$ value (-) | Calculated as | Amount (wt %) | Al content (wt %) | Resin adsorption (%) |
| Example 149 | 0.0726 | 1.37 | 0.0111 | 1.28 | 6.5:1 | 84.6 | 74.6 | 1.13 | P | 1.30 | 3.73 | 74.6 |
| Example 150 | 0.0532 | 1.39 | 0.0086 | 1.27 | 6.2:1 | 95.6 | 96.7 | 0.99 | P | 1.75 | 3.18 | 73.2 |
| Example 151 | 0.0821 | 1.36 | 0.0117 | 1.29 | 7.0:1 | 73.2 | 70.4 | 1.04 | $SiO_2$ | 1.24 | 1.45 | 71.3 |
| Example 152 | 0.0521 | 1.38 | 0.0087 | 1.29 | 6.0:1 | 91.8 | 95.8 | 0.96 | P | 1.76 | 3.18 | 72.6 |
| Comparative Example 86 | 0.0412 | 1.63 | 0.0150 | 1.44 | 2.7:1 | 38.3 | 60.6 | 0.63 | — | — | 3.19 | 61.6 |
| Comparative Example 87 | 0.0521 | 1.61 | 0.0091 | 1.41 | 5.7:1 | 63.6 | 91.9 | 0.69 | P | 1.76 | 3.18 | 67.1 |
| Comparative Example 88 | 0.0538 | 1.53 | 0.0087 | 1.42 | 6.2:1 | 73.8 | 95.6 | 0.77 | P | 1.75 | 3.17 | 68.3 |
| Comparative Example 89 | 0.0822 | 1.36 | 0.0116 | 1.29 | 7.1:1 | 189.9 | 71.0 | 2.67 | $SiO_2$ | 1.24 | 1.45 | 67.2 |
| Comparative Example 90 | 0.0642 | 1.58 | 0.0213 | 1.43 | 3.0:1 | 39.6 | 42.1 | 0.94 | $SiO_2$ | 1.24 | 1.46 | 62.1 |

TABLE 46

| | | | | Coating treatment with aluminum compound or silicon compound | | |
|---|---|---|---|---|---|---|
| | | | | Aluminum compound or silicon compound | | |
| Examples | Kind of acicular hematite particles | Concentration of water suspension (g/l) | pH value before addition (-) | Kind of compound added | Amount added: (calculated as Al (wt %) or calculated as $SiO_2$ (wt %)) | Final pH value (-) |
| Example 153 | Example 149 | 45 | 4.0 | Aluminum acetate | 3.0 | 7.5 |
| Example 154 | Example 150 | 45 | 10.0 | Water glass #3 | 1.0 | 7.0 |
| Example 155 | Example 151 | 45 | 10.0 | Sodium aluminate | 5.0 | 7.0 |
| Example 156 | Example 152 | 45 | 10.0 | Sodium aluminate | 2.0 | 7.0 |
| | | | | Water glass #3 | 0.5 | |

TABLE 47

| | Properties of acicular hematite particles after surface-coating treatment | | | | Properties of acicular hematite particles after surface-coating treatment | | | | Properties of acicular hematite particles after surface-coating treatment | | | | Properties of acicular hematite particles after surface-coating treatment | |
|---|---|---|---|---|---|---|---|---|---|---|---|---|---|---|---|
| | Average major axis diameter (μm) | Geometrical standard deviation of major axis diameter (-) | Average minor axis diameter (μm) | Geometrical standard deviation of minor axis diameter (-) | Aspect ratio (-) | $S_{BET}$ ($m^2$/g) | $S_{TEM}$ ($m^2$/g) | $S_{BET}$/$S_{TEM}$ value (-) | Sintering preventive Calculated as | Amount (wt %) | Al content (wt %) | Coating amount of hydroxide of aluminum (calculated as Al) (wt %) | Coating amount of oxide of silicon (calculated as $SiO_2$) (wt %) | Resin adsorption (%) |
| Example 153 | 0.0726 | 1.37 | 0.0111 | 1.28 | 6.5:1 | 84.8 | 74.6 | 1.14 | P | 1.29 | 3.73 | 2.92 | — | 75.3 |
| Example 154 | 0.0532 | 1.39 | 0.0086 | 1.27 | 6.2:1 | 96.8 | 96.7 | 1.00 | P | 1.75 | 3.18 | — | 1.00 | 76.1 |
| Example 155 | 0.0821 | 1.36 | 0.0117 | 1.29 | 7.0:1 | 74.6 | 70.4 | 1.06 | $SiO_2$ | 1.24 | 1.45 | 4.71 | — | 77.2 |
| Example 156 | 0.0521 | 1.38 | 0.0087 | 1.29 | 6.0:1 | 91.8 | 95.8 | 0.96 | P | 1.76 | 3.18 | 1.95 | 0.48 | 75.6 |

TABLE 48

| Examples and Comparative Examples | Production of non-magnetic coating composition Kind of non-magnetic particles | Weight ratio of particles to resin (-) | Non-magnetic coating composition Viscosity (cP) | Properties of non-magnetic undercoat layer | | | |
|---|---|---|---|---|---|---|---|
| | | | | Thickness (μm) | Gloss (%) | Surface roughness Ra (nm) | Young's modulus (relative value) |
| Example 157 | Example 149 | 5.0 | 410 | 0.35 | 213 | 6.0 | 135 |
| Example 158 | Example 150 | 5.0 | 640 | 0.35 | 220 | 5.4 | 133 |
| Example 159 | Example 151 | 5.0 | 589 | 0.36 | 209 | 5.8 | 138 |
| Example 160 | Example 152 | 5.0 | 793 | 0.35 | 201 | 6.4 | 132 |
| Example 161 | Example 153 | 5.0 | 589 | 0.35 | 215 | 5.6 | 136 |
| Example 162 | Example 154 | 5.0 | 563 | 0.35 | 221 | 5.4 | 133 |
| Example 163 | Example 155 | 5.0 | 410 | 0.35 | 212 | 5.7 | 138 |
| Example 164 | Example 156 | 5.0 | 563 | 0.34 | 208 | 6.0 | 133 |
| Comparative Example 91 | Hematite particles 5 | 5.0 | 16,640 | 0.38 | 86 | 46.3 | 88 |
| Comparative Example 92 | Hematite particles 6 | 5.0 | 14,340 | 0.38 | 91 | 52.1 | 83 |
| Comparative Example 93 | Hematite particles 7 | 5.0 | 15,360 | 0.37 | 70 | 76.5 | 76 |
| Comparative Example 94 | Hematite particles 8 | 5.0 | 16,380 | 0.37 | 83 | 38.2 | 78 |
| Comparative Example 95 | Comparative Example 86 | 5.0 | 896 | 0.36 | 159 | 20.8 | 110 |
| Comparative Example 96 | Comparative Example 87 | 5.0 | 640 | 0.35 | 164 | 17.6 | 113 |
| Comparative Example 97 | Comparative Example 88 | 5.0 | 512 | 0.35 | 168 | 16.5 | 120 |
| Comparative Example 98 | Comparative Example 89 | 5.0 | 11,520 | 0.37 | 103 | 33.6 | 95 |
| Comparative Example 99 | Comparative Example 90 | 5.0 | 256 | 0.35 | 174 | 28.3 | 83 |

TABLE 49

| Examples and Comparative Examples | Production of magnetic recording medium | | | Properties of magnetic recording medium | | | | | | Durability | | |
|---|---|---|---|---|---|---|---|---|---|---|---|---|
| | Kind of non-magnetic undercoat layer | Kind of magnetic particles | Weight ratio of particles to resin (-) | Thickness of magnetic coating film (μm) | Coercive force (Hc) (Oe) | Br/Bm value (-) | Gloss (%) | Surface roughness Ra (nm) | Young's modulus (relative value) | Running time (min) | Scratch resistance | Liner absorption (μm⁻¹) |
| Example 165 | Example 157 | Magnetic particles (1) | 5.0 | 1.0 | 1,996 | 0.87 | 238 | 5.9 | 138 | 23.8 | A | 1.25 |
| Example 166 | Example 158 | Magnetic particles (2) | 5.0 | 1.0 | 1,784 | 0.87 | 240 | 5.2 | 134 | 25.6 | B | 1.27 |
| Example 167 | Example 159 | Magnetic particles (5) | 5.0 | 1.0 | 2,685 | 0.87 | 200 | 5.6 | 136 | 24.6 | B | 1.23 |
| Example 168 | Example 160 | Magnetic particles (3) | 5.0 | 1.1 | 920 | 0.88 | 196 | 6.0 | 136 | 28.2 | A | 1.24 |
| Example 169 | Example 161 | Magnetic particles (1) | 5.0 | 1.0 | 1,999 | 0.88 | 235 | 5.5 | 138 | >30 | A | 1.26 |
| Example 170 | Example 162 | Magnetic particles (2) | 5.0 | 1.1 | 1,781 | 0.89 | 243 | 5.0 | 136 | >30 | A | 1.25 |
| Example 171 | Example 163 | Magnetic particles (3) | 5.0 | 1.0 | 992 | 0.89 | 196 | 5.6 | 139 | >30 | A | 1.22 |
| Example | Example | Magnetic | 5.0 | 1.0 | 931 | 0.90 | 198 | 5.0 | 135 | >30 | A | 1.23 |

TABLE 49-continued

| | Production of magnetic recording medium | | | Properties of magnetic recording medium | | | | | | | | |
|---|---|---|---|---|---|---|---|---|---|---|---|---|
| | | | | Thickness of magnetic coating film ($\mu$m) | Coercive force (Hc) (Oe) | Br/Bm value (-) | Gloss (%) | Surface roughness Ra (nm) | Young's modulus (relative value) | Durability | | Liner absorption ($\mu$m$^{-1}$) |
| Examples and Comparative Examples | Kind of non-magnetic undercoat layer | Kind of magnetic particles | Weight ratio of particles to resin (-) | | | | | | | Running time (min) | Scratch resistance | |
| 172 | 164 | particles (4) | | | | | | | | | | |
| Comparative Example 100 | Comparative Example 91 | Magnetic particles (1) | 5.0 | 1.3 | 1,971 | 0.65 | 159 | 33.6 | 96 | 3.6 | D | 1.08 |
| Comparative Example 101 | Comparative Example 92 | Magnetic particles (1) | 5.0 | 1.3 | 1,963 | 0.71 | 162 | 38.2 | 92 | 4.2 | D | 1.07 |
| Comparative Example 102 | Comparative Example 93 | Magnetic particles (1) | 5.0 | 1.2 | 1,988 | 0.70 | 168 | 58.8 | 83 | 5.6 | D | 1.12 |
| Comparative Example 103 | Comparative Example 94 | Magnetic particles (1) | 5.0 | 1.2 | 1,979 | 0.68 | 158 | 28.8 | 86 | 8.2 | D | 1.15 |
| Comparative Example 104 | Comparative Example 95 | Magnetic particles (1) | 5.0 | 1.1 | 1,988 | 0.74 | 178 | 17.7 | 114 | 10.3 | C | 1.11 |
| Comparative Example 105 | Comparative Example 96 | Magnetic particles (1) | 5.0 | 1.0 | 1,985 | 0.76 | 176 | 15.6 | 118 | 6.8 | C | 1.16 |
| Comparative Example 106 | Comparative Example 97 | Magnetic particles (5) | 5.0 | 1.0 | 2,673 | 0.68 | 140 | 34.2 | 98 | 5.4 | D | 1.06 |
| Comparative Example 107 | Comparative Example 98 | Magnetic particles (3) | 5.0 | 1.2 | 978 | 0.76 | 113 | 16.8 | 105 | 10.6 | D | 1.10 |
| Comparative Example 108 | Comparative Example 99 | Magnetic particles (4) | 5.0 | 1.0 | 921 | 0.80 | 116 | 17.3 | 98 | 13.2 | C | 1.09 |

What is claimed is:

1. Acicular hematite particles comprising a geometrical standard deviation of major axis diameter of not more than 1.5, a geometrical standard deviation of minor axis diameter of not more than 1.35, a BET specific surface area of 35.9 to 150 m$^2$/g and an average major axis diameter of 0.004 to 0.295 $\mu$m.

2. Acicular hematite particles according to claim 1, which further comprise aluminum within the particle in an amount of 0.05 to 50% by weight, calculated as Al, based on the weight of said acicular hematite particles.

3. Acicular hematite particles according to claim 1, which further comprise a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or SiO$_2$, based on the weight of said acicular hematite particles.

4. Acicular hematite particles according to claim 2, which further comprise a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or SiO$_2$, based on the weight of said acicular hematite particles.

5. Acicular hematite particles according to claim 1, which further comprise an aspect ratio (average major axis diameter/average minor axis diameter) of 2:1 to 20:1, and a ratio value of a BET specific surface area $S_{BET}$ to a specific surface area $S_{TEM}$ of 0.5 to 2.5 ($S_{TEM}$ being calculated from the major axis diameter and the minor axis diameter which were measured from the particles in an electron micrograph of the acicular hematite particles).

6. Acicular hematite particles according to claim 1, which further comprise a geometrical standard deviation of major axis diameter of not more than 1.50, a geometrical standard deviation of minor axis diameter of not more than 1.30, a BET specific surface area of 40 to 120 m$^2$/g and an average major axis diameter of 0.01 to 0.2 $\mu$m.

7. Acicular hematite particles according to claim 6, which further comprise aluminum within the particle in an amount of 0.05 to 50% by weight, calculated as Al, based on the weight of said acicular hematite particles.

8. Acicular hematite particles according to claim 6, which further comprise a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or SiO$_2$, based on the weight of said acicular hematite particles.

9. Acicular hematite particles according to claim 7, which further comprise a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

10. A process for producing the acicular hematite particles set forth in claim 1, which process comprises:

subjecting a water suspension of acicular hematite particles having an average major axis diameter of 0.005 to 0.30 μm, a geometrical standard deviation of minor axis diameter of not less than 1.37, and a BET specific surface area of 35 to 150 $m^2/g$ to acid-dissolving treatment at a acid concentration of not less than 1.0 N, a pH value of not more than 3.0, and a temperature of 20 to 100° C., thereby dissolving the acicular hematite particles in an amount of 5 to 50% by weight based on the total weight of the acicular hematite particles in said water suspension.

11. A process for producing the acicular hematite particles set forth in claim 6, which process comprises:

heat-treating acicular goethite particles having an average major axis diameter of 0.01 to 0.25 μm, and a geometrical standard deviation of minor axis diameter of not more than 1.37, at 100 to 200° C.; and heat-dehydrating the obtained particles at 550 to 850° C.

12. A magnetic recording medium comprising:

a non-magnetic base film;

a non-magnetic undercoat layer formed on said non-magnetic base film, comprising a binder resin and acicular hematite particles having a geometrical standard deviation of major axis diameter of not more than 1.50, a geometrical standard deviation of minor axis diameter of not more than 1.35, an average major axis diameter of 0.004 to 0.295 μm and a BET specific surface area of 35.9 to 150 $m^2/g$; and a magnetic coating film comprising a binder resin and magnetic particles.

13. A magnetic recording medium according to claim 12, wherein said acicular hematite particles are particles containing aluminum within the particle in an amount of 0.05 to 50% by weight, calculated as Al, based on the weight of said acicular hematite particles.

14. A magnetic recording medium according to claim 12, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

15. A magnetic recording medium according to claim 13, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

16. A magnetic recording medium according to claim 12, wherein said acicular hematite particles are particles having a geometrical standard deviation of major axis diameter of not more than 1.5, a geometrical standard deviation of minor axis diameter of not more than 1.3, a BET specific surface area of 40 to 150 $m^2/g$ and an average major axis diameter of 0.01 to 0.2 μm.

17. A magnetic recording medium according to claim 16, wherein said acicular hematite particles are particles containing aluminum within the particle in an amount of 0.05 to 50% by weight, calculated as Al, based on the weight of said acicular hematite particles.

18. A magnetic recording medium according to claim 16, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

19. A magnetic recording medium according to claim 17, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

20. A magnetic recording medium according to claim 12, which further comprises a gloss of coating film of 122 to 300%, a surface roughness Ra of coating film of not more than 12.0 nm, and a linear absorption of coating film of 1.10 to 2.00 $\mu m^{-1}$.

21. A magnetic recording medium according to claim 13, which further comprises a gloss of coating film of 126 to 300%, a surface roughness Ra of coating film of not more than 12.0 nm, a linear absorption of coating film of 1.10 to 2.00 $\mu m^{-1}$, and a running durability of not less than 20 minutes.

22. A magnetic recording medium according to claim 14, which further comprises a gloss of coating film of 124 to 300%, a surface roughness Ra of coating film of not more than 12.0 nm, and a linear absorption of coating film of 1.10 to 2.00 $\mu m^{-1}$.

23. A magnetic recording medium according to claim 15, which further comprises a gloss of coating film of 128 to 300%, a surface roughness Ra of coating film of not more than 12.0 nm, a linear absorption of coating film of 1.10 to 2.00 $\mu m^{-1}$, and a running durability of not less than 22 minutes.

24. A magnetic recording medium according to claim 16, which further comprises a gloss of coating film of 130 to 300%, a surface roughness Ra of coating film of not more than 12.0 nm, and a linear absorption of coating film of 1.10 to 2.00 $\mu m^{-1}$.

25. A magnetic recording medium according to claim 17, which further comprises a gloss of coating film of 135 to 300%, a surface roughness Ra of coating film of not more than 11.6 nm, a linear absorption of coating film of 1.10 to 2.00 $\mu m^{-1}$, and a running durability of not less than 23 minutes.

26. A magnetic recording medium according to claim 18, which further comprises a gloss of coating film of 133 to 300%, a surface roughness Ra of coating film of not more than 11.8 nm, and a linear absorption of coating film of 1.10 to 2.00 $\mu m^{-1}$.

27. A magnetic recording medium according to claim 19, which further comprises a gloss of coating film of 138 to 300%, a surface roughness Ra of coating film of not more than 11.4 nm, a linear absorption of coating film of 1.10 to 2.00 $\mu m^{-1}$, and a running durability of not less than 24 minutes.

28. A non-magnetic substrate comprising:

a non-magnetic base film; and a non-magnetic undercoat layer formed on said non-magnetic base film, comprising a binder resin and acicular hematite particles having a geometrical standard deviation of major axis diameter of not more than 1.50, a geometrical standard deviation of minor axis diameter of not more than 1.35, a BET specific surface area of 35.9 to 150 m$^2$/g and an average major axis diameter of 0.004 to 0.295 μm.

29. A non-magnetic substrate according to claim 28, wherein said acicular hematite particles are particles containing aluminum within the particle in an amount of 0.05 to 50% by weight, calculated as Al, based on the weight of said acicular hematite particles.

30. A non-magnetic substrate according to claim 28, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

31. A non-magnetic substrate according to claim 29, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

32. A non-magnetic substrate according to claim 28, wherein said acicular hematite particles are particles having a geometrical standard deviation of major axis diameter of not more than 1.50, a geometrical standard deviation of minor axis diameter of not more than 1.30, a BET specific surface area of 40 to 120 m$^2$/g and an average major axis diameter of 0.01 to 0.2 μm.

33. A non-magnetic substrate according to claim 32, wherein said acicular hematite particles are particles containing aluminum within the particle in an amount of 0.05 to 50% by weight, calculated as Al, based on the weight of said acicular hematite particles.

34. A non-magnetic substrate according to claim 32, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

35. A non-magnetic substrate according to claim 33, wherein said acicular hematite particles are particles having a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

36. A non-magnetic substrate according to claim 28, which further comprises a gloss of coating film of 185 to 300% and a surface roughness Ra of coating film of 0.5 to 10.0 nm.

37. A non-magnetic substrate according to claim 29, which further comprises a gloss of coating film of 187 to 300% and a surface roughness Ra of coating film of 0.5 to 9.5 nm.

38. A non-magnetic substrate according to claim 30, which further comprises a gloss of coating film of 190 to 300% and a surface roughness Ra of coating film of 0.5 to 9.5 nm.

39. A non-magnetic substrate according to claim 31, which further comprises a gloss of coating film of 191 to 300% and a surface roughness Ra of coating film of 0.5 to 9.3 nm.

40. A non-magnetic substrate according to claim 32, which further comprises a gloss of coating film of 191 to 300% and a surface roughness Ra of coating film of 0.5 to 9.2 nm.

41. A non-magnetic substrate according to claim 33, which further comprises a gloss of coating film of 194 to 300% and a surface roughness Ra of coating film of 0.5 to 8.9 nm.

42. A non-magnetic substrate according to claim 34, which further comprises a gloss of coating film of 193 to 300% and a surface roughness Ra of coating film of 0.5 to 9.0 nm.

43. A non-magnetic substrate according to claim 35, which further comprises a gloss of coating film of 196 to 300% and a surface roughness Ra of coating film of 0.5 to 8.7 nm.

* * * * *